US009929938B2

(12) United States Patent
Thubert et al.

(10) Patent No.: US 9,929,938 B2
(45) Date of Patent: *Mar. 27, 2018

(54) HIERARCHAL LABEL DISTRIBUTION AND ROUTE INSTALLATION IN A LOOP-FREE ROUTING TOPOLOGY USING ROUTING ARCS AT MULTIPLE HIERARCHAL LEVELS FOR RING TOPOLOGIES

(71) Applicant: Cisco Technology, Inc., San Jose, CA (US)

(72) Inventors: Pascal Thubert, La Colle sur Loup (FR); Patrice Bellagamba, Saint-Raphael (FR); Dirk Anteunis, Fayence (FR)

( * ) Notice: Subject to any disclaimer, the term of this patent is extended or adjusted under 35 U.S.C. 154(b) by 1 day.

This patent is subject to a terminal disclaimer.

(21) Appl. No.: 15/087,919

(22) Filed: Mar. 31, 2016

(65) Prior Publication Data
US 2016/0218965 A1 Jul. 28, 2016

Related U.S. Application Data

(63) Continuation of application No. 13/620,677, filed on Sep. 14, 2012, now Pat. No. 9,338,086.

(51) Int. Cl.
*H04L 12/26* (2006.01)
*H04L 12/705* (2013.01)
(Continued)

(52) U.S. Cl.
CPC .......... *H04L 45/18* (2013.01); *H04L 12/4637* (2013.01); *H04L 45/22* (2013.01);
(Continued)

(58) Field of Classification Search
USPC ....... 370/216, 221, 222, 223, 224, 229, 230, 370/242, 249
See application file for complete search history.

(56) References Cited

U.S. PATENT DOCUMENTS 6,728,205 B1 * 4/2004 Finn ...................... H04L 45/00
345/440
7,545,735 B1 6/2009 Shabtay et al.
(Continued)

FOREIGN PATENT DOCUMENTS

| CN | 102308519 A | 1/2012 |
| WO | 2012120527 A1 | 6/2012 |

OTHER PUBLICATIONS

Thubert et al., "Available Routing Constructs", RTGWG Internet Draft, <draft-thubert-rtgwg-arc-00>, Oct. 2, 2012, XP015087564, pp. 1-19.
(Continued)

*Primary Examiner* — Kwang B Yao
*Assistant Examiner* — Nguyen Ngo
(74) *Attorney, Agent, or Firm* — Leon R. Turkevich

(57) ABSTRACT

In one embodiment, a method comprises creating, in a computing network, a loop-free routing topology comprising a plurality of routing arcs for reaching a destination network node, each routing arc comprising a first network node as a first end of the routing arc, a second network node as a second end of the routing arc, and at least a third network node configured for routing any network traffic along the routing arc toward the destination node via any one of the first or second ends of the routing arc, at least one of the first, second, or third network nodes are implemented as a ring-based network having a prescribed ring topology; and establishing loop-free label switched paths for reaching the destination network node via the routing arcs of the loop-free routing topology, the label switched paths independent and distinct from any attribute of the prescribed ring topology.

20 Claims, 39 Drawing Sheets

(51) Int. Cl.
| | |
|---|---|
| *H04L 12/723* | (2013.01) |
| *H04L 12/707* | (2013.01) |
| *H04L 12/703* | (2013.01) |
| *H04L 12/46* | (2006.01) |
| *H04L 12/715* | (2013.01) |
| *H04L 12/42* | (2006.01) |

(52) U.S. Cl.
CPC ............. *H04L 45/28* (2013.01); *H04L 45/50* (2013.01); *H04L 45/507* (2013.01); *H04L 45/64* (2013.01); *H04L 2012/421* (2013.01)

(56) References Cited

U.S. PATENT DOCUMENTS

| | | | |
|---|---|---|---|
| 7,633,940 B1 * | 12/2009 | Singh | H04L 45/12 370/237 |
| 7,656,857 B2 | 2/2010 | Thubert et al. | |
| 7,668,119 B2 | 2/2010 | Thubert et al. | |
| 7,693,064 B2 | 4/2010 | Thubert et al. | |
| 7,801,031 B2 | 9/2010 | Chao et al. | |
| 8,897,135 B2 | 11/2014 | Thubert et al. | |
| 9,246,794 B2 | 1/2016 | Thubert et al. | |
| 9,338,086 B2 * | 5/2016 | Thubert | H04L 45/507 |
| 2002/0067693 A1 | 6/2002 | Kodialam et al. | |
| 2002/0172150 A1 * | 11/2002 | Kano | H04J 3/085 370/216 |
| 2002/0176371 A1 * | 11/2002 | Behzadi | H04L 45/02 370/254 |
| 2003/0026209 A1 | 2/2003 | Katz | |
| 2003/0046426 A1 | 3/2003 | Nguyen | |
| 2005/0073958 A1 | 4/2005 | Atlas et al. | |
| 2006/0164976 A1 * | 7/2006 | Grover | H04L 45/00 370/228 |
| 2009/0073921 A1 * | 3/2009 | Ji | H04L 45/00 370/328 |
| 2009/0190494 A1 * | 7/2009 | De Giovanni | H04L 45/02 370/254 |
| 2010/0188979 A1 | 7/2010 | Thubert et al. | |
| 2010/0208733 A1 | 8/2010 | Zhao et al. | |
| 2010/0315943 A1 | 12/2010 | Chao et al. | |
| 2012/0155484 A1 | 6/2012 | Sergeev et al. | |
| 2012/0300668 A1 | 11/2012 | Thubert et al. | |
| 2013/0301470 A1 | 11/2013 | Thubert et al. | |

OTHER PUBLICATIONS

Thubert et al., U.S. Appl. No. 13/113,113, filed May 23, 2011.
Thubert et al., U.S. Appl. No. 13/371,065, filed Feb. 10, 2012.
Thubert et al., U.S. Appl. No. 13/467,603, filed May 9, 2012.
"ATM Routing", SES PNNI Controller Software Configuration Guide, Release 1.0, Part No. 78-6123-03, May 2000, pp. 2-1 to 2-28 (28 pages).
Martini et al., "Inter-Chassis Communication Protocol for L2VPN PE Redundancy", Internet Engineering Task Force, Internet Draft, [online], Jul. 9, 2011, [retrieved on Jul. 16, 2012]. Retrieved from the Internet: URL: <http://tools.ietf.org/pdf/draft-ietf-pwe3-iccp-06.pdf>, pp. 1-78.
Atlas, Ed., "An Architecture for IP/LDP Fast-Reroute Using Maximally Redundant Trees", Routing Area Working Group, Internet Draft, [online], Mar. 12, 2012, [retrieved on Jul. 16, 2012]. Retrieved from the Internet: URL: <http://tools.ietf.org/pdf/draft-ietf-rtgwg-mrt-frr-architecture-01.pdf>, pp. 1-25.
MPLS-Tag DocWiki, "MPLS/Tag Switching", [online], Oct. 10, 2010, [retrieved on Jul. 13, 2012]. Retrieved from the Internet: <URL: http://docwiki.cisco.com/wiki/MPLS/Tag_Switching>, pp. 1-10.
Rosen et al., "Multiprotocol Label Switching Architecture", Network Working Group, Request for Comments: 3031, Jan. 2001, pp. 1-61.
Andersson et al., "LDP Specification", Network Working Group, Request for Comments: 3036, Jan. 2001, pp. 1-132.

Andersson et al., "LDP Specification", Network Working Group, Request for Comments: 5036, Oct. 2007, pp. 1-135.
Bryant et al., "Joint Working Team (JWT) Report on MPLS Architectural Considerations for a Transport Profile", Network Working Group, Request for Comments: 5317, Feb. 2009, pp. 1-68.
Niven-Jenkins et al., Requirements of an MPLS Transport Profile:, Network Working Group, Request for Comments: 5654, Sep. 2009, pp. 1-31.
Beller et al., "An In-Band Data Communication Network for the MPLS Transport Profile", Internet Engineering Task Force, Request for Comments: 5718, Jan. 2010, pp. 1-8.
Vigoureux et al., "Requirements for Operations, Administration, and Maintenance (OAM) in MPLS Transport Networks", Internet Engineering Task Force, Request for Comments: 5860, May 2010, pp. 1-17.
Smith et al., "Label Edge Router Forwarding of IPv4 Option Packets", Internet Engineering Task Force, Request for Comments: 6178, Mar. 2011, pp. 1-9.
PCT/US12/39039 International Search Report, Aug. 24, 2012.
Cho et al., "Resilient multipath routing with independent directed acyclic graphs", Proceedings of IEEE International Conference on Communications (ICC), [online], May 2010, [retrieved on Oct. 30, 2012]. Retrieved from the Internet: <URL: http://ieeexplore.ieee.org/stamp/stamp.jsp?tp=&amumber=5502526>, 5 pages.
Cho et al., Independent Directed Acyclic Graphs for Resilient Multipath Routing:, IEEE/ACM Transactions on Networking, vol. 1, No. 20, [online], Feb. 20, 2012, [retrieved on Oct. 24, 2012]. Retrieved from the Internet: <URL: http://srini.ca/p/Srini-2011-TON-IDAGS.pdf>, 11 pages.
Erlebach et al., "Path Splicing with Guaranteed Fault Tolerance", IEEE GLOBECOM 2009 Proceedings, [online], [retrieved on Oct. 23, 2012]. Retrieved from the Internet: <URL: http://202.194.20.8/proc/GLOBECOM2009/DATA/PID960701.PDF>, 6 pages.
Erlebach et al., "Path Splicing with Guaranteed Fault Tolerance", Dynamo 2009, Dagstuhl, Germany, [online], [retrieved on Nov. 26, 2012]. Retrieved from the Internet: <URL: http://cost295.lboro.ac.uk/docs/dagstuhl/files/erlebach.pdf>, 52 pages.
Atlas, Ed., "U-turn Alternates for IP/LDP Local Protection", [online], Jul. 8, 2004 [retrieved on Apr. 11, 2011]. Network Working Group, Internet-Draft, <draft-atlas-ip-local-protect-uturn-00>. Retrieved from the Internet: <URL: http://tools.ietf.org/html/draft-atlas-ip-local-protect-uturn-00>, pp. 1-30.
Thubert et al., U.S. Appl. No. 13/566,029, filed Aug. 3, 2012.
Atlas, Ed., "U-turn Alternates for IP/LDP Fast-Reroute", [online], Feb. 2006, [retrieved on Sep. 28, 2010]. Network Working Group, Internet-Draft, <draft-atlas-ip-local-protect-uturn-03>. Retrieved from the Internet: <URL: http://tools.ietf.org/html/draft-atlas-ip-local-protect-uturn-03>, pp. 1-29.
Winter, Ed., "RPL: Routing Protocol for Low Power and Lossy Networks", [online], Aug. 3, 2009, [retrieved on Apr. 11, 2011]. Network Working Group, Internet-Draft, <draft-ietf-roll-rpl-00>. Retrieved from the Internet: <URL: http://tools.ietf.org/html/draft-ietf-roll-rpl-00>, pp. 1-69.
Atlas, Ed. et al., "Basic Specification for IP Fast Reroute: Loop-Free Alternates", [online], Sep. 2008, [retrieved on Aug. 17, 2010]. Network Working Group, Request for Comments: 5286. Retrieved from the Internet: <URL: http://tools.ietf.org/html/rfc5286>, pp. 1-31.
Filsfils et al., "LFA applicability in SP networks", [online], Mar. 1, 2010, [retrieved on Aug. 29, 2011]. Network Working Group, Internet-Draft, <draft-filsfils-rtgwg-lfa-applicability-00>. Retrieved from the Internet: <URL: http://tools.ietf.org/html/draft-filsfils-rtgwg-lfa-applicability-00>, pp. 1-28.
Atlas et al., "Algorithms for computing Maximally Redundant Trees for IP/LDP Fast-Reroute", [online], Oct. 24, 2011, [retrieved on Nov. 30, 2011]. Routing Area Working Group, IETF Draft, <draft-enyedi-rtgwg-mrt-frr-algorithm-00>. Retrieved from the Internet: <URL: http://tools.ietf.org/id/draft-enyedi-rtgwg-mrt-frr-algorithm-00.txt>, pp. 1-40.
Nelakuditi et al., "Fast Local Rerouting for Handling Transient Link Failures", [online], 2007 [retrieved on Oct. 5, 2010]. Retrieved from the Internet: <URL: http://www.google.com/url?sa=t&source=web&cd=1&ved=0CBkQFjAA&url=http%3A%2F%2Fciteseerx.ist.

(56) References Cited

OTHER PUBLICATIONS psu.edu%2Fviewdoc%2Fdownload%3Fdoi%3D10.1.1.98.
5714%26rep%3Drep1%26type%3Dpdf&rct=j&q=%22Fast
%20Local%20Rerouting%20for%20Handling%20Transient
%20Link%20Failures%22%20&ei=JDKrTNO_MoPtOfeipYMH
&usg=AFQjCNGumjLmao_9ld5Weu4t0elEhqavmA
&sig2=crvLBVlfiA6AE8f_jYoGsA&cad=rja>, pp. 1-14.

* cited by examiner

State Table, 54

| | Figure 4A |
|---|---|
| 54 | Figure 4B |
| | Figure 4C |
| | Figure 4D |

Figure 4

| Event | Network Node under Analysis | Link Analysis, Status Change(s) | Node Status Change(s) |
|---|---|---|---|
| 200 | R | A→R; B→R | R=Root |
| 202 | A | A→R = Resolved (SPF); D→A = ?-A; C→A = ?-A | A = Heir |
| 204 | B | B→R = Resolved (SPF); K→B = ?-B; | B = Heir |
| 206 | K | K→B = SPF; M→K = ?-B; J→K = ?-B | |
| 208 | M | M→K = SPF; J→M = ?-B | |
| 210 | D | D→A = SPF; C→D = ?-A; E→D = ?-A; L→D = ?-A | |
| 212 | C | C→A = SPF; E→C = ?-A; F→C = ?-A | |
| 214 | L | L→D = SPF; E→L = ?-A | |
| 216 | E | E→C = SPF; F→E = ?-A; G→E = ?-A; H→E = ?-A | |
| 218 | F | F→C = SPF; H→F = ?-A; I→F = ?-A; J→F = ?-A | |
| 220 | N | N→L = Resolved | N = Leaf |
| 222 | G | G→E = SPF; H→G = ?-A | |
| 224 | H | H→F = SPF; I→H = ?-A | |
| 226 | I | I→F = SPF | |
| 228 | J | J→K = SPF, J→K = "Rev" (Reversible); M☐→J = ?-J | J = Edge Junction |

From Figure 4A

| | | | |
|---|---|---|---|
| 230 | K(J) | K→B = "Rev"; M→K = ?-K | K = Edge Junction (J→K=Rev); K=Intermediate Junction (K→B= Rev) |
| 232 | B(K, J) | (B→R Already Resolved) | B = Edge Junction, End of Arc |
| 234 | K(J) | (Resolve Next Endpoint M of link M→K) | |
| 236 | M(K, J) | M→K = Resolved (1st End of first collapsed arc ARC1) | M = Junction |
| 238 | K(M,K,J) | (No other links to analyze, return to M) | |
| 240 | M(K, J) | M→J = Resolved (2nd End of first collapsed arc ARC1: first collapsed arc ARC1 completed) | |

State Table, 54

From Figure 4B

State Table, 54

| | | | |
|---|---|---|---|
| 242 | K(J) | (No other links to analyze, return to J) | J=Intermediate Junction |
| 244 | J | J→F = Rev | F=Edge Junction |
| 246 | F(J) | F→C = Rev; E□→F = ?-F; H→F = ?-F; I→F = ?-F | C=Edge Junction |
| 248 | C(F, J) | C→A = Rev; D□→C = ?-C; E→C = ?-C | A=Edge Junction, End of ARC2 |
| 250 | A(C, F, J) | (A→R Already Resolved, First Infrastructure Arc ARC2 Formed) | D = Junction |
| 252 | D(A, C, F, J) | D→A = Resolved (1st end of second collapsed arc ARC3); D□→C = Resolved (Second Collapsed Arc ARC3 Formed)<br>L→D = ?-D; E→D = ?-D; E→L = ?-D; G→E = ?-D; H→G = ?-D; I→H = ?-D; and H→E = ?-D | |
| 254 | E(D, A, C, F, J) | E→C = Resolved (1st end of Second Infrastructure Arc ARC4); E→D = Resolved (1st end of Collapsed Arc ARC8); E→L = Rev | E=Junction |

From Figure 4C

| | | | |
|---|---|---|---|
| 256 | L(E, D, A, C, F, J) | L→D = Resolved (Second Infrastructure Arc ARC4 Formed) | L=Edge Junction |
| 258 | E(D, A, C, F, J) | E□→F = Resolved (Collapsed Arc ARC8 formed); G→E = ?-E; H→E = ?-E, H→G= ?-E, and I→H= ?-E | |
| 260 | G(E, D, A, C, F, J) | (no-op, return to E) | |
| 262 | E(D, A, C, F, J) | Call endpoint of H→E | |
| 264 | H(E, D, A, C, F, J) | H→F = Resolved (1d End of Infrastructure Arc ARC5, 1st End of Collapsed Arc ARC6); H→E = Resolved (2nd End of Collapsed Arc ARC6); H→G = Rev | H = Junction |
| 266 | G(H, E, D, A, C, F, J) | G→E = Resolved (2nd End of Infrastructure Arc ARC5 | G = Edge Junction |
| 268 | H(E, D, A, C, F, J) | I→H = ?-H | |
| 270 | I(H, E, D, A, C, F, J) | I→F = Resolved (1st End of Collapsed Arc ARC7); I→H = Resolved (2nd End of Collapsed Arc ARC7) | I = Junction |
| 272 | Return to J, Analysis Complete | | |

State Table, 54

Figure 4D

| Arc Topology for Root Node "R" | |
|---|---|
| Root Network Node | R |
| SPF Links | A→R; B→R; C→A; D→A; E→C; F→C; G→E; H→F; I→F; J→K; K→B; L→D; M→K; N→L |
| Junction Nodes | A, B, C, D, E, F, G, H, I, J, K, L, M |
| Leaf Nodes | N |
| Reversible Links | J→K; K→B; J→F; F→C; C→A; E→L; H→G |
| Arc Node Membership | ARC1: J-M-K<br>ARC2 (Base Arc to Root R): B-K-J-F-C-A<br>ARC3: A-D-C<br>ARC4: D-L-E-C<br>ARC5: E-G-H-F<br>ARC6: E-H-F<br>ARC7: H-I-F<br>ARC8: D-E-F |
| Arc Cursor Ownership | ARC1: M (collapsed)<br>ARC2: J<br>ARC3: D (collapsed)<br>ARC4: E<br>ARC5: H<br>ARC6: H (collapsed)<br>ARC7: I (collapsed)<br>ARC8: E (collapsed) |

Figure 5

| Multicasting Network Node | Pruning Action by Multicasting Node | Multicasted Set of Serialized Arcs | |
|---|---|---|---|
| 128a — Ω(R)→A; A→C; C→F; F→J; Ω(R)→B; B→K; K→J; | (None) | Ω=R: [J, E1, H1, M, D, H2, E2, I] | ←116a |
| 128b — A→D; C→D | Prune J, M | Ω=R: [E1, H1, D, H2, E2, I] | ←116b |
| 128c — C→E; F→E | Prune J, M, D | Ω=R: [E1, H1, H2, E2, I] | ←116c |
| 128d — F→H | Prune J, M, D, E1, E2 | Ω=R: [H1, H2, I] | ←116d |
| 128e — F→I | Prune J, M, D, E1, E2, H1, H2 | Ω=R: [I] | ←116e |
| 128f — D→E | Further Prune D | Ω=R: [E1, H1, H2, E2, I] | ←116f |
| 128g — D→L | Further Prune D, H1, H2, E2, I | Ω=R: [E1] | ←116g |
| 128h — L→E | Further Prune H1, H2, E2, I | Ω=R: [E1] | ←116h |
| 128i — E→G | Further Prune H1, H2, E2, I | Ω=R: [H1] | ←116i |
| 128j — E→H | Further Prune E1, E2 | Ω=R: [H1, H2, I] | ←116j |
| 128k — G→H | (None) | Ω=R: [H1] | ←116k |
| 128l — H→I | Further Prune H1, H2 | Ω=R: [I] | ←116l |
| 128m — K→M; J→M | Prune J, E1, H1, D, H2, E2, I | Ω=R: [M] | ←116m |

| Incoming | R_IF, R_HF, R_EF | R_JF | R_CF | R_CF_FRR | R_JF_FRR |
|---|---|---|---|---|---|
| Primary | R_FC | R_FC | R_FJ | R_FJ_FRR | R_FC_FRR |
| Backup | R_FJ | R_FJ_FRR | R_FC_FRR | <drop> | <drop> |

Figure 15

| Lambda ARC Reference | Serialized Arc Format |
|---|---|
| K1 | ([KJ1], {..., JK1, ..., Kn1, ..., JK2, ... }, [KJ2]) |
| K2 | ([KJ1], {..., Kn2, ...}, [KJ2]) |
| J1 | ([JK1], {...,Jn1, ...}, [JK2]) |
| J2 | ([JK1], {..., Jn2, ...}, [JK2]) |
| J3 | ([JF1], {..., KJ2, ..., KJ1, ..., Jn3, ... }, [JF2]) |
| J4 | ([JF1], {..., Jn4, ... }, [JF2]) |

Figure 19

| Ingress Router | (FJ1, FJ2) | (FJ1, FJ2) | (KJ1, KJ2) | (KJ1, KJ2) |
|---|---|---|---|---|
| Incoming Label | O_J | O_JRfrr | O_Jfrr | O_JR |
| Encapsulating (Lambda) Arc | J1 | J1 | J3 | J3 |
| Alternate Label | O_Jfrr | N/A | N/A | O_JRfrr |

| Egress Router | (JK1, JK2) | (JK1, JK2) | (JF1, JF2) | JF1, JF2) |
|---|---|---|---|---|
| Incoming Label | O_J | O_JRfrr | O_Jfrr | O_JR |
| Preferred Switch Label | O_K | O_KRfrr | O_Ffrr | O_FR |
| Encapsulating (Lambda) Arc | K1 (Alt. K2) | K1 (Alt. K2) | F1 (Alt. F2) | F1 (Alt. F2) |
| Alternate Label | O_Jfrr | N/A | N/A | O_JRfrr |

| Incoming Label | O_X | JUMP1 | JUMP2 | JUMP3 |
|---|---|---|---|---|
| Preferred Switch Label | O_x | O_y | O_z | O_XRfrr |
| Encapsulating (Lambda) Arc | x1 (Alt. x2) | y1 (Alt. y2) | z1 (Alt. z2) | Y1 (Alt. Y2) |
| Alternate Label | JUMP1 | JUMP2 | JUMP3 | O_Yfrr |

Figure 24

| intra-arc (iota) label (i) | ring (lambda) label (λ) | interring (omega) label (O) | packet payload 400 |
|---|---|---|---|

Figure 25

HIERARCHAL LABEL DISTRIBUTION AND ROUTE INSTALLATION IN A LOOP-FREE ROUTING TOPOLOGY USING ROUTING ARCS AT MULTIPLE HIERARCHAL LEVELS FOR RING TOPOLOGIES

TECHNICAL FIELD

The present disclosure generally relates to generating a loop-free routing topology in a computing network, such as an Internet Protocol (IP) network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Existing routing protocols assume recalculation of routes can be performed in response to a detected failure (e.g., loss of a link or a connecting network node); however, recalculation of routes requires computation time that likely results in a loss of data traffic. One attempt to accelerate responding to a detected failure includes "Loop Free Alternates" (LFA), where a router can respond to losing a next hop router in a path to a destination node by identifying a feasible successor for reaching the destination node, as long as the feasible successor does not create a loop by sending the packet back to the router. The IETF Draft by Atlas, entitled "U-turn Alternates for IP/LDP Local Protection (draft-atlas-ip-local-protect-uturn-00.txt)", illustrates in FIG. 3 of the IETF Draft a network topology where LFA solutions can be provided for the network nodes N2, N4, and R3 to forward a data packet to the destination node D in the event of a failed link, however, LFA cannot provide any solutions for any of the network nodes N3, S, P, R1, or R2. The IETF Draft by Atlas proposed a "U-turn protocol" to reverse a link; however, the U-turn protocol cannot provide any solution for the nodes P, R1, or R2 of FIG. 3 in the event of a link failure.

Another proposed routing protocol, referred to as "Fast Local Rerouting for Handling Transient Link Failures" (FIR) requires a complete recalculation of routes in response to a link failure, and hence recalculation of routes requires computation time that likely results in a loss of data traffic.

BRIEF DESCRIPTION OF THE DRAWINGS

Reference is made to the attached drawings, wherein elements having the same reference numeral designations represent like elements throughout and wherein:

FIG. 4 (consisting of FIGS. 4A, 4B, 4C and 4D) illustrate an example data structure in the memory circuit of the apparatus of FIG. 2 used for creation of a loop-free routing topology, according to an example embodiment.

FIG. 5 illustrates another example data structure in the memory circuit of the apparatus of FIG. 2 used for creation of a loop-free routing topology, according to an example embodiment.

FIG. 12 illustrates selective pruning of selected paths from the set of serialized representations propagated from the destination network node by network nodes within the loop-free routing topology, according to an example embodiment.

FIG. 15 illustrates an example label switched forwarding table built in one of the network nodes of FIG. 6I for routing at a primary hierarchal level, according to an example embodiment.

FIG. 19 illustrates a serialized arc representation of the secondary routing arcs of FIG. 18, according to an example embodiment.

FIG. 20 illustrates an example multi-level hierarchy label switched forwarding table implemented in ingress routers of one of the network nodes of FIG. 18 having a ring-based network having a prescribed ring topology, according to an example embodiment.

FIG. 21 illustrates an example multi-level hierarchy label switched forwarding table implemented in egress routers of one of the network nodes of FIG. 18 having the ring-based network, according to an example embodiment.

FIG. 24 illustrates an example multi-level hierarchy label switched forwarding table implemented in the edge junction of FIG. 22, according to an example embodiment.

FIG. 25 illustrates an example encapsulation of a data packet with a primary hierarchal level switching label for a destination network node, a secondary hierarchal label switch label for a secondary routing arc within one of the network nodes having a prescribed ring topology, and a tertiary hierarchal level switching label for reachability along the secondary routing arc, according to an example embodiment.

DESCRIPTION OF EXAMPLE EMBODIMENTS

Overview

Figure 1:
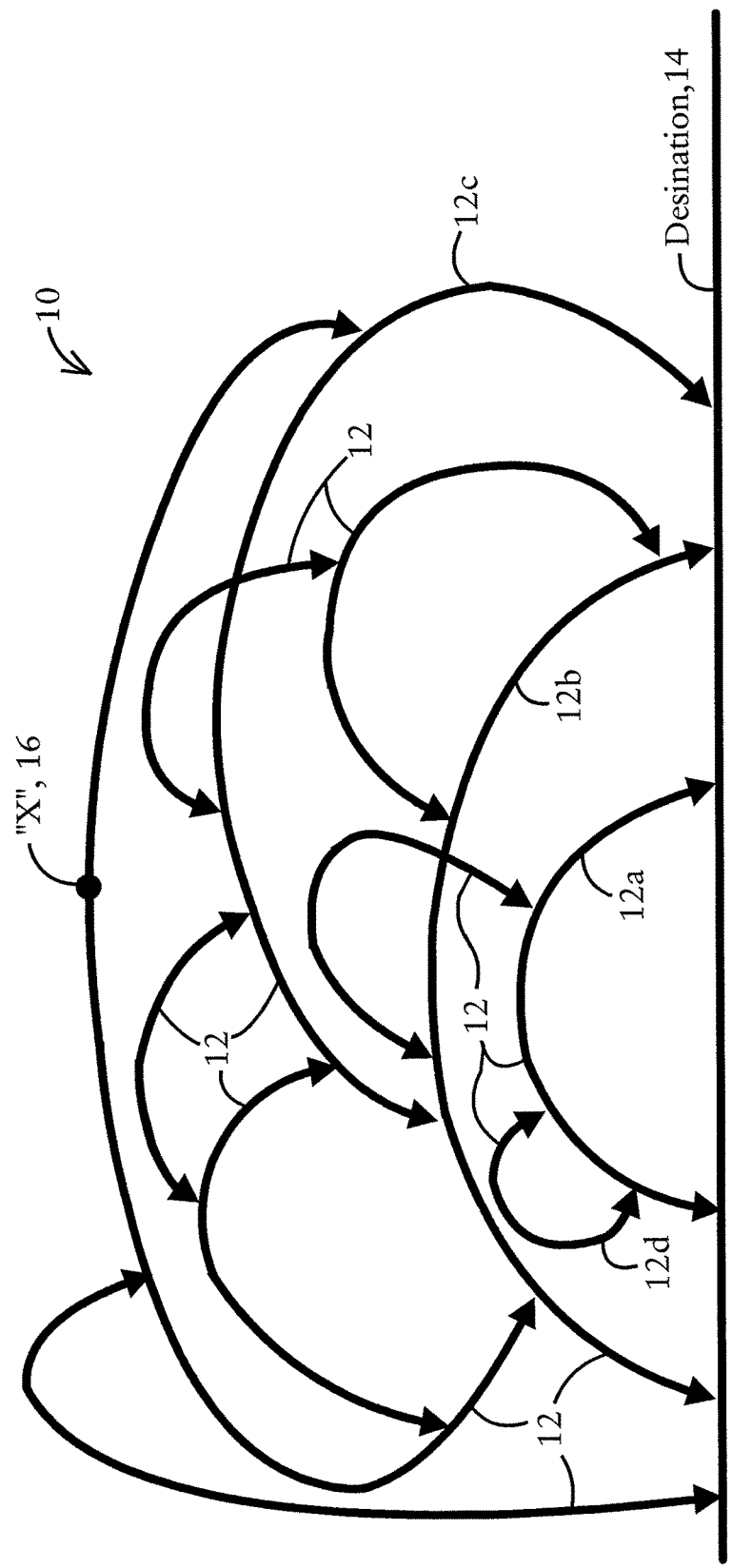
FIG. 1 illustrates an example loop-free routing topology comprising a plurality of routing arcs for reaching a destination network node, according to an example embodiment.

In one embodiment, a method comprises creating, in a computing network, a loop-free routing topology comprising a plurality of routing arcs for reaching a destination network node, each routing arc comprising a first network node as a first end of the routing arc, a second network node as a second end of the routing arc, and at least a third network node configured for routing any network traffic along the routing arc toward the destination node via any one of the first or second ends of the routing arc, at least one of the first, second, or third network nodes are implemented as a ring-based network having a prescribed ring topology; and establishing loop-free label switched paths for reaching the destination network node via the routing arcs of the loop-free routing topology, the label switched paths independent and distinct from any attribute of the prescribed ring topology.

In another embodiment, a method comprises receiving, by a router, a data packet destined for a destination network node in a loop-free routing topology in a computing network, the loop-free routing topology comprising a plurality of routing arcs for reaching the destination network node, each routing arc comprising a first network node as a first end of the routing arc, a second network node as a second end of the routing arc, and at least a third network node configured for routing any network traffic along the routing arc toward the destination node via any one of the first or second ends of the routing arc, at least one of the first, second, or third network nodes implemented as a ring-based network having a prescribed ring topology containing the router; and the router adding to the data packet a primary hierarchal level switching label providing a loop-free label switched path for reaching the destination network node via the routing arcs of the loop-free routing topology, each of the label switched paths in the loop-free routing topology independent and distinct from any attribute of the prescribed ring topology.

DETAILED DESCRIPTION

Particular embodiments enable efficient network traffic management toward a destination network node in a loop-free routing topology having distinct paths, such as routing arcs, that enable the network traffic to be routing along any of two ends of any path. The particular embodiments apply the use of routing arcs in a multi-level hierarchy, where each hierarchy level of routing arcs is independent and distinct from any other hierarchy level. Each routing arc at a given hierarchy level is implemented using a plurality of loop-free label switched paths for reaching an end of a routing arc via multiple available paths. Each hierarchy level represents a corresponding additional level of abstraction (or implementation), where the primary hierarchal level represents a primary hierarchy of network nodes arranged into primary routing arcs for reaching a destination network node, at least one of the network nodes implemented as a ring-based network having a prescribed ring topology; a second hierarchal level can represent a secondary hierarchy of secondary routing arcs in a ring-based network of one of the network nodes in the primary hierarchal level, each secondary routing arc providing reachability from the corresponding ring-based network to an adjacent network node in the primary hierarchal level; and a third hierarchal level of tertiary routing arcs can provide reachability within one of the secondary routing arcs to the adjacent network node. The third hierarchal level of tertiary routing arcs are independent and distinct from the second hierarchal level of secondary routing arcs overlying the tertiary routing arcs, and the second hierarchal level of secondary routing arcs are independent and distinct from the primary hierarchal level of routing arcs for reaching a destination network node.

Further, data packets traverse the loop-free routing topology based on implementing label switched paths in each of the primary hierarchal level (referred to as omega switched paths), the second hierarchal level (referred to as a lambda switched paths), and the third hierarchal level (referred to as iota switched paths), where a router can push a secondary hierarchal label switch label (a lambda label) for reaching an adjacent network node in the primary hierarchal level, and selectively push a tertiary hierarchal label switch label (an iota label) for reaching a router along a secondary routing arc via one of the tertiary routing arcs. The iota label can be swapped with another iota label as the data packet is passed to another tertiary routing arc, or the iota label can be popped based on the data packet reaching an end of the secondary routing arc; the lambda label can be popped at the data packet reaches the end of the lambda switched path at the adjacent network node in the primary hierarchal level, enabling the router connecting the current (ring-based) network node and the adjacent network node to swap the omega label for the next hop along the omega switched path in the omega routing arc.

Hence, the use of routing arcs in a multi-level hierarchy, plus the use of label switched paths within the multilevel hierarchy (e.g., omega switched paths, lambda switched paths, and iota switched paths) enables resilient route computation inside ring-based networks and between ring-based networks, where the path computations for the different hierarchical levels are independent and distinct. Hence, the example embodiments provide a fractal analysis of route computation that provides multiple loop-free resilient paths throughout multiple heterogeneous networks with minimal complexity.

Since the path computations for the different hierarchical levels are independent and distinct, the following description will begin with describing creation of a plurality of primary routing arcs (omega arcs) at the primary hierarchal level of the loop-free routing topology, followed by a description of establishment of the omega label switched paths for reaching a destination network node. The description of the omega arcs and the omega label switched paths are described with respect to FIGS. 1 through 15. The description of the lambda arcs and associated lambda switched paths and the iota arcs and associated iota switched paths will be described with respect to FIGS. 16 through 27.

Generating the Primary Hierarchal Level of the
Loop-Free Topology Using Primary Routing Arcs FIGS. 1 through 6I describe the generation of a primary hierarchal level of primary routing arcs in loop-free topology using routing arcs, according to an example embodiment. Routing arcs can be generated in a loop-free routing topology that can guarantee that any network node having at least two data links can reach the destination network node via at least one of the routing arcs: the network traffic can be instantaneously rerouted toward another end of a routing arc in response to detected data link failure (or network node failure), based on reversing an identified reversible link within the routing arc. The reversal of the identified reversible link within the routing arc also is guaranteed to not introduce any loops into the loop-free routing topology.

In one embodiment, the loop-free routing topology is represented by generating a set of serialized representations describing the loop-free routing topology. In particular, each serialized representation describes one of the paths (e.g., routing arcs), in the loop-free routing topology; for example a serialized representation of a given path or routing arc can resemble a source route path from one end of the path (e.g., a first junction node of a routing arc) to another end of the path (e.g., a second junction node of a routing arc). Hence, the set of the serialized representations provides a complete representation of all the paths in the loop-free routing topology.

Moreover, any network node receiving the set of serialized representations can establish multiple paths for reaching the destination network node, for example in the form of loop-free label switched paths for reaching the destination network node. Hence, the propagation of the serialized representations throughout the network nodes in the computing network enables the automatic deployment of label switched paths by the network nodes.

In particular, the following description with respect to FIGS. 1 through 6I describe an apparatus creating, in a computing network, a loop-free routing topology comprising a plurality of routing arcs for reaching a destination network node: each routing arc comprises a first network node as a first end of the routing arc, a second network node as a second end of the routing arc, and at least a third network node configured for routing any network traffic along the routing arc toward the destination network node via any one of the first or second ends of the routing arc.

A junction node is defined as a network node (e.g., a computing network having a prescribed network topology, for example a prescribed ring topology) identified based on its relative position within a network topology) that has at least two data links providing respective non-congruent paths for reaching the destination network node: the term "non-congruent" in this specification and the attached claims requires that the paths from a junction node do not share any common data link for reaching the destination network node, rather each link belonging to one path (from the junction node to the destination network node) is distinct and independent of any link belonging to the second non-congruent path (from the junction node to the destination network node).

A data link of a junction node also can be deemed a "reversible link" if the data link enables an endpoint of the data link (i.e., a network node that is directly coupled to the junction node via the data link) to become a junction node having its own non-congruent paths for reaching the destination network node.

In one embodiment, one or more junction nodes coupled by a reversible link can be logically connected in sequence to create a routing arc as a first infrastructure arc having its two corresponding ends terminating at the destination network node. Additional routing arcs can be created that have at least one end terminating in a previously-created infrastructure arc (e.g., the first infrastructure arc), and the other end terminating in either a previously-created infrastructure arc or the destination network node, where each new routing arc includes network nodes that are distinct from any of the network nodes in previously-generated routing arcs. In other words, a network node assigned to one existing routing arc cannot later be assigned to another routing arc (except if the network node is a junction between the existing routing arc and an end of the newer routing arc).

In another embodiment, a routing arc can be created as an infrastructure arc based on identifying, within a first directed acyclic graph for reaching the destination network node, one or more junction nodes having reversible links for reaching the destination network node via non-congruent paths; a second routing arc can be created based on identifying, within the first directed acyclic graph, a second directed acyclic graph for reaching one of the junction nodes (as one end of the second routing arc) of the first directed acyclic graph, and identifying within the second directed acyclic graph a new junction node having a new non-congruent path for reaching the destination network node that is distinct from the one junction node, the new junction node providing the new non-congruent path via the second end of the second routing arc that terminates either at the destination network node or a previously-created infrastructure routing arc.

Hence, example embodiments enable any network node having two data links in the loop-free routing topology to be guaranteed reachability to the destination network node, even if any one data link in the loop-free routing topology encounters a failure, based on reversing an identified reversible link.

FIG. 1 illustrates an example loop-free routing topology 10 comprising a plurality of routing arcs 12 for reaching a destination network node 14, according to an example embodiment. Each routing arc 12 comprises a plurality of network nodes 16 each having at least two data links for reaching adjacent network nodes. As apparent from FIG. 1, the loop-free routing topology 10 guarantees that any network node 16 along any point of any arc 12 (illustrated by "X" in FIG. 1) has at least two non-congruent paths for reaching the destination network node 14, guaranteeing reachability to the destination network node 14 even if a link failure is encountered in the loop-free routing topology 10. The term "node" in the specification and claims can refer to a network device or a network having a prescribed topology, for example a ring-based network having a prescribed ring topology.

As described in further detail below with respect to FIGS. 6A-6I, each routing arc (e.g., "ARC1" of FIG. 6I) 12 comprises at least three network nodes 16, namely a first network node (e.g., network node "K" of FIG. 6I) 16 designated as a first end of the routing arc, a second network node (e.g., network node "J" of FIG. 6I) 16 designated as a second end of the routing arc, and at least a third network node (e.g., network node "M" of FIG. 6I) 16 identified as a junction node and configured for routing any network traffic along the routing arc toward the destination network node 14 via any one of two available non-congruent paths provided by the first or second ends of the routing arc. Hence, network traffic can be forwarded along at least one of the routing arcs 12 to the destination network node 14.

Figure 6A:
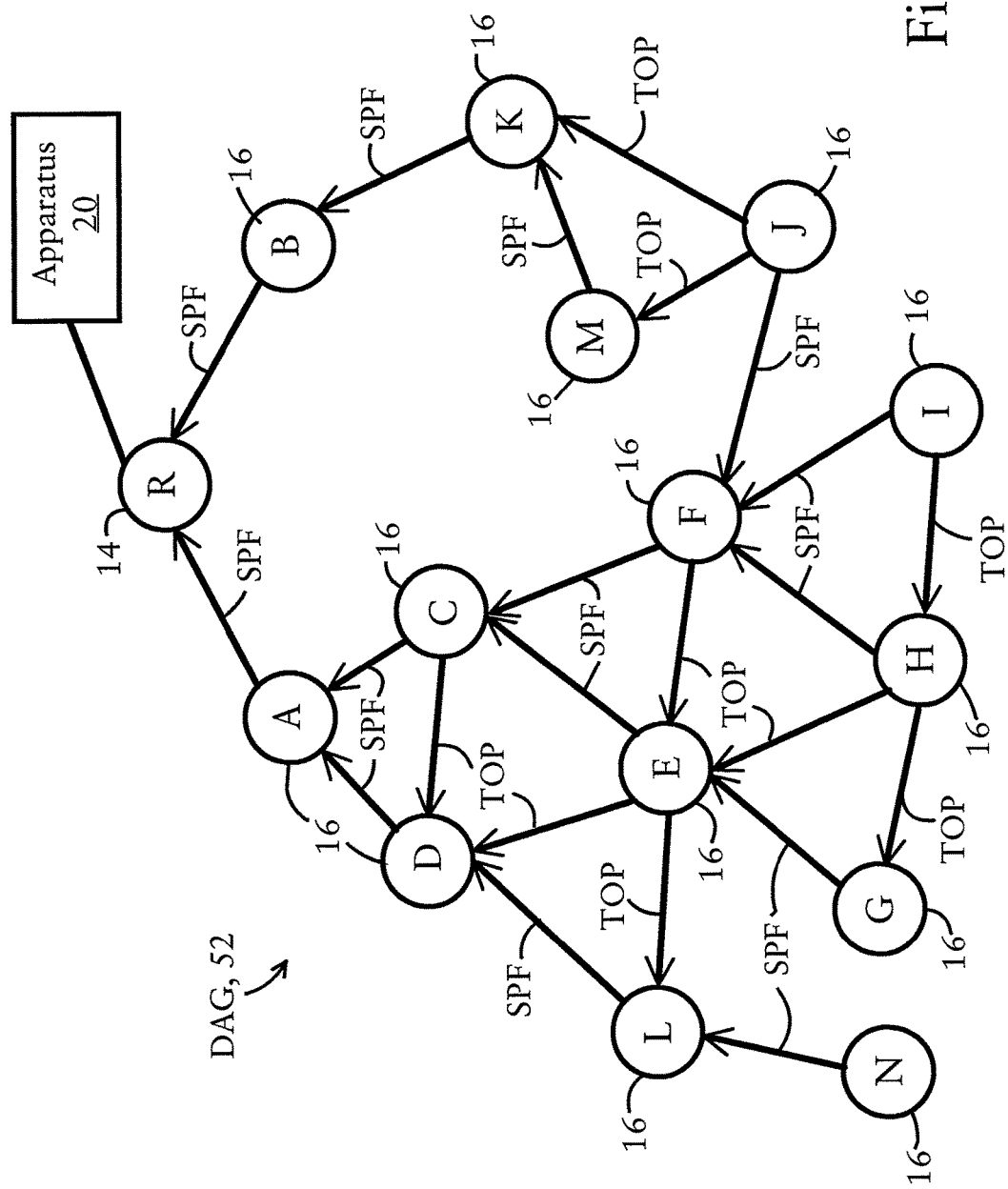
FIGS. 6A-6I illustrate an example sequence of constructing, from the link layer network of FIG. 2, the loop-free routing topology having a plurality of paths (e.g., routing arcs), according to an example embodiment.
Figure 6B:
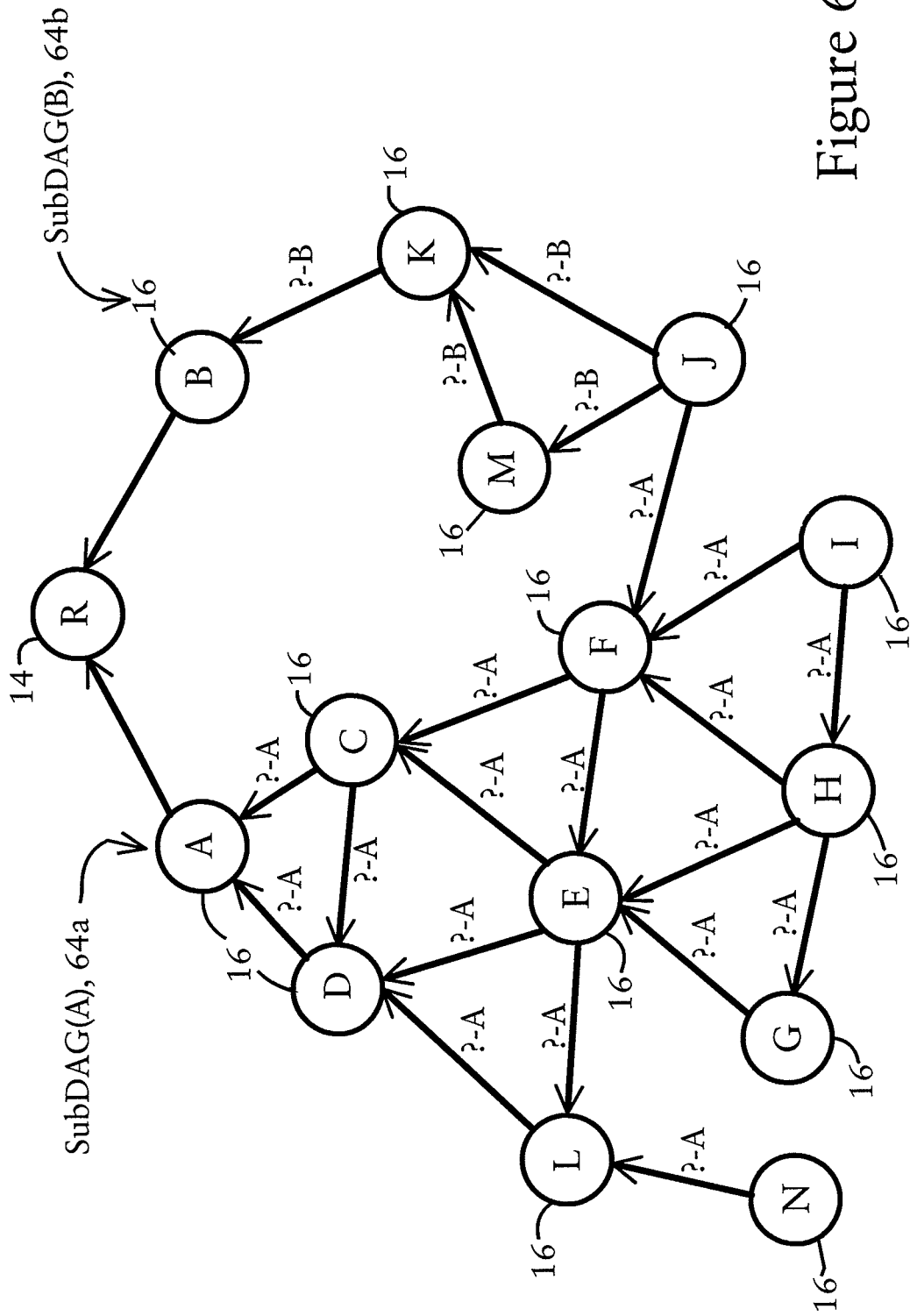
Figure 6C:
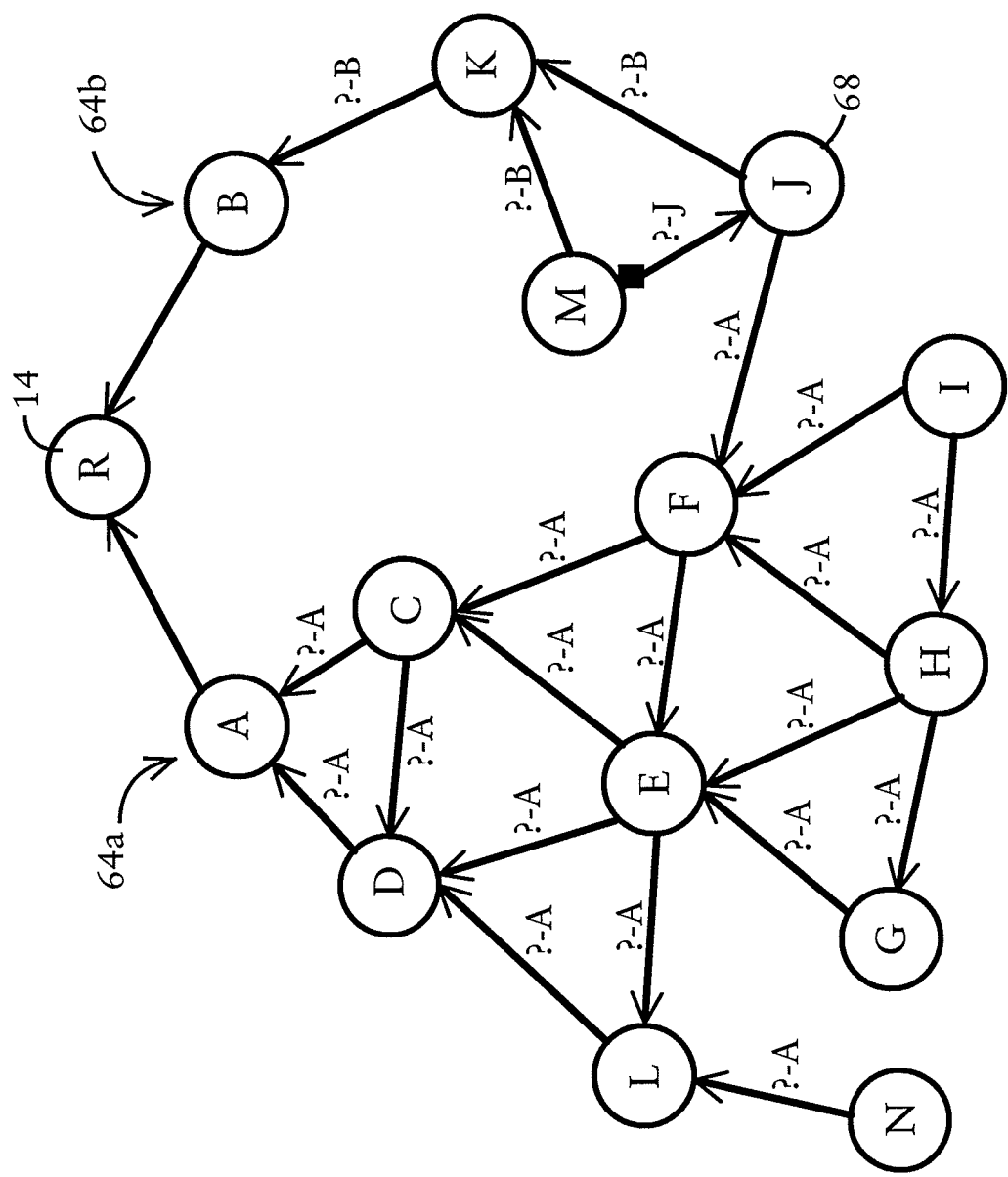
Figure 6D:
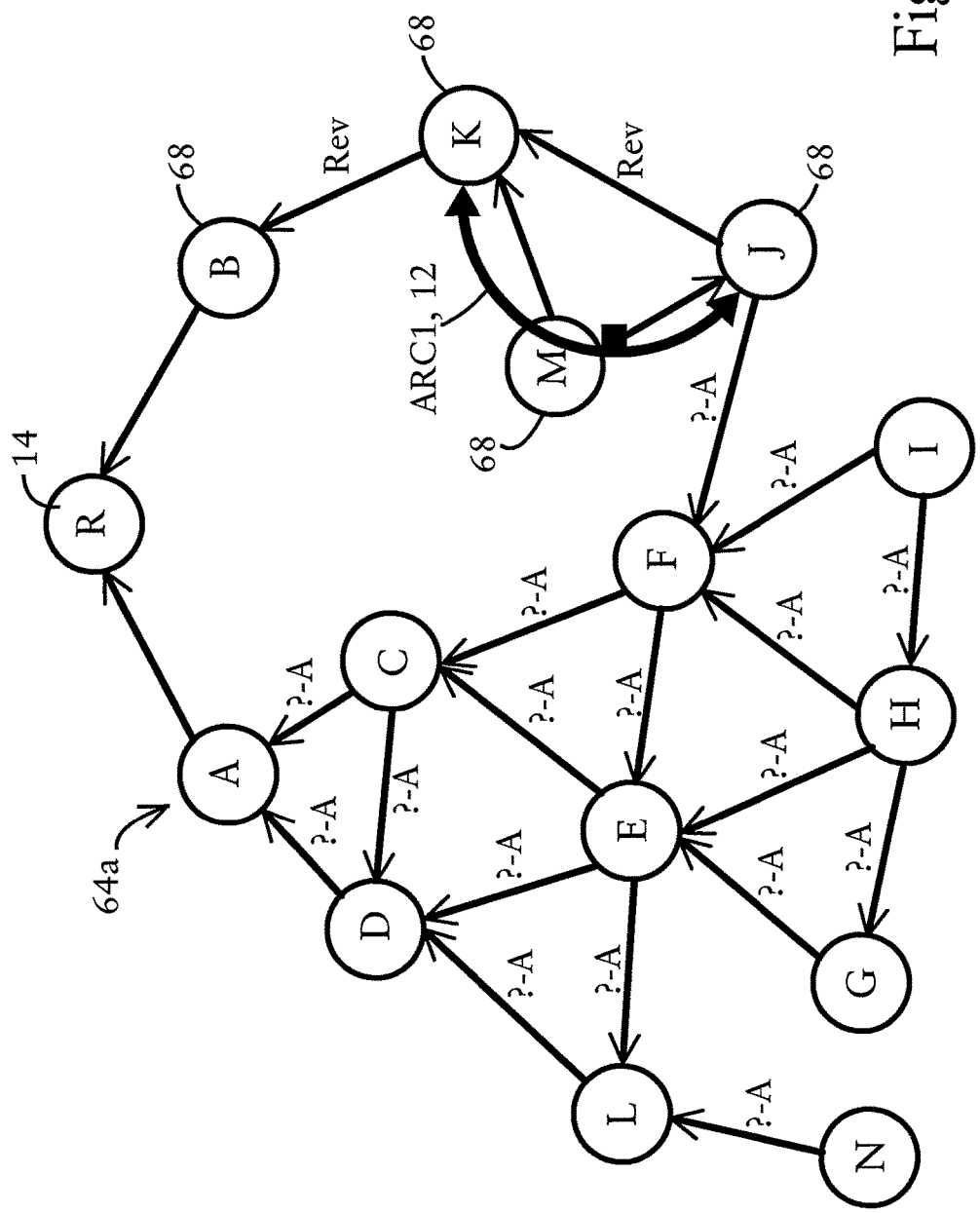
Figure 6E:
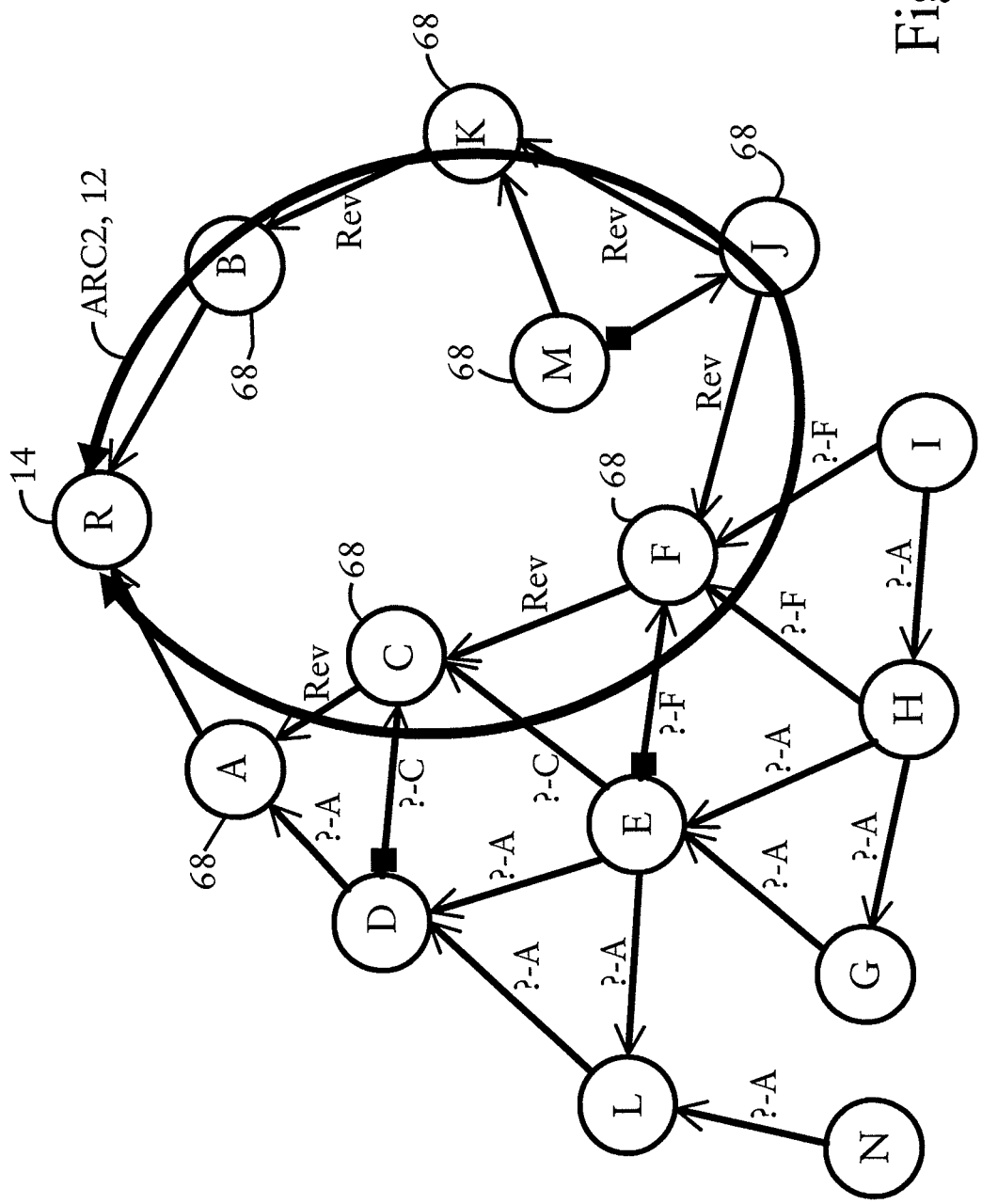
Figure 6F:
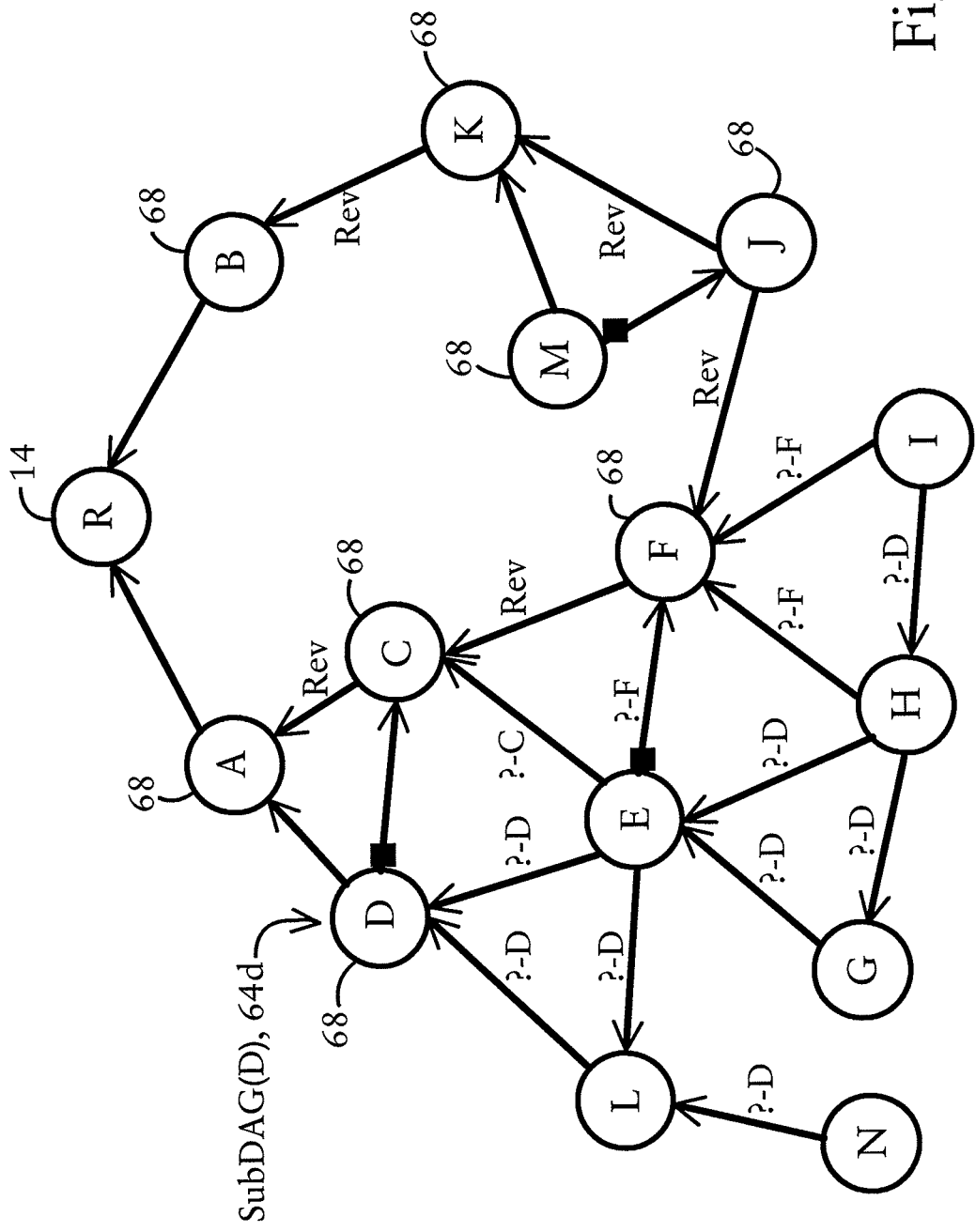
Figure 6G:
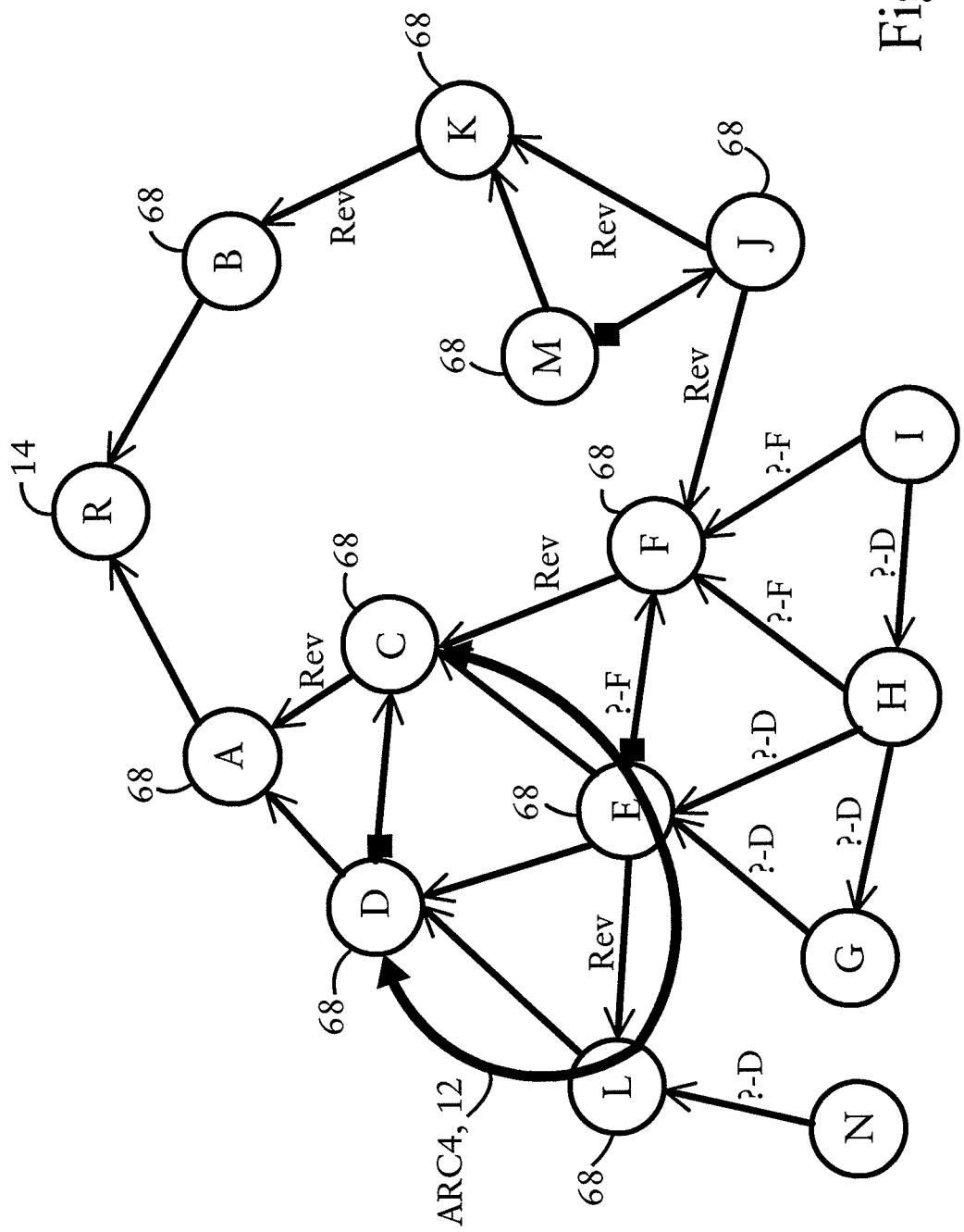
Figure 6H:
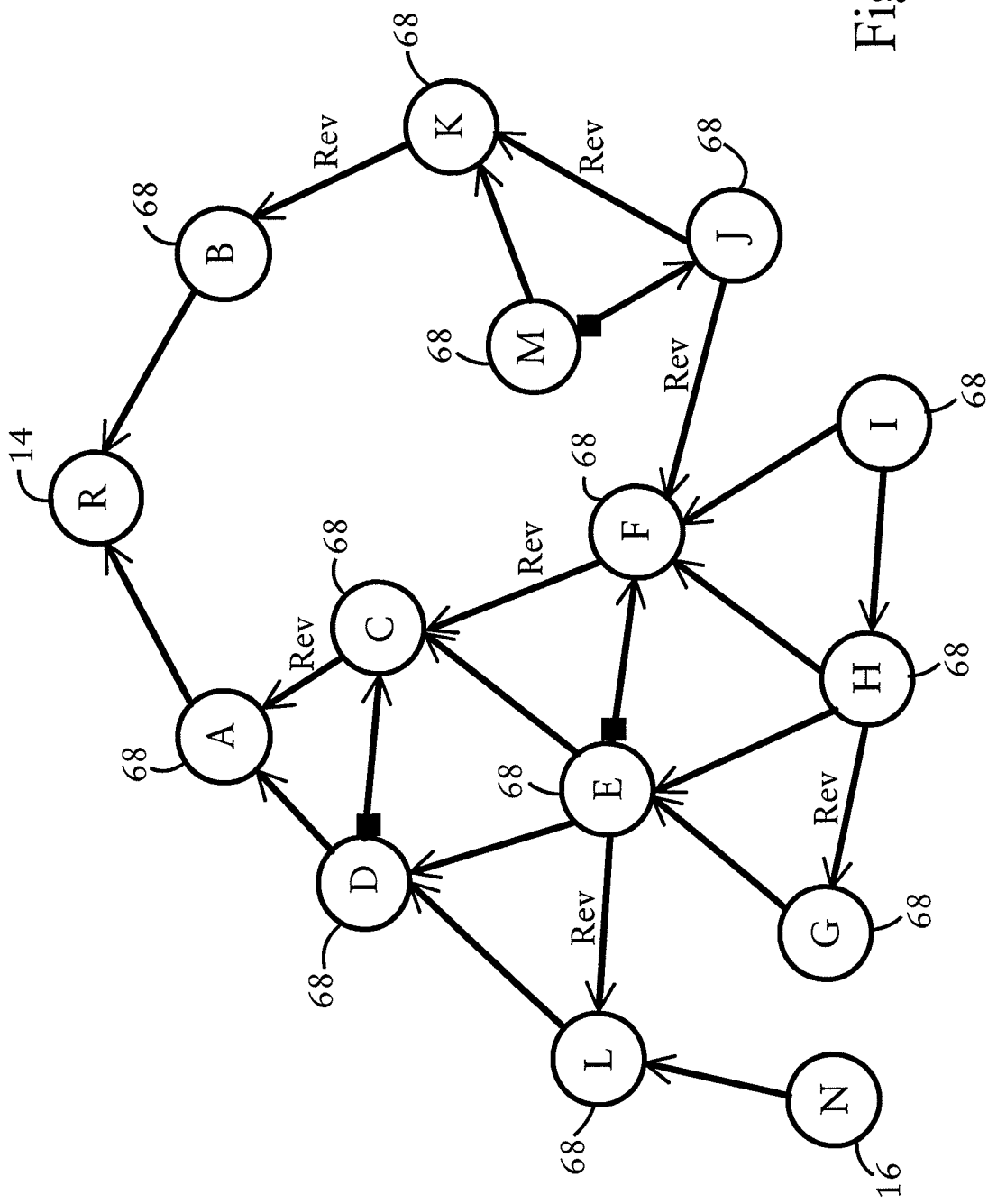
Figure 6I:
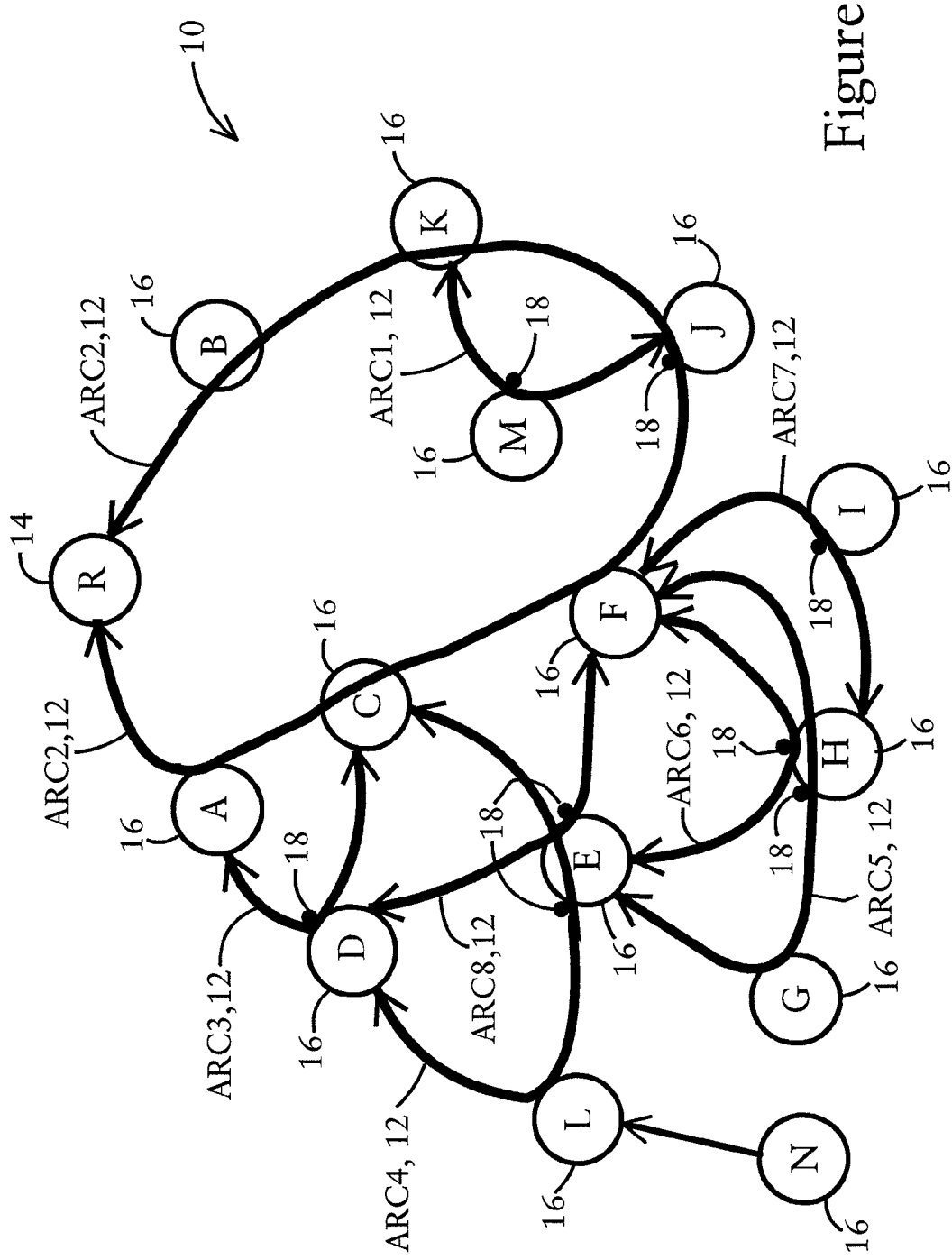

As illustrated in FIG. 6I, the first and second ends of each routing arc 12 each terminate at a "safe network node", for example either the destination network node 14, another network node directly coupled to the destination network node (e.g., network node "A" or network node "B"), or a junction node of another routing arc. A network node (e.g., "A" of FIG. 6I) directly coupled to the destination network node "R" 14 is referred to as an "heir network node". Hence, a "safe network node" can be any one of the destination network node 14, an heir network node (e.g., "A" or "B" of FIG. 6I), or a junction node having two non-congruent paths for reaching the destination network node. For example, both ends of the routing arc "ARC2" 12 terminate at the destination network node "R" 14, also referred to as the "root network node" or "root node"; a first end of the routing arc "ARC3" 12 terminates at the heir network node "A" 16, and a second end of the routing arc "ARC3" 12 terminates at the junction node "C" of the routing arc "ARC2" 12. The routing arc "ARC2" 12 also can be referred to as the "root arc", since both ends of the routing arc "ARC2" 12 terminate at the destination network node "R" 14

In an example embodiment illustrated in FIG. 5 and FIG. 6I, each routing arc comprises one and only one arc cursor (18 of FIG. 6I) that provides exclusive control of directing the network traffic along the routing arc. One and only one junction node of the routing arc (i.e., one and only one network node assigned a position within the routing arc as a junction node) has possession of the arc cursor 18 at any given time: the junction node having possession of the arc cursor 18 can control the network traffic along the corresponding routing arc 12 based on possession of the arc cursor 18. In particular, the junction node (e.g., "J" of FIG. 6I) having possession of the arc cursor 18 can direct network traffic away from itself along either of its outwardly-oriented links toward the ends of the routing arc (e.g., "ARC2") 12. Hence, a junction node having possession of the arc cursor 18 (also referred to as an "arc cursor node") has exclusive control over routing the network traffic along the corresponding routing arc, based on the junction node routing the network traffic away from itself along one of its outwardly-oriented links.

A second junction node (i.e., another network node a position within the routing arc as a junction node) can gain possession of the arc cursor (e.g., from the first junction node of the routing arc) based on a detected failure in the corresponding routing arc, for continued routing of the network traffic in the corresponding routing arc despite the detected failure. For example, the junction node "F" of the routing arc "ARC2" 12 can gain possession of the corresponding arc cursor 18 that was previously owned by the junction node "J", based on a detected failure in the link "F-C" between network nodes "F" and network node "C", enabling the network node "F" to reverse the link "F-J" toward the node "J" for continued reachability toward the destination network node "R" 14 (see FIGS. 6H and 6I). Hence, the second junction node (e.g., "F" of FIGS. 6H and 6I), upon gaining possession of the arc cursor 18 that provides exclusive control of directing the network traffic along the routing arc (e.g., "ARC2") 12, can reverse one of the connected reversible links without creating a loop in the loop-free routing topology 10. Hence, data traffic along a routing arc (e.g., "ARC2") 12 can be instantaneously rerouted for continued routing in the routing arc 12 toward the destination network node 14 in response to a detected failure in the routing arc (e.g., failure in link "F-C"), based on a junction node (e.g., "F") in the routing arc gaining possession of the routing arc 18 previously owned by another junction node (e.g., "J") in the same routing arc 12.

Figure 2:
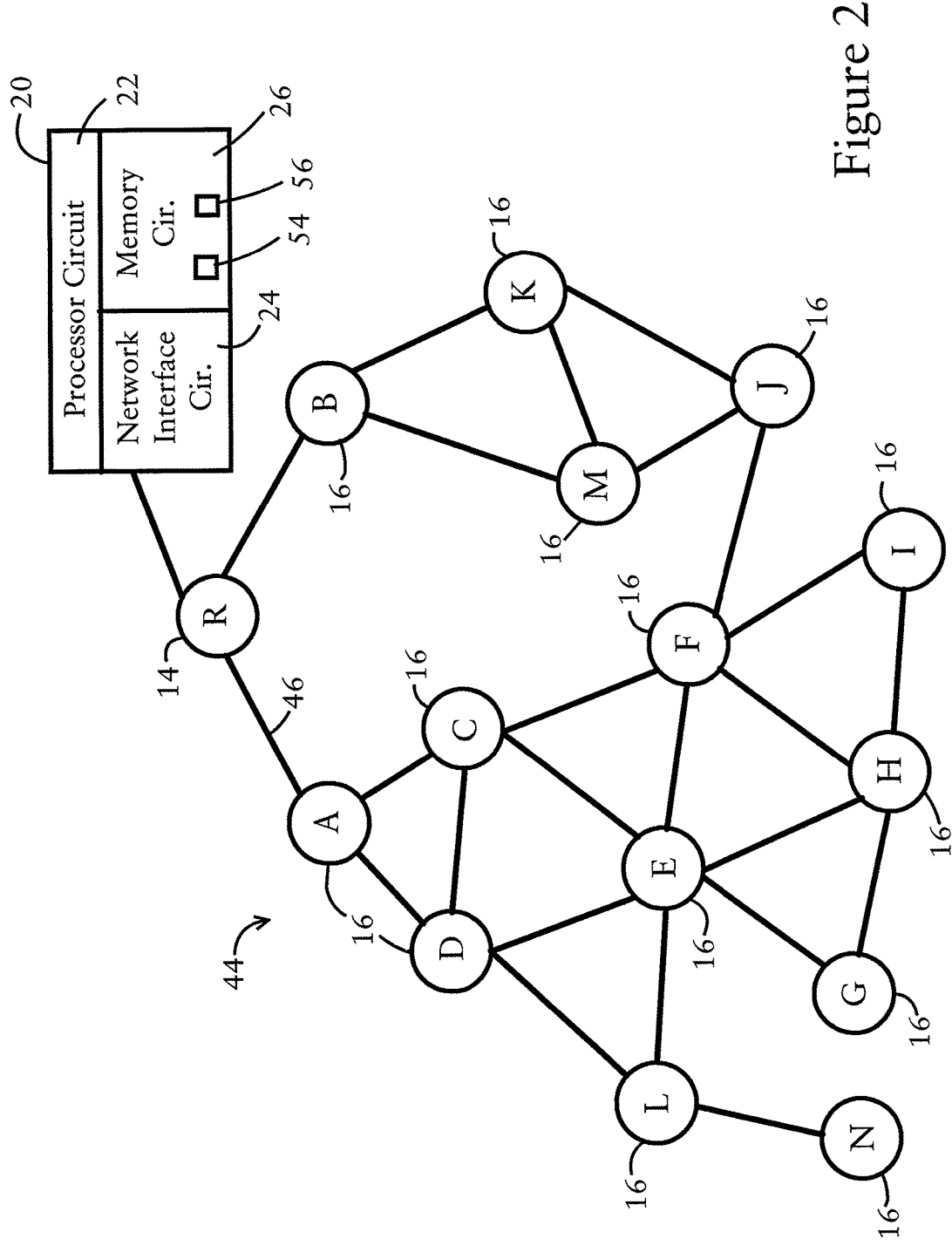
FIG. 2 illustrates an example apparatus for creating a loop-free routing topology in a link layer network of network nodes coupled by data links, according to an example embodiment.

FIGS. 2 and 6A illustrate an example apparatus 20 for creating the loop-free routing topology 10 of FIGS. 1, 6I, and 16-25, according to an example embodiment. The apparatus (i.e., device, machine) can be implemented as a router, a centralized server, a network management entity, etc. that executes the disclosed operations for creating the loop-free routing topology 10, and distributing relevant routing arc parameters to each of the network nodes implementing the loop-free routing topology 10 as network nodes 16 within the topology 10. The apparatus 20 is a physical machine (i.e., a hardware device) configured for implementing network communications with other physical machines 14, 16 via data links establishing a link layer mesh topology network 44 (see FIG. 2).

As illustrated in FIG. 2, the apparatus 20 includes a processor circuit 22, a device interface circuit 24, and a memory circuit 26. The processor circuit 22 is configured for creating, for a computing network, the loop-free routing topology 10 comprising the routing arcs 12 for reaching the destination network node 14. The memory circuit 26 is configured for storing parameters associated with the routing arcs 12 in a state table 54 and/or a topology table 56, described in further detail below with respect to FIGS. 4 and 5. The device interface circuit 24 is configured for outputting at least selected parameters associated with the routing arcs 12 to a second apparatus, for deployment of the loop-free routing topology 10: the second apparatus can be a network management entity for configuring the network nodes 16, or at least one of the network nodes 16 that can be configured directly by the apparatus 20. Hence, the output by the device interface circuit 24 of the selected parameters for deployment of the loop-free routing topology 10 causing the network traffic in the computing network to be forwarded along at least one of the routing arcs to the destination network node.

Any of the disclosed circuits of the apparatus 20 (including the processor circuit 22, the device interface circuit 24, the memory circuit 26, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 26) causes the integrated circuit(s) implementing the processor circuit 22 to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 26 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (e.g., in a receive buffer). Also note that the memory circuit 23 can be implemented dynamically by the processor circuit 22, for example based on memory address assignment and partitioning executed by the processor circuit 22.

The following definitions are provided prior to a description of the methods for creating the routing arcs.

A routing arc is defined as a double ended reversible path. A reversible arc is defined as a routing arc containing one or more reversible links, and the reversible arc can contain one or more non-reversible links at each end of the arc. Data links that are labeled "Rev" in FIGS. 6B through 6H are reversible links, and links that are not labeled "Rev" in FIGS. 6B through 6H are not reversible; hence, the end of a routing arc can be identified based on one or more successive non-reversible links, with one or more reversible links internal to the non-reversible links. A collapsed arc (e.g., "ARC1", "ARC3", "ARC6", "ARC7", and "ARC8" of FIG. 6I) is defined as a routing arc 12 having no reversible link and consisting of a one network node that has fixed (i.e., non-transferable) possession of the arc cursor 18, and two other network nodes 16 nodes serving as respective ends of the collapsed arc. For example, the collapsed arc "ARC1" 12 is illustrated in FIG. 5 and FIG. 6I as consisting of the network nodes "J", "M", and "K", where the network node "M" has fixed possession of the arc cursor 18 between the network nodes "J" and "K" at the respective ends of the collapsed arc "ARC1" 12.

A link designated with an arrow at one end and having a designation of "SPF" represents a link as found in a tree generated according to a conventional routing protocol such as Open Shortest Path First (OSPF), such that the network node at the end of the arrow represents a shortest path first (SPF) successor of the network node at the tail end of the arrow (e.g., network node "A" in FIG. 6A is the SPF successor to network nodes "C" and "D"). Any link at the edge of the arc (i.e., that terminates the arc and connects the arc either to a second arc or to the destination) will be designated using the arrow at one end. A link designated with "TOP" (representing "then other path") represents a link that has not been chosen by OSPF because it is not the shortest path successor, but that can be used as an alternate next hop (i.e., a feasible successor), for example for generating a directed acyclic graph (DAG) (see, e.g., U.S. Pat. No. 7,656,857).

As described previously, the network node having possession of the arc cursor can decide in which direction along the arc network traffic should be forwarded. Hence, a network node is determined to be a "safe network node" if the "safe network node" can forward network traffic in either direction along the arc (i.e., the "safe network node" can safely forward any packet in one direction along the arc even if the other direction fails).

A link designated with the reference "?-S" represents a candidate link that is unresolved for a junction node "S" that is identified as the nearest safe network node for the network node via the link having the designation "?-S": reference to a candidate link denotes a transient state when the two ends of a routing arc have not yet been established, and it is not yet established whether the candidate link is to be used in the formation of a routing arc. As described in further detail below with respect to FIGS. 6B-6F, the links designated with the reference "?-S" also identify a subDAG (i.e., a DAG within a DAG) for reaching the safe node "S".

A link designated with the reference "Rev" indicates a reversible link connecting two network nodes that are within a routing arc 12: as illustrated in FIGS. 6H and 6I, a network node (e.g., "J") having at least one reversible link is within the middle of the arc, and can have possession of the arc cursor 18 for the corresponding routing arc. As illustrated in FIGS. 6H and 6I, data links at the edge of a routing arc (e.g., that terminates at a first arc and enters into a second arc, or that terminates at the destination node D) are directed away from the middle of the routing arc (and the junction node having possession of the corresponding arc cursor 18) 12, and the data links at the edge of a routing arc 12 are not reversible.

A link designated with a square-shaped or diamond-shaped block at one end (e.g., "M☐→J" in FIG. 6C) indicates a blocked link that is not reversible, where the destination network node (e.g., network node "J" in FIG. 6C) cannot send any data traffic to the other sourcing network node (e.g., "M" of FIG. 6C), but the sourcing network node (e.g., "M" of FIG. 6C) can send data traffic to the destination network node ("J") via the link ("M☐→J"). Blocked links are used during computation to prevent any formation of loops.

As described in further detail below, data links are oriented away from the junction node having possession of the arc cursor toward the edges of the routing arc 12, and link orientation of a reversible link can be changed by moving the arc cursor 18 (i.e., passing ownership of the cursor from one network node to another network node).

Routing arcs 12 are built between network nodes identified as junction nodes. A junction node 68 is a network node connected to two or more safe network nodes (described below) over non-congruent paths (i.e., no single point of failure can stop reachability from the junction node to the root node). An edge junction is defined as a junction node 68 terminating one and only one reversible link, where the edge junction can have multiple nonreversible links oriented both inwards and/or outwards. An intermediate junction is defined as a junction node 68 that terminates two and only two reversible links, where all other links coupled to the intermediate junction are oriented inwards to avoid loops: a link can be safely reversed towards an intermediate junction. Hence, an intermediate junction consists of two reversible links and zero or more inward oriented links from any other network node. A collapsed arc does not have any intermediate junction, and an edge junction can belong to one or more collapsed arcs.

A root network node 14 is defined as a single network node in a network (i.e., a "destination network node") that must be accessed to reach a resource, i.e., there never can be a second path that can bypass the root network node to reach the resource. Calculation of routing arcs 12 begins with identification of a root node (i.e., the destination node) 14 for a given routing topology 10. Examples of a root node 14 can include a head end of an autonomous directed acyclic graph within the routing arcs 12, a gateway to another network, or any identifiable destination. All of the root links always are oriented inwards toward the root node 14 and resolved.

An "heir" network node is a network node that is directly connected to a root network node 14. As illustrated in FIGS. 1 and 6A-6I, a destination network node serving as a root network node 14 must have at least two heir network nodes (e.g. network nodes "A" and "B" of FIGS. 6A-6I) that are directly connected to a root network node 14: if a root network node has only one heir node, then the heir network node is designated as the new root node (based on the definition of a root network node as having no second path to reach a resource). The heir network node is used to identify a safe network node: if a network node can reach the root node alternatively via either a first heir network node or a second heir network node, then the network node is considered a safe network node because it can route a packet to the root via two non-congruent paths, namely either via the first heir network node or via the second heir network node, guaranteeing that reachability if one of the links toward the root node is broken.

A leaf network node is a node that has one and only one data link: a leaf node cannot be a junction node and cannot belong to a routing arc 12. The data link coupled to the leaf network node is always oriented outwards (i.e., away from the leaf network node) and resolved.

A safe network node is a designation used to identify any one of a root network node 14, an heir node (e.g., "A" or "B" of FIGS. 6A-6I), or a junction node. Hence, a junction node is a network node that is neither a root network node 14 nor an heir network node, but that is a safe network node because it has two or more non-congruent paths to the root network node such that no single point of failure can cut off the junction node from the root network node. A network node can be identified as a junction node if the direction of a reversible link must be turned to obtain the alternate path.

Hence, a network node connected to an heir network node and the root network node is a junction node; a network node connected to two different heir network nodes is a junction node; a network node connected to an heir network node and a junction node also is a junction node; a network node connected to two different junction nodes also is a junction node. Since the root network node, the heir network node, and the junction node each are defined as safe network nodes, then a network node connected to two different safe network nodes is a junction node; a network node that has non-congruent paths to at least two different safe network nodes is a junction node (the junction node can be considered to "see" to safe network nodes, and then hide them so long as they are only reachable from via that junction node); a network node that can only see one junction node is within the "subDAG" that junction node and can be tracked as such.

Hence, a data packet must follow along a routing arc 12, and can exit a routing arc 12 only via an edge junction at one of the ends of the routing arc 12. Consequently, a data packet can reach the root node (i.e., the destination node) 14 based on traveling along one or more routing arcs 12.

Figure 3A:
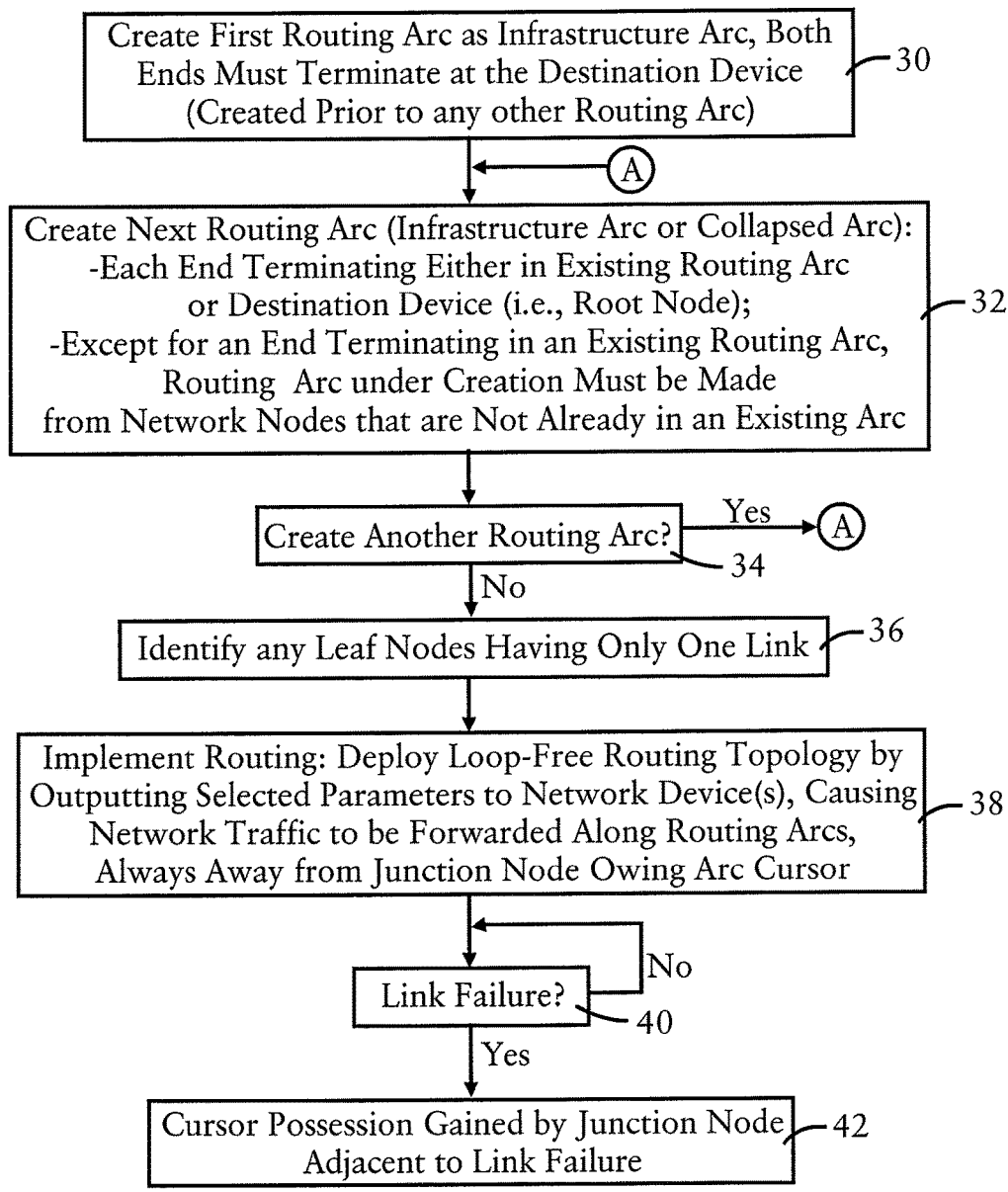
FIGS. 3A, 3B, 3C and 3D illustrate example methods for creating a loop-free routing topology, according to an example embodiment.
Figure 3B:
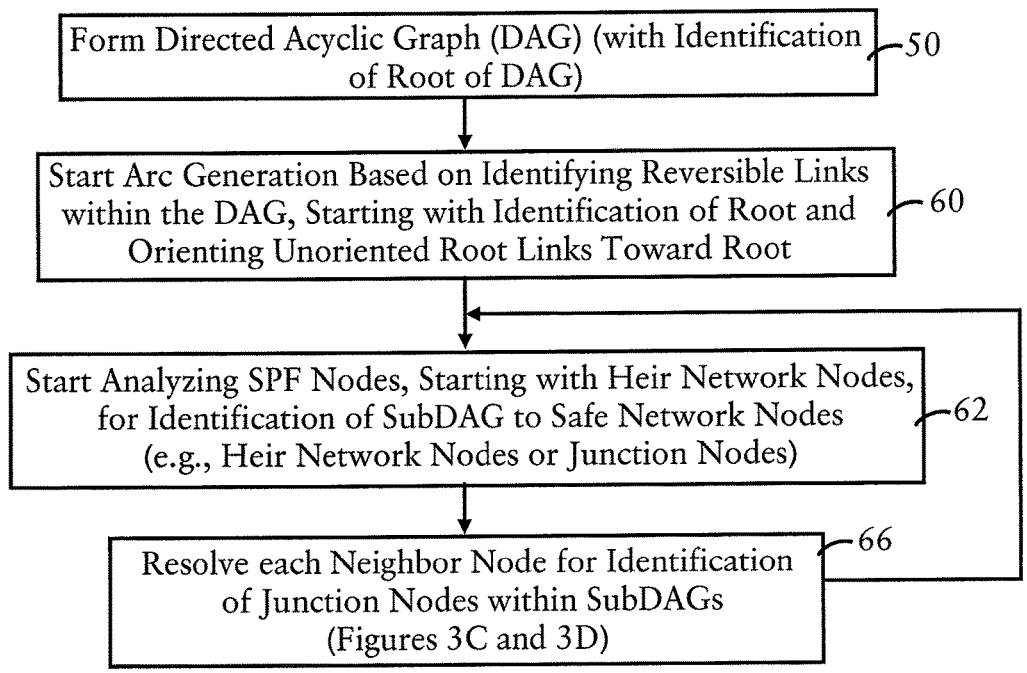
Figure 3C:
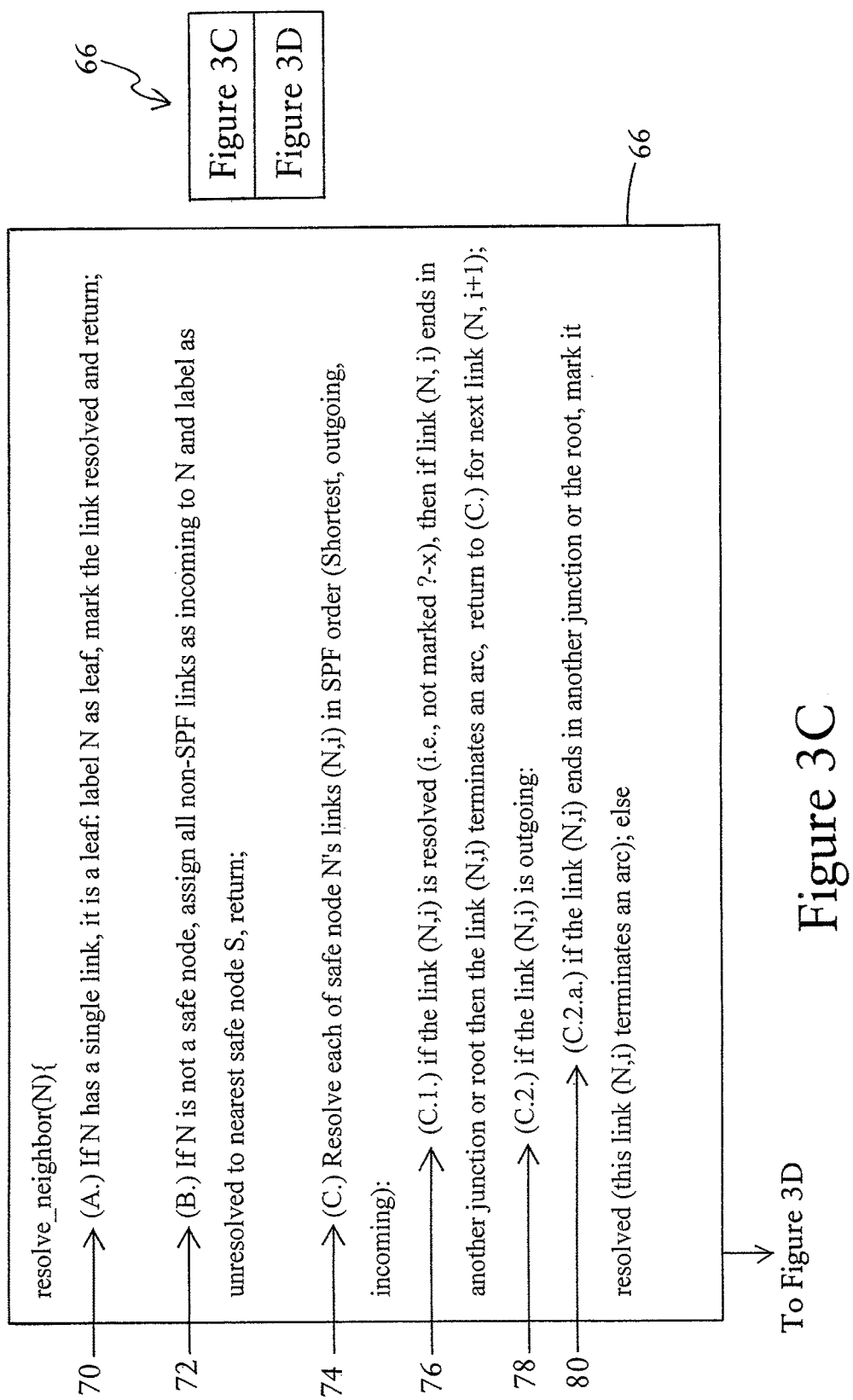
Figure 3D:
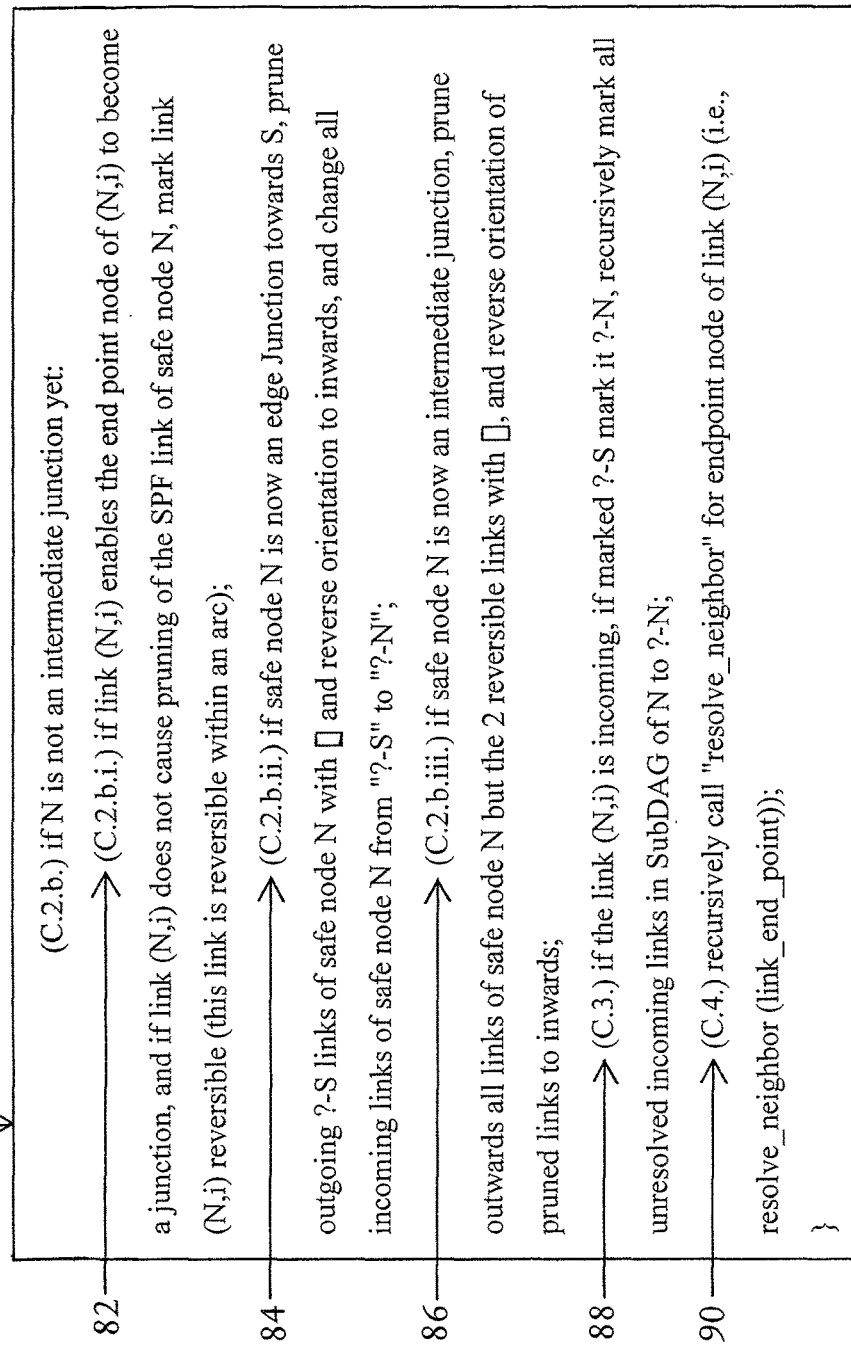

FIG. 3A is a diagram illustrating an example method by the apparatus 20 of FIG. 2 that includes creating a loop-free routing topology 10 comprising routing arcs 12 for reaching a destination network node 14, according to an example embodiment. FIGS. 3B, 3C and 3D illustrate an alternate method by the apparatus 20 for creating the loop-free routing topology 10, according to another example embodiment. The operations described with respect to any of the Figures (e.g., FIGS. 3A-3D, FIGS. 8-11, 13, and 26-27, described below) can be implemented as executable code stored on a computer or machine readable non-transitory tangible storage medium (e.g., floppy disk, hard disk, ROM, EPROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Referring to FIG. 3A, the processor circuit 22 can create the loop-free routing topology 10 based on creating in operation 30 the first routing arc 12 as an infrastructure arc (i.e., a routing arc that is not a collapsed arc): the first routing arc 12 (e.g., 12a or 12b of FIG. 1) created in operation 30 must have both ends terminating at the destination network node (i.e., the root node) 14. The processor circuit 22 can create in operation 32 the next routing arc 12 (after the first routing arc 12a or 12b created in operation 30) as an infrastructure arc (e.g., 12c after 12b) or a collapsed arc (e.g., 12d after 12a), subject to the following rules: (1) the next routing arc 12 under construction must terminate either in the junction node of an existing routing arc or at the destination network node 14 (e.g., routing arc 12c terminates one end at the routing arc 12b and terminates the other end at the destination network node 14); and (2) except for an end of a routing arc terminating in the junction node of an existing routing arc, the routing arc under creation must be made from network nodes that are not already in an existing routing arc; in other words, in rule (2) the next routing arc 12 includes network nodes that are distinct from any of the network nodes of the existing routing arcs. The next routing arc 12 can be constructed by the processor circuit 22 in operation 34, until all the routing arcs have been completed for all network nodes having at least two data links. The processor circuit 22 identifies in operation 36 any leaf network nodes consisting of only one data link, and implements in operation 38 the loop-free routing topology 10 constructed in operations 30, 32, 34, and 36.

As illustrated operations 30, 32, and 34, the first routing arc 12 (e.g., 12a or 12b) preferably is created prior to any other routing arc 12 (e.g., 12c or 12d); however, the routing arcs 12 in FIG. 1 can be created in any arbitrary order, so long as the rules of operation 32 are followed to guarantee no loop formation, where the "existing routing arc" refers to a set of network nodes that already are allocated for another routing arc. Hence, alternative techniques for creating the loop-free routing topology 10 can be utilized, so long as: the routing arcs 12 do not intersect across each other during formation; or any routing arcs 12 that intersect across each other share the same cursor at the intersection point (e.g., a collapsed arc), causing all network traffic to be directed away from the cursor point.

The processor circuit 22 can deploy in operation 38 the loop-free routing topology 10 based on causing the device interface circuit 24 to output at least selected parameters associated with the routing arcs 12 to at least one other apparatus (e.g., a network router, a network management apparatus, one or more network nodes, etc.), causing the network traffic in the routing topology 10 to be forwarded along at least one of the routing arcs 12 to the destination network node 14. If in operation 40 a link failure is detected (or a network node failure) in one of the routing arcs, for example by either the apparatus 20 or by one of the network nodes 14 or 16, the possession of the arc cursor 18 can be gained (e.g., by transfer, reassignment, etc. by the processor circuit 22) by the junction node adjacent to the link failure in operation 42, enabling the junction node to control the network traffic based on reversing one of the reversible links for continued routing toward the destination network node 14 without creating a loop in the loop-free routing topology 10.

FIGS. 3B, 3C and 3D illustrate an example method by the processor circuit 22 for creating the loop-free routing topology 10 comprising the routing arcs 12 of FIG. 6I, according to an example embodiment.

According to an example embodiment, a loop-free routing topology 10 can be created in which an attempt is made to establish every network node, except the root network node and the heir network nodes, as junction nodes, in order to guarantee that every network node has a shortest path and an alternate path to a destination network node (i.e., the root network node) 14. This guarantee is established by creating routing arcs 12 that terminate at safe network nodes. Since conventional techniques for generating a directed acyclic graph (DAG) does not guarantee that every node within a directed acyclic graph can be a junction, the example embodiments enable a link to be reversed in response to a detected failure in a network node or network link, enabling immediate rerouting of data traffic without route recalculation and without the formation of any loop in the topology. Hence, the example embodiment can establish a loop-free routing topology of routing arcs for reaching a root network node, the loop-free routing topology consisting of a root network node, two or more heir network nodes coupled to the root network node, junction nodes, and zero or more leaf network nodes.

As described in further detail with respect to FIGS. 3B, 3C, 4-5 and 6A-6I, the loop-free routing topology 10 is created based on: generating a first directed acyclic graph for reaching the destination network node 14; identifying (within the first directed acyclic graph) junction nodes that have non-congruent paths for reaching the destination network node 14; identifying reversible links between the junction nodes, along the non-congruent paths, and that do not introduce or create a loop in the loop-free routing topology 10; and identifying at least one second directed acyclic graph within the first directed acyclic graph (also referred to as a "subDAG") for reaching one of the junction nodes, the second directed acyclic graph including an identified new junction node having a new non-congruent path for reaching the destination network node.

In this disclosure, links can be identified by the connecting network nodes, such that the link "A-R" refers to a wired or wireless link that connects the network node "A" to the next hop network node "R": an arrow in a link designation can refer to an assigned direction (e.g., "A→R" and "R←A" equivalently identify a link directing traffic from node A to node R), whereas the absence of an arrow in a link designation (e.g., "A-R") indicates that a direction has not yet been assigned to the link.

Referring to FIGS. 2 and 3B, the processor circuit 22 identifies the data link layer topology 44 (FIG. 2) composed of wired or wireless data links (e.g., wired or wireless IEEE 802.11, Bluetooth, etc.) 46, and creates in operation 50 a directed acyclic graph (DAG) 52 for reaching the destination network node 14, illustrated in FIG. 6A. In particular, the link layer topology 44 of FIG. 2 includes network nodes 14 having one or more link layer connections (e.g., wired or wireless IEEE 802 links, Bluetooth links, etc.) interconnecting the network nodes, for example in the form of a link layer (i.e., OSI Layer 2) mesh of interconnected network nodes. The directed acyclic graph 52 is generated in operation 50 by the processor circuit 22, for example according to the techniques described in U.S. Pat. No. 7,656,857, where the links labeled "SPF" identify the Shortest Path First (SPF) links in the SPF topology, and the links labeled "TOP" identify the "then other path" (TOP) links overlying the SPF topology that result in the formation of the directed acyclic graph (DAG) toward the root node "R". In summary, the directed acyclic graph is formed by the processor circuit 22 in operation 50 based on identifying next hop nodes adjacent to the root node 14, and orienting the link of each next hop node toward the root. Secondary adjacent nodes (adjacent to each of the next hop nodes) are then identified, and the paths from the next hop nodes to the associated secondary adjacent nodes are extended while orienting each of the links between the secondary adjacent nodes and the next hop nodes toward the next hop nodes. These operations are repeated recursively until the paths extend to the furthest nodes in the network, and orienting the links back toward the root, for formation of the directed acyclic graph.

The SPF status of the SPF links are retained in the memory circuit 26 during calculation of the routing arcs 12 with respect to FIGS. 6A-6I. FIG. 4 (consisting of FIGS. 4A, 4B, 4C and 4D) illustrate an example state table 54 that can be stored in the memory circuit 26 and configured for storing state changes in the network nodes and the data links during execution of the method in FIGS. 3B, 3C and 3D.

FIG. 5 illustrates an example topology table 56 that can be stored in the memory circuit 26 and configured for storing arc topology attributes as the routing arcs are constructed for reaching the destination network node (i.e., root network node "R") 14. The processor circuit 22 can update the topology table 56 of FIG. 5 as the state table 54 is updated (e.g., upon identification of SPF links, identification of reversible links, identification of junction nodes 68, upon creating a routing arc, etc.), where the ownership of an arc cursor 18 is identified by the junction node 68 having the two outwardly oriented reversible links. Hence, the processor circuit 20 stores in operation 50 the SPF links 58 in the topology table 56, and the non-SPF links (not shown in FIG. 5).

As illustrated in FIG. 6A, none of the network nodes in the DAG topology 52 (except the network node "J") has at least two non-congruent paths for reaching the root node "R". Hence, the method of FIGS. 3B, 3C and 3D provides the creation of the routing arcs 12 in a loop-free routing topology 10, the routing arcs enabling network traffic to be routed along the routing arcs toward the destination root network node via any one of the ends of the routing arcs.

After formation of the directed acyclic graph in operation 50, the generation of the routing arcs begins in operation 60 of FIG. 3B, where the SPF links are retained, while selectively modifying non-SPF links in the directed acyclic graph as either unidirectional links or reversible links. The status of each network node and each data link can be stored in a memory circuit.

The generation of the routing arcs in operation 60 begins with identification of the root network node R and orienting unoriented links toward the root (A→R, B→R) as illustrated by the state change in the state table of FIG. 4A at event 200, and initiating identification of the heir network nodes (e.g., node A) in operation 62. As described in further detail below, the SPF nodes are successively analyzed by the processor circuit 22 in operation 62 for identification of subordinate directed acyclic graphs (subDAGs) 64 (e.g., 64a and 64b of FIG. 6B) within the DAG 52 toward the destination network node 14. Each heir network node link (e.g., A-R) that is coupled to the root network node 14 is oriented outward toward the root network node and marked in the state table 54 as resolved (A→R=Resolved) (event 202 of FIG. 4A). Each neighbor network node is successively resolved in operation 66 to identify any junction node within a subDAG 64 that has an alternate non-congruent path for reaching the destination network node 14 via a path that is distinct from the subDAG 64; in other words, each neighbor network node 16 is successively resolved to identify, within a subDAG 64, any junction nodes having at least two non-congruent paths for reaching the destination network node.

FIGS. 3C and 3D illustrate in further detail the operations executed by the processor circuit 22 in operation 66. The operations of FIGS. 3C and 3D are illustrated in the example form of "C code" for a function call entitled "resolve_neighbor(N)", annotated with outline annotations to identify nested operations. The apparatus 20 is omitted in FIGS. 6B through 6I and FIG. 7 to simplify the illustrations, although it will be apparent that the apparatus 20 will be consistently present during calculation of the routing arcs 12 and creation of the loop-free routing topology 10 (and load balancing of the loop-free routing topology 10 as described below with respect to FIGS. 7-9).

The first operation in operation 70 is executed by the processor circuit 22 if the neighbor node "N" under analysis is a leaf network node consisting of one and only one data link. In this example, the current state of execution is state 202 of FIG. 4A, where the heir network node "A" is under analysis; hence, operation 70 is skipped because the heir network node A is not a leaf node. Operation 72 is executed by the processor circuit 22 if the neighbor node "N" under analysis is not a safe node. In this current state of analyzing the heir network node "A", operation 72 is skipped because the heir network node A is a safe network node (because it is an heir network node).

As described previously, the method executed by the processor circuit 22 attempts to identify adjacent network nodes that are safe network nodes. Hence, any of the links (N-i) in the safe network node under analysis (e.g., Node N=Node A) that have not yet been labeled (i.e., are unlabeled) (e.g., D→A, C→A), are set initially to an unresolved status toward the nearest safe node (D→A="?-S"; C→A="?-S") to indicate that it has not yet been determined whether the links (e.g., D→A, C→A) couple the network node (e.g., node A) to another safe network node that enables the link to be reversible, or whether the links couple the network node to an unsafe network node (i.e., a network node that is not a safe network node as previously defined).

Each of the links (N-i) of the safe network node under analysis (e.g., node N=node A) are resolved in operation 74 in order according to SPF identification, namely links providing shortest path first, followed by outgoing links, followed by incoming links. If in operation 76 a data link is already resolved, the execution by the processor circuit 22 proceeds to the next link in operation 74: note that the link A→R is resolved and ends in the root network node 14, identifying the link A→R as terminating a routing arc 12. Operations 78 through 86 are currently skipped by the processor circuit 22 because the safe network node under analysis (e.g., node N=node A) has no other unresolved outgoing links. The processor circuit 22 returns to the next link in operation 74, namely the incoming links.

If in operation 88 the processor circuit 22 determines the unresolved link under analysis (which is not an SPF link or an outgoing link) has no assigned direction, the link is assigned an incoming direction to direct traffic toward the safe network node under analysis (e.g., Node N=Node A). If the incoming link (e.g., D→A based on the initial directed acyclic graph) is marked to an unresolved status (e.g., D→A="?-S"), the incoming link is marked to an unresolved status with respect to the safe network node under analysis (i.e., the link D→A is reset from "?-S" to "?-N"). Hence, the link "D→A" is reset to the status "?-A" (Node N=Node A: D→A="?-A"); the process is repeated in operations 74 and 88 by the processor circuit 22 for the next link of node A, hence the link "C→A" is reset in operation 88 to the status "?-A" (C→A="?-A"), indicating that it has not yet been determined whether the links "D→A" and "C→A" are reversible to reach another safe network node (the links are oriented toward the nearest safe network node). Hence, the unresolved status indicates that a routing arc cannot be formed yet because the unresolved link has not been found to be reversible toward an alternate non-congruent path to the root network node. All the unresolved incoming links in the subDAG toward the safe network node "N" (Node N=Node A) are recursively relabeled in operation 88, resulting in the identification of subDAG(A) 64a of FIG. 6B via the links labeled "?-A".

After all the links for the safe network node under analysis (e.g., Node N=Node A) have been analyzed, the process of operations 62 and 66 of FIG. 3B are repeated by the processor circuit 22 for the next node having the shortest path (in the SPF computation of operation 50) to the root network node "R" that has not yet been analyzed (e.g., heir network node "B") (event 204 of FIG. 4A). The network node "B" is identified by the processor circuit 22 as an heir network node in operation 62, and the root link "B→R" is identified by the processor circuit 22 as an SPF link and oriented toward the root network node, and marked in the state table 54 and the topology table 56 as a resolved SPF link in operation 62. As illustrated by the execution by the processor circuit 22 of operation 66 in FIGS. 3C and 3D, since network node "B" is identified as an heir network node (and therefore a safe network node) having an additional incoming link "K-B", operations 70 and 72 are skipped by the processor circuit 22, and the processor circuit 22 changes the status of the link "K→B" in operation 88 in the state table 54 from "?-S" to "?-B" (K→B="?-B"). The remaining incoming links are recursively resolved toward the nearest safe node "B", resulting in the subDAG(B) 64b of FIG. 6B.

Processing continues by the processor circuit 22 in operation 62 of FIG. 3B to the next node identified by the SPF computation as closest to the root network node "R" that has not yet been analyzed, namely the network node "K" (event 206 of FIG. 4A). Operation 70 of FIG. 3C is skipped because the network node "K" is not a leaf node. Hence, the network node "K" is not a safe network node because it does not yet have two non-congruent paths to the root network node "R", rather the network node "K" currently has only the SPF link "K→B" to the safe network node "B". Hence, all the non-SPF links (e.g., M-K and J-K) are assigned by the processor circuit 22 to be oriented incoming to the current network node "K" under analysis, and the links are labeled by the processor circuit 22 in operation 72 as unresolved to the nearest safe network node (e.g., M→K="?-B"; J→K="?-B").

Hence, the current set of analyzed network nodes include the network nodes "A", "R", "B", and "K".

The method continues by the processor circuit 22 in operation 62 of FIG. 3B and 104 with the next SPF network node, identified as a network node "M" which is not a safe network node (event 208 of FIG. 4A). Operation 70 skipped by the processor circuit 22, the node "M→K" is identified as the SPF link, and in operation 72 the link "J-M" is assigned in the state table 54 in operation 72 as an incoming link having an unresolved status to the nearest safe network node "B" (J→M="?-B").

The next network node chosen by the processor circuit 22 in operation 62 of FIG. 3B from the SPF nodes is the network node "D" (event 210), the link "D→A" is identified as the SPF link, operation 70 is skipped by the processor circuit 22, and since the network node "D" is not a safe network node, the remaining non-SPF links are assigned by the processor circuit 22 as incoming to the network node "D" in operation 72, and labeled in the state table 54 as unresolved to the nearest safe network node "A" (C→D="?-A"; E→D="?-A"; L→D="?-A"). As described in further detail below, the cost of each of the non-SPF links for each of the network nodes can be tracked for later analysis. The method is repeated by the processor circuit 22 for the network node "C" (event 212), resulting in the link "C→A" identified as the SPF link and the labeling of the links E→C="?-A" and F→C="?-A" in the state table 54 in operation 72.

The next network node chosen in operation 62 of FIG. 3B from the SPF nodes is the network node "L" (event 214). Operation 70 is skipped by the processor circuit 22, and since the network node "L" is not a safe network node, link L→D is identified by the processor circuit 22 as the SPF link, the link "E-L" is assigned as incoming to the network node "L", and labeled in the state table 54 as unresolved to the nearest safe network node "A" ("E→L"="?-A") in operation 72.

The next network node chosen by the processor circuit 22 in operation 62 of FIG. 3B from the SPF nodes is the network node "E" (event 216). Operation 70 is skipped, and since the network node "E" is not a safe network node, in operation 72 the link E→C is identified by the processor circuit 22 as an SPF link, and all the non-SPF links are oriented as incoming to the network node "E" and labeled as unresolved to the nearest safe network node "A", resulting in the labeling of the links F→E="?-A", G→E="?-A", and H→E="?-A" in the state table 54.

The next network node by the processor circuit 22 in operation 62 of FIG. 3B and 104 from the SPF nodes is the network node "F" (event 218). Operation 70 is skipped by the processor circuit 22, and since the network node "F" is not a safe network node, in operation 72 the link F→C is identified as an SPF link, and all the non-SPF links are oriented as incoming to the network node "F" and labeled by the processor circuit 22 as unresolved to the nearest safe network node "A", resulting in the labeling of the links H→F="?-A", I→F="?-A", and J→F="?-A" in the state table 54.

The next network node chosen by the processor circuit 22 in operation 62 of FIG. 3B from the SPF nodes is the network node "N" (event 220). The network node "N" is identified by the processor circuit 22 as leaf network node based on its one and only one link N→L; hence, the link "N-L" is marked in the state table 54 as resolved (N→L=Resolved) in operation 70.

The next network node chosen by the processor circuit 22 in operation 62 of FIG. 3B from the SPF nodes is the network node "G" (event 222). Operation 70 is skipped, and since the network node "G" is not a safe network node, in operation 72 the link G→E is identified by the processor circuit 22 as an SPF link, and the non-SPF link H-G is oriented as incoming to the network node "G" and labeled as unresolved to the nearest safe network node "A", resulting in the labeling of the link H→G="?-A" in the state table 54.

The next network node chosen in operation 62 by the processor circuit 22 from the SPF nodes is the network node "H" (event 224). Since the network node "H" is not a safe network node, in operation 72 the link H→F is identified by the processor circuit 22 as an SPF link, and the non-SPF link I-H is oriented as incoming to the network node "H" and labeled as unresolved to the nearest safe network node "A", resulting in the labeling of the link I→H="?-A" by the processor circuit 22 in the state table 54.

The next network node chosen by the processor circuit 22 is the network node "I" (event 226. Since the network node "I" is not a safe network node, in operation 72 the link I→F is identified by the processor circuit 22 as an SPF link in the state table 54. As described previously, each of the SPF links 58 also can be labeled by the processor circuit 22 in the topology table 56 of FIG. 5.

As apparent from the foregoing description with respect to FIG. 6B, the identification of SPF links and unresolved links enables identification of the shortest path tree plus alternative unresolved links that can be used for identification of an alternate non-congruent path that is distinct from the shortest path to the root network node. The following description with respect to node "J" demonstrates how the identification of the alternative unresolved links enables identification of one or more junction nodes within the subDAGs 64a and 64b for formation of the arc routing topology.

In particular, the following description illustrates the identification within the DAG 52 (two or more) junction nodes, and reversible links (labeled "Rev") between the unction nodes and that can be reversed along one of the non-congruent paths of the junction nodes, without introducing a loop into the loop-free topology. In addition, the identification of a junction node in one subDAG (64*a* or 64*b*) that has a non-congruent path for reaching the destination network node 14 (distinct from the junction node serving as the root of the subDAG) enables formation of another infrastructure arc overlying a first infrastructure arc.

As illustrated with respect to FIGS. 6B and 6C, the next network node chosen by the processor circuit 22 in operation 62 of FIG. 3B from the SPF nodes is the network node "J" (event 228). The node "J" is identified by the processor circuit 22 as a safe network node because it can be classified as a junction node 68, illustrated in FIGS. 3C and 3D. The node "J" can be identified by the processor circuit 22 as a junction node because it has two non-congruent paths for reaching a safe node (e.g., the root network node "R") via the link J→F (labeled as unresolved to the nearest safe network node "A", i.e., "?-A"), and/or the link J→K (labeled as the SPF link unresolved to the nearest safe network node "B", i.e., "?-B"). Hence, the non-congruent paths provided by the links J→F and J→K are identified by the respective and distinct labels "?-A" and "?-B" identifying reachability to the root network node "R" via the respective safe network nodes "A" and "B".

Operation 72 is skipped by the processor circuit 22 because the network node "J" is identified as a junction node. Each of the data links of the network node "J" are resolved in operation 74 in a prescribed order, namely SPF link first, then any outgoing link(s), then any incoming link(s). Hence, the link J→K is the SPF link and therefore the first link to be analyzed in operation 74. Since the link J→K is unresolved in operation 76, the outgoing link J→K in operation 78 does not end in another junction, hence operation 80 is skipped.

Referring to FIG. 3D, the processor circuit 22 determines whether to execute operation 82 if the network node is not yet an intermediate junction. Operation 82 is executed by the processor circuit 22 for the link J→K of the network node "J" because if the link J→K, if reversed, the link reversal would enable the endpoint network node "K" to become a junction node, i.e., the endpoint network node "K" could now have an alternate path to the root network node "R" via the safe network node "A" (e.g., if the label of link J→K was changed upon link reversal from "?-B" to "?-A"); hence, the link J→K enables the node "J" to become a junction and does not cause any pruning of the SPF link J→K. Consequently, the link J→K is resolved by marking the link in the state table 54 as reversible ("Rev") by the processor circuit 22 in operation 82. The labeling of the link J→K as reversible ("Rev") is illustrated in FIG. 6D.

Since the node "J" is an edge junction toward the safe network node "B", operation 84 is executed by the processor circuit 22 to prevent the formation of a loop via the outward link "J→M" in the event that the link J→K is ever reversed to K→J in order to reach the safe network node "A"; hence, since "J→M"="?-B" is an outward link satisfying the condition "?-S" (where S=B), the outward link "J→M"="?-B" is pruned in operation 84 by blocking the path toward node "M" (note the square ☐ in FIG. 6C at the end of the link intersecting with network node "M", indicating traffic from network node "J" to network node "M" is blocked); the direction of the pruned (i.e., blocked) link J-M is reversed and relabeled by the processor circuit 22 as unresolved inward toward the new safe network node (junction node), i.e., M☐→J="?-J" in the state table 54.

Also note that if in operation 84 another link existed (e.g., J→B) (not shown in FIG. 6B) as an unresolved link toward the safe node "B" (J→B="?-B"), that link (J→B) could be pruned at both ends (i.e., removed: J☐-☐B) in order to avoid the possibility of any loops in the event of any link reversal.

Hence, in order to avoid loops a junction node in a routing arc can have one and only one link toward a first end of the arc, and one and only one other link toward a second end of the arc. The link J→F is unaffected in operation 84 because J is an edge junction toward safe node "B" (via J→K), whereas the node J→F is toward the other safe network node "A".

Operation 86 is skipped by the processor circuit 22 for junction node "J" because it is not yet an intermediate junction because it does not yet have two reversible links. Operation 88 is skipped because the SPF link J→K is assigned as an outgoing link.

Execution of operation 78 by the processor circuit 22 with respect to the SPF link J→K ("Rev") continues in operation 90, which recursively calls execution of operation 66 (as illustrated in FIGS. 3C and 3D) for the endpoint of the link J→K, namely the network node "K", in order to extend the arc along the shortest path; in other words, the operations of FIGS. 3C and 3D are executed based on the change in status of the link J→K to a reversible link (event 230 of FIG. 4B). Hence, operation 70 is skipped for the J→K link endpoint node "K" (which is not a leaf node). The J→K link enables the endpoint node "K" to now become a junction node since the link J→K link is now reversible, hence the network node "K" as a junction node (specifically, an edge junction), and now a safe network node, hence operation 72 is skipped by the processor circuit 22. Each of the safe network node "K" links are resolved in operation 74, starting with the SPF link K→B: operation 76 is skipped by the processor circuit 22 because the SPF link K→B="?-B" is not yet resolved. The SPF link K→B is an outgoing link, hence operation 78 is executed by the processor circuit 22: operation 80 is not executed by the processor circuit 22 because the node K→B does not end in another junction node (i.e., the heir network node "B" is not a junction node). Operation 82 is executed by the processor circuit 22 because network node "K" is not an intermediate junction node yet, and the link K→B enables the end point network node B to become a junction node, hence the node K→B is labeled as reversible, K→B="Rev" in operation 82, to enable the heir network node "B" to become labeled by the processor circuit 22 as a junction node in the state table 54.

In operation 84 the node N=K is now an edge junction toward node "B", and there is no outward unresolved link to be pruned; however, the link M→K is relabeled by the processor circuit 22 from "?-B" to "?-K" in the state table 54. In operation 86 the network node "K" is now identified by the processor circuit 22 as an intermediate junction having two reversible links J→K="Rev" and K→B="Rev"; however, there are no other outward links other than the two reversible links, hence no pruning of other outward links is needed.

Hence, the resolution of the link J→K at node J as a reversible link causes resolution of the link endpoint K to be recursively resolved by the processor circuit 22 at operation 90, resulting in the resolution of reversible link K→B at node K. The resolution of the reversible link K→B at node K causes in operation 90 the recursive resolution by the processor circuit 22 of the link endpoint B (event 232).

The heir network node B is identified as an edge junction based on the reversible link K→B, and since the SPF link B→R is to the root, the heir network node "B" is identified as the end of a routing arc. The resolution of node B causes the recursive execution by the processor circuit 22 in operation 90 to return to network node "K" (event 234) to continue resolving the remaining links of the network node K.

Hence, the SPF link has been resolved in network node K, no outgoing links need to be resolved, causing the analysis of the link M→K="?-K" at operation 74. Each of the operations 76, 78, are skipped by the processor circuit 22 because the link M→K is not outgoing, and the incoming link is already marked unresolved to K "?-K". Hence, the processor circuit recursively resolves the endpoint M of the link K→M in operation 90 (event 236).

The network node M is determined by the processor circuit 22 in operation 72 to be a safe node because it has two non-congruent paths to the root, namely the path "?-K" via the link M→K, and the path "?-J" via the link M→J. Starting with the shortest path link M→K, in operation 78 the link is identified in operation 80 as ending in another junction "K", enabling the link M→K to be marked by the processor circuit 22 as resolved in the state table 54 (and a first end of the collapsed arc "ARC1" of FIG. 6D and FIG. 6I). A recursive call by the processor circuit 22 from network node M to network node K in operation 90 (event 238) results in no changes, hence the processor circuit 22 returns to network node M (event 240), and the processor circuit 22 resolves the next outgoing and unresolved link M→J="?-J" into a resolved link in operation 80 (and the second end of the collapsed arc "ARC1" of FIG. 6I).

Referring to FIG. 4B, the recursive resolution of network node "M" (as the endpoint of the link M-K) is complete, causing the processor circuit 22 return to the network node "K" at event 242 of FIG. 4C; the recursive resolution of the network node "K" also is complete, causing the return to network node "J" at event 244.

Note that the network nodes "K" and "M" are junction nodes without changing the link reversibility. Hence, the link M→J terminates a routing arc because it ends in a junction node "J", and the link M→K terminates in a routing arc because it ends in another junction node "K". Hence, the network nodes "J", "K", and "M" form a collapsed arc "ARC1" 12, illustrated in FIG. 6D.

The processor circuit 22 in operation 74 repeats the link analysis for the next link of the junction node "J", namely the outgoing link J→F="?-A". After skipping operation 76, operation 80 is skipped by the processor circuit 22 because the network node "F" is not a junction in FIG. 6D, hence link J→F does not end in another junction. The network node "J" is not an intermediate junction yet because it does not have two reversible paths, hence operation 82 is executed to make the link J→F reversible (J→F="Rev") because the reversal of link J→F enables the endpoint network node "F" to become a junction having an alternate path to the root network node "R" via "?-A" and the path via the network node "J". The network node "J" was already an edge junction, hence operation 84 is skipped.

Marking the link J→F reversible in operation 78, however, now makes the safe node "J" an intermediate junction, hence operation 86 is executed by the processor circuit 22: the description in operation 86 of "prune outwards all links of safe node N but the 2 reversible links . . . " ensures that there are no outward links except along the arc (formed via network nodes F, J, K, and B) 12, such that any other links are pruned and directed inwards (as executed previously with respect to the link M☐→J). Operation 88 is skipped by the processor circuit 22 because the link J→F is not incoming, and operation 90 is executed to recursively resolve the neighbor for the endpoint node of the link J→F, namely the network node "F" (event 246).

The processor circuit 22 skips operation 70 during resolution of the network node "F" it has multiple links. The network node "F" is identified as an edge junction (and therefore a safe node) because it has two non-congruent paths to the root node "R", and the network node "F" includes one reversible link J→F, hence, execution of operation 72 is skipped. As will be described in further detail below, the junction node "F" belongs to the subDAG(A) 64a of FIG. 6B, and the junction nodes "J", "K", and "B" belong to the subDAG(B) 64b; hence, a first infrastructure arc ("ARC2" illustrated in FIG. 6E) 12 can be created that comprises (at least two or more) junction nodes and (one or more) reversible links, where one end of the first infrastructure arc terminates at the destination network node "R".

Each of the links of the safe node "F" are analyzed in operation 74, starting with the SPF link F→C: operations 76 and 80 are skipped, and operation 82 is executed by the processor circuit 22 to mark the link F→C as reversible (F→C="Rev"). Operation 84 is executed by the processor circuit 22 because the network node "F" is now an edge junction towards "S" (S=A). Hence, in operation 84 any outgoing unresolved links labeled "?-A" (e.g., F→E="?-A") are pruned and reversed inwards toward the edge junction and marked by the processor circuit 22 as unresolved toward the edge junction (e.g., change from F→E="?-A" to E☐→F="?-F") in the state table 54; further, in operation 84 all incoming links (i.e., inward links) of the safe node "F" are changed by the processor circuit 22 from "?-A" to "?-F" (e.g., change H→F="?-A" and I→F="?-A" to H→F="?-F" and I→F="?-F"). The relabeling of the links E☐→F, H→F, and I→F in operation 84 in the state table 54 exposes the network nodes "E", "H", and "I" to the alternate path to the root node "R" via the edge junction "F", enabling the network nodes "E", "H", and "I" to be later identified as new junction nodes (and therefore safe network nodes) having new non-congruent paths for reaching the root node "R", distinct from the path provided by the subDAG (A) 64a. hence, the network nodes "E", "H", and "I" can later be used to create secondary infrastructure arcs based on the non-congruent paths distinct from the subDAG (A) 64a.

The edge junction "F" is not an intermediate junction yet, hence operation 86 is skipped, and operation 88 is skipped because the incoming link E☐→F is already marked "?-F" as unresolved toward the edge junction "F".

A recursive call is executed by the processor circuit 22 in operation 90 for the endpoint network node "C" of the SPF link F→C="Rev" (event 248).

The recursive resolution by the processor circuit 22 of the network node "C" skips operation 70 because it has multiple links. The network node "C" is identified as an edge junction (and therefore a safe node) because it has two paths to the root node "R", and the network node "C" includes one reversible link F→C, hence, execution of operation 72 is skipped by the processor circuit 22. Operations 76 and 80 are skipped, and operation 82 is executed by the processor circuit 22 to mark the link C→A as reversible (C→A="Rev") in the state table 54. Operation 84 is executed by the processor circuit 22 because the network node "C" is now an edge junction towards "S" (S=A). Hence, in operation 84 any outgoing unresolved links labeled "?-A" (e.g., C→D="?-A") are pruned and reversed inwards by the processor circuit 22 toward the edge junction "C" and marked in the state table 54 as unresolved toward the edge junction (e.g., change from C→D="?-A" to D☐→C="?-C"); further, in operation 84 any incoming links of the safe node "C" are changed by the processor circuit 22 from "?-A" to "?-C" (e.g., change E→C="?-A" to E→C="?-

C") in the state table 54. The relabeling of the links D☐→C and E→C in operation 84 exposes the network node "D" to an alternate path to the root node "R" via the edge junction "C", enabling the network node "D" to be later identified as a junction node having two non-congruent paths for reaching the root node "R".

The edge junction "C" is not an intermediate junction yet, hence operation 86 is skipped by the processor circuit 22, and the link C→A is not incoming, hence operation 88 is skipped. A recursive call is executed in operation 90 for the endpoint network node "A" of the SPF link C→A="Rev" (event 250).

The recursive resolution by the processor circuit 22 of the network node "A" skips operation 70 because it has multiple links. The heir network node "A" is a safe node, and is identified as an edge junction because it has two non-congruent paths to the root node "R", and the network node "A" includes one reversible link C→A, hence, execution of operation 72 is skipped.

The SPF link A→R is first selected in operation 74 and identified in operation 76 as resolved. The resolved SPF link A→R also ends in the root "R", and therefore terminates the arc identified by the sequence of recursively called neighbors A(C,F, J) extending back to the intermediate junction "J", and extending to the edge junction "B".

Hence, the identification of the SPF link A→R as resolved during the successive recursion by the processor circuit 22 from the intermediate junction "J" (i.e., a junction node having two reversible links), establishes the junction node "A" as the second edge junction, resulting in the first infrastructure arc "ARC2" for reaching the root node "R", illustrated in FIG. 6E and FIG. 6I. As illustrated in FIGS. 6E, 6H, and 6I, the infrastructure arc "ARC2" for reaching the root node "R" includes the junction nodes "A", "C", "F", "J", "K", and "B" connected by the reversible links A-C, C-F, F-J, J-K, and K-B. Hence, the infrastructure arc "ARC2" for reaching the root node "R" can be identified based on traversing the sequence of an heir network node (e.g., "A") and the sequence of reversible links until reaching another heir network node (e.g., "B").

The next link of junction node "A" is analyzed in operation 74, namely the link D→A=?-A, resulting in the recursive resolution of the network node "D" in operation 90 (event 252). The network node "D" is now a junction node (and therefore a safe node), because it has two non-congruent paths (via nodes A and C) for reaching the root node "R". Hence, operations 70 and 72 are skipped, and operation 74 is executed first for the SPF link D→A. The link D→A is marked as resolved in operation 80 based on terminating in the junction node A. The recursive calling from node "D" to node "A" causes the recursive analysis for node "A" to return back to node "D", as all other links have already been analyzed with respect to node "A": such a return is referred to as a "no-op recursion", and will be omitted in future discussion for brevity.

The analysis for node "D" continues for link D☐→C in operation 74. The link D☐→C ends in the junction node "C" and therefore is marked as resolved in operation 80, resulting in the formation of the collapsed arc "ARC3" 12 illustrated in FIG. 6I. The incoming link L→D is next analyzed with respect to the junction node D in operation 74, and relabeled in operation 88 from the unresolved status of ?-A to the unresolved status ?-D (L→D="?-D"), indicating that the nearest safe node is the node "D".

As illustrated in FIG. 6F, the safe node "D" can form its own subordinate directed acyclic graph SubDAG(D) 64*d* within the SubDAG(A) 64 toward the root node "R", such that the safe node "D" becomes the closest safe node for the network nodes "L", "N", "E", "G", "H", and "I". Hence, similar to operation 72, all the unresolved incoming links in the SubDAG of safe node "D" (e.g., links L→D, E→D, E→L, G→E, H→G, I→H, and H→E) are recursively relabeled (i.e., marked) in operation 88 to "?-D" to propagate the identification of the newest safe node "D" (state 252).

The recursive analysis in operation 90 of the node "L" by the processor circuit 22 results in a no-op recursion because the node "L" is not yet a safe node, hence the analysis returns to the node "D".

The link E→D is next analyzed with respect to the junction node D in operation 74, and relabeled in operation 88 by the processor circuit 22 from the unresolved status of ?-A to the unresolved status ?-D (E→D="?-D") in the state table 54. The analysis for node E is recursively called by the processor circuit 22 in operation 90 (event 254).

The network node E is a junction node (and therefore a safe node) because it has two non-congruent paths to the root via junction nodes "D" and "E", without changing any link reversibility. The following links of junction node "E" need to be analyzed in operation 74, in the following example order: E→C, E→D, E→L, E☐→F, G→E, and H→E.

Hence, the SPF link E→C is marked as resolved in operation 80 because it ends in the junction node "C". The outgoing link E→D is analyzed with respect to the network node "E" in operation 74, and is marked as resolved in operation 80 (becoming the first end of the collapsed arc "ARC8" of FIG. 6I) because it ends in the junction node "D". The outgoing link E→L is next analyzed in operation 74, and since the link E→L enables in operation 82 the endpoint node "L" to become a junction, the link E→L is marked as reversible in operation 82. The endpoint "L" is recursively analyzed in operation 90 (event 256).

Referring to FIG. 4D and event 256, the network node "L" is identified as an edge junction (and therefore a safe node) because it has the reversible link E→L. The link L→D is marked as resolved in operation 80 because it ends in the junction node "D", resulting in the formation of the second infrastructure arc "ARC4" of FIG. 6G and FIG. 6I. Since the arc "ARC4" ends in a safe node "D", then even though all traffic from the arc "ARC4" could exit via network node C (i.e., network node "D" sends its traffic to network node C via the link D☐→C), the network node "D" still has an alternate path via network node A. The link N→L has already been resolved for the leaf node N, hence the analysis returns to network node "E".

The next link under analysis by the processor circuit 22 with respect to the network node "E" (event 258) is the link E☐→F=?-F in operation 74. The link E☐→F is resolved in operation 80 as ending in the junction node "F" (resulting in the formation of the collapsed arc "ARC8"). Although the link E☐→F was pruned as unidirectional, it could be safely reversed for LFA analysis, if desired (operation 90 is a no-op for the endpoint node F of link E☐→F, hence, analysis returns to the network node "E").

The incoming link G→E of network node "E" is next analyzed in operation 74. Since the network node "G" is not a junction, it is not a safe node and therefore the link G→E cannot be resolved, but is relabeled ?-E in operation 88: all incoming links to the safe node "E" also are recursively marked by the processor circuit 22 as unresolved toward "E" (namely, links G→E, H→E, H→G, and I→H all are reset to "?-E") resulting in the formation of a subDAG(E) toward E. Analysis of the network node "G" is recursively called as the endpoint of the link G→E in operation 88.

The network node "G" (event 260) is determined to not be a junction node, and all links are already labeled to the nearest safe node "E", hence operation 72 can be skipped and the processor circuit 22 can return back to node "E" in event 262.

The next incoming link H→E of the safe node "E" is analyzed in operation 74, causing the processor circuit to recursively analyze in operation 90 the endpoint node "H" at event 264.

The network node "H" in operations 72 and 74 is identified as a junction node having non-congruent paths via unresolved paths "?-F" (via the SPF link H→F) and "?-E" (via the links H→E and H→G). Hence, each of the links of the safe node "H" are successively resolved in operation 74, namely the links H→F, H→E, H→G, and I→H.

The SPF link H→F of the safe network node "H" is resolved by the processor circuit in operation 80 as ending in the junction node "F": as will be shown later, the link H→F will terminate the infrastructure arc "ARC5" and the collapsed arc "ARC6" of FIG. 6I. Operation 90 results in a no-op recursive analysis of node "F" (as the endpoint of the link H→F), hence, the analysis of the next (outgoing) link H→E for the safe node "H" in operation 74 causes the link H→E (ending in the junction node "E") to be resolved in operation 80 as the second end of the collapsed arc "ARC6".

Operation 90 results in the no-op recursive analysis of node "E" (as the endpoint of the link H→E), hence the analysis of the next (outgoing link) H→G for the safe node "H" is executed in operation 74. In operation 82 the link H→G enables the endpoint node "G" to become a junction; further, the link H→G if reversed does not cause pruning of the SPF link H→F; hence, the link H→G is relabeled in operation 82 by the processor circuit 22 to a reversible link (H→G="Rev") in the state table 54. Operation 90 is executed for recursive analysis of the endpoint node "G" of the link H→G (event 266).

The network node "G" is determined in operation 72 to be an edge junction (and therefore a safe node) based on the reversible link H→G. Hence, analysis of the SPF link G→E in operation 74 results in operation 80 with the link G→E being labeled as resolved as the second end of the infrastructure arc "ARC5". Operation 90 results in the no-op recursive analysis of node "E" (as the endpoint of the link G→E), and since the safe network node "G" has no other links to resolve, execution returns to node "H" for evaluation of the next incoming link I→H (event 268).

The next link in operation 74, namely the incoming link I→H of the safe network node "H": The link I→H is relabeled in operation 88 from I→H="?-A" to I→H="?-H", and the operation 90 is executed by the processor circuit 22 for recursive analysis of the endpoint node "I" of the link I→H (event 270).

The network node "I" is determined by the processor circuit 22 in operation 72 to be a junction node having non-congruent paths via unresolved paths "?-F" (via the SPF link I→F) and "?-H" (via the outgoing link I→H). Hence, in operation 74 the SPF link I→F is analyzed by the processor circuit 22, and marked in operation 80 as resolved (and terminating the collapsed arc "ARC7") based on ending in the junction node "F". Operation 90 results in the no-op recursive analysis of node "F" (as the endpoint of the link I→F), resulting in analysis in operation 74 of the next (outgoing link) I→H. Since the link I→H ends in the junction node "H", the link I→H is labeled in operation 114 as resolved, forming the second end of the collapsed arc "ARC7" of FIG. 6I. Operation 90 results in the no-op recursive analysis of node "H" (as the endpoint of the link I→H), returning execution analysis to junction node "I".

Analysis of node "I" is completed by the processor circuit 22, returning execution analysis by the processor circuit 22 to node "H"; analysis of node "H" is complete, returning execution analysis to node "E"; analysis of node "E" is complete, returning execution analysis to node "D"; analysis of node "D" is complete, returning execution analysis to node "A"; analysis of node "A" is complete, returning execution analysis to node "C"; analysis of node "C" is complete, returning execution analysis to node "F"; and analysis of node "F" is complete, returning execution analysis to node "J". As described previously, the processor circuit 22 can update the topology table 56 of FIG. 5 as each routing arc is constructed, where the ownership of an arc cursor is identified by the junction node having the two outwardly oriented reversible links.

The resulting link topology is illustrated in FIG. 6H, with the resulting arcs "ARC1" through "ARC8" illustrated in FIG. 6I. The routing topology of FIG. 6I illustrates the routing arcs "ARC1" through "ARC8", with all the network nodes being junction nodes except for the root network node "R" and the leaf node "N". As illustrated in FIGS. 6H and 6I, the collapsed arc "ARC1" includes the junction nodes "J", "M", and "K"; the infrastructure arc "ARC2" for reaching the root node "R" includes the junction nodes "A", "C", "F", "J", "K", and "B" connected by the reversible links C→A, F→C, J→F, J→K, and K→B; the collapsed arc "ARC3" includes the junction nodes "A", "D", and "C"; the infrastructure arc "ARC4" includes the junction nodes "D", "L", "E", and "C"; the infrastructure arc "ARC5" includes the junction nodes "E", "G", "H", and "F"; the collapsed arc "ARC6" includes the junction nodes "E", "H", and "F"; the collapsed arc "ARC7" includes the junction nodes "H", "I", and "F"; and the collapsed arc "ARC8" has the junction nodes "D", "E", and "F".

Consequently, assuming the link F→C encountered a failure, the network node "F" could redirect traffic to the node "J" via the reversible link J→F (e.g., based on the network nodes "F" and "J" negotiating that the link J→F needs to be reversed to F→J, enabling network traffic to be redirected without recalculation of routes.

As apparent from this disclosure, the loop-free routing topology 10 for the destination network node ("R") 14 can be repeated for each network node 16, enabling each network node 16 to have its own loop-free routing topology 10 that guarantees reachability to the corresponding network node 16 via non-congruent paths.

Distributed Establishment of Loop-Free Label Switched Paths in the Primary Hierarchal Level of the Loop-Free Routing Topology As described previously, the loop-free routing topology 10 illustrated in FIG. 6I enables network traffic to be redirected instantaneously in response to a detected failure in the routing topology based on reversing a reversible link, without introducing any loops into the topology. The loop-free routing topology 10 also can utilize a new label distribution protocol that enables the network nodes 16 to establish loop-free label switched paths for reaching the destination network node 14 via the loop-free routing topology 10. The apparatus 20 can be configured for not only computing the arc topology 10, but also generating a set of serialized representations describing the loop-free routing topology, where each serialized representation describes a corresponding path in the topology: as described herein, the "path" as used herein is not necessarily limited to the disclosed routing arcs. The set of serialized representations can be propagated from the destination network node 14 to the network nodes 16 in the computing network, enabling each of the network notes to establish their own loop-free label switched paths for reaching the destination network node 14.

The apparatus can be implemented, for example, as a centralized path computing engine associated with a network management system, the destination network node 14, or any node computing the topology 10 for a number of destinations within a prescribed autonomous system.

Figure 7:
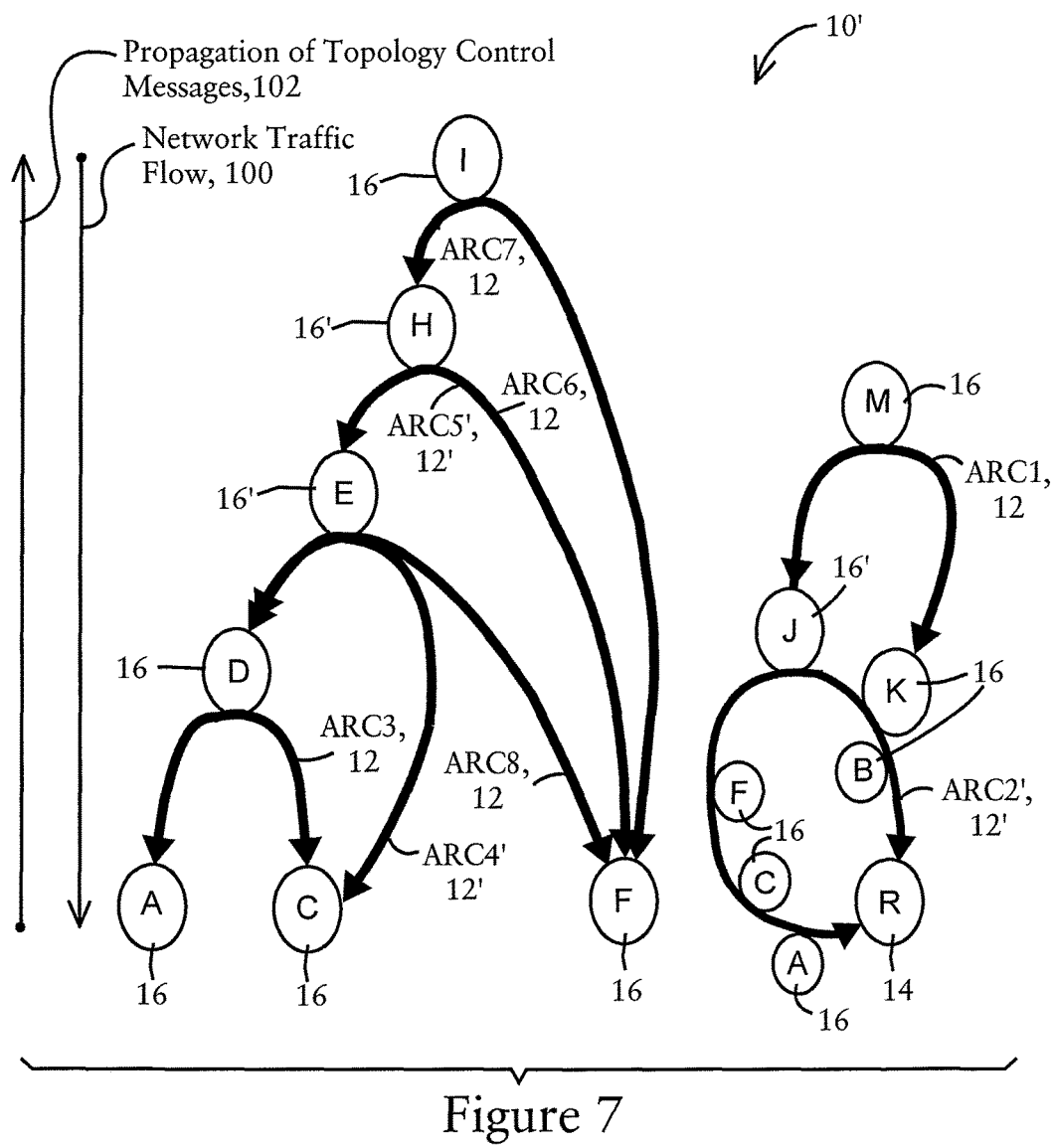
FIG. 7 illustrates the loop-free routing topology of FIG. 6I as an example hierarchy of successively cascaded routing arcs, for propagation of a set of serialized representations of paths in the routing topology, according to an example embodiment.

FIG. 7 illustrates an example hierarchy 10' of successively cascaded routing arcs, constructed by the apparatus 20 of FIG. 2 according to an example embodiment. In particular, the loop-free routing topology 10 can be represented by the apparatus 20 as a hierarchy 10' that contains the same routing arcs 12 for reaching the destination 14, except that the routing arcs 12 are redrawn as a hierarchy of successively cascaded (collapsed) routing arcs 12 or 12' that supply network traffic in the "downward" direction 100 to a destination 14.

As illustrated in FIG. 7, all network traffic toward the destination 14 follows the direction of the network traffic flow 100, ending at the root 14 or the network nodes "A", "C", or "F" along the root arc "ARC2" 12. Hence, all network traffic flows along the path 100 down the hierarchy 10' of successively cascaded routing arcs 12 or 12' supplying network traffic to the destination 14.

Conversely, topology control messages 102 can be propagated from the destination network node 14 to each of the network nodes 16 in the computing network. The topology control messages 102 include a "set of serialized representations" (described below) describing relevant paths (e.g., routing arcs 12) of the loop-free routing topology 10. The topology control message 102 is used to flood the serialized representations of the relevant paths over the loop-free routing topology 102, across each of the network nodes 16 along each of the routing arcs 12: in other words, a network node (e.g., "C") 16 passes the topology control message (containing the set of serialized representations) to any of its neighbors that can send network traffic back to that network node (e.g., "C"), except that the network node (e.g., "C") will not send the topology control message back to the transmitting network node (e.g., "A") that had just sent the topology control message to the network node ("C"). Hence, each network node 16 can learn the relevant paths of the loop-free routing topology 10 in response to parsing the set of serialized representations contained in a topology control message 102.

Each topology control message 102 also includes one or more locally significant labels ("λ") generated by the network node 16 transmitting the topology control message 102. Each locally significant label generated by the transmitting network node 16 can have an arbitrary numeric value. As described below, each locally significant label is associated with prescribed attributes set by the transmitting network node 16 for forwarding a data packet to the destination network node 14: as described below with respect to FIG. 15 the transmitting network node 16 stores the locally significant label (and associated attributes) in a label forwarding table (also referred to as a label switched forwarding table); the network node receiving the topology control message 102 also stores the received locally significant label in a new label forwarding table entry in its own label forwarding table, creates a new locally significant label as an index to the new label forwarding table entry, and retransmits the set of serialized representations with the new locally significant label in a retransmitted topology control message.

Hence, the topology control messages 102 enable the network nodes 16 to each independently establish loop-free label switched paths for reaching the destination network node 14 via the loop-free routing topology 10. Moreover, multiple locally significant labels can be specified within a single topology control message 102, for example a primary label for a default path to reach the destination, and a "backup" (or "fast reroute") path to reach the destination. Topology control messages 102 also can be propagated along both ends of a bidirectional routing arc 12, resulting in a total of four locally significant labels identifying four respective paths available for reaching the destination node 14 by a network node 16. The loop-free label switched paths can be implemented, for example, using multiprotocol label switched (MPLS) labels according to RFC 3031 or RFC 6178, label distribution protocol (LDP) according to RFC 3036 or 5036; alternately the labels can use other tagging techniques, for example IEEE 802.1q (or Q in Q) as labels in carrier Ethernet, IPv6 flow labels, or direct encapsulation over ATM or frame relay. Other topology information can be transmitted over the routing arcs 12 once established, for example as illustrated in U.S. Pat. No. 7,693,064.

Hence, the label switched paths enable any network node 16 along the bidirectional paths to instantaneously reverse the transmission of a data packet to an alternate (backup) label switched path in response to the network node detecting a failed link; moreover, loops are avoided by using different label switched paths to identify a default path in one direction of the bidirectional path (e.g., routing arc), a default path in a second direction of the bidirectional path, a backup (fast reroute) path that is used in response to detecting a failed link in the default path in the one direction, and a second backup (fast reroute) path than that is used in response to detecting a failed link in the default path in the second direction.

Figure 8:
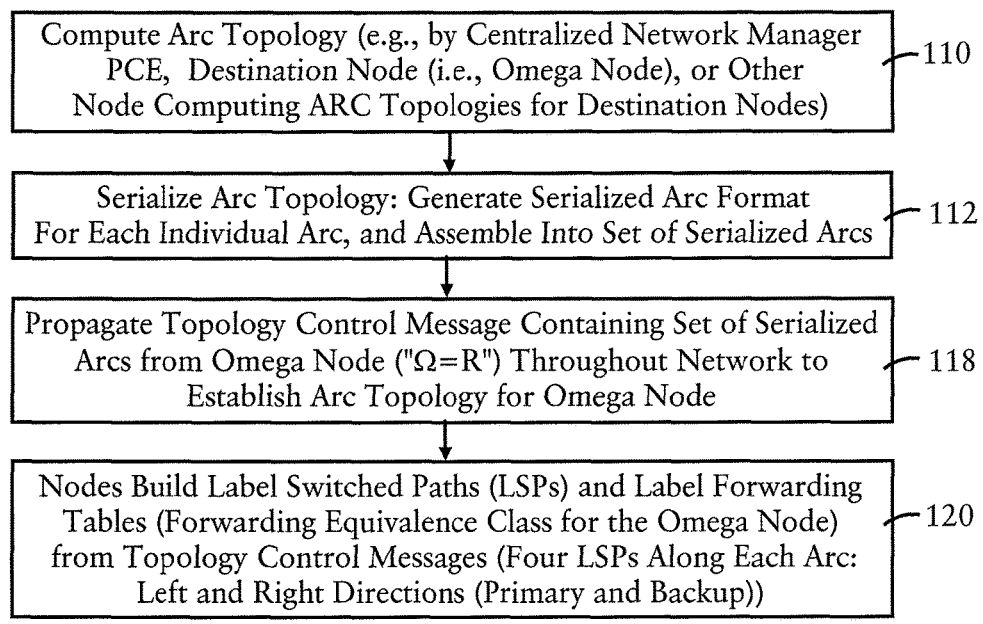
FIG. 8 illustrates an example method summarizing the method of generating and propagating a set of serialized representations describing the loop-free routing topology, that enables network nodes to establish loop-free label switched paths for reaching a destination network node, according to an example embodiment.

FIG. 8 illustrates an example method for label distribution and route installation in the loop-free routing topology, according to an example embodiment. Referring to FIGS. 2, 6I, and 8, the processor circuit 22 in the apparatus 20 is configured for creating in a computing network a loop-free routing topology 10 for reaching the destination network node "R" in operation 110 as illustrated in FIG. 6I and as described previously with respect to FIGS. 1 through 6I. The computing network may be an autonomous system, or any part thereof, for example a local area network, an ad hoc network such as a mobile ad hoc network, a sensor network, etc. As described previously, the loop-free routing topology 10 comprises distinct paths 12 for reaching the destination network node 14.

The processor circuit 22 also is configured for generating in operation 12 a set of serialized representations describing the loop-free routing topology 10. As described in further detail below with respect FIGS. 10 and 14, each serialized representation 114 describes a corresponding one of the paths 12. The processor circuit 22 also assembles all of the serialized representations 114 of the respective paths (e.g., routing arcs 12) into a set 116 of serialized representations, illustrated in FIG. 12. Hence, the set of serialized representations 116 can provide a representation of the entire loop-free routing topology 10.

The processor circuit 22 can generate in operation 118 a topology control message 102 containing the set of serialized representations 116, enabling the network interface circuit 24 of the destination node "R" to output in operation 118 the topology control message 102 on each of its incoming links (i.e., toward nodes "A" and "B") causing the topology control message 102 to be propagated throughout the network. Since the destination node "R" 14 is the final destination for the loop-free topology 10, the destination node 14 also is referred to generically as the "omega node" (Ω). Hence, the omega node (Ω="R") 14 defines the forwarding equivalence class (FEC) for the topology control message 102: the topology control message 102 also specifies a locally significant label (e.g., an MPLS label) (e.g., "O=R_AR" for the link "R-A" or "R_BR" for the link "R-B") that is associated with the network interface that outputs the message to the next hop network node 16 for the forwarding equivalence class "Ω=R".

As used herein, the nomenclature "O=X_YZ" refers to a locally significant label "O" identifying the link in the direction from node "Z" to node "Y" for the forwarding equivalence class "Ω=X" to be used as a default (i.e., primary) path in reaching the destination node "Ω=X": in other words, the node "Z" generates the locally significant label "O=X_YZ" to notify the node "Y" (i.e., topology control message "to Y from Z") that the label "O=X_YZ" is to be used for forwarding a data packet via node "Z" along a default path to the destination node "Ω=X" (i.e., data traffic destined for "Ω=X" via default path is sent "from Y to Z"). An additional extension (e.g., "FRR") can be used to identify an additional label attribute, namely that the link is to be used as a fast reroute ("FRR") path (i.e., backup path) in the event of a link failure on the default path. The locally significant label can be implemented as a numeric value that provides an index into a label forwarding table within a network node. Hence, a topology control message 102 output by a network node 16 and containing the set of serialized representations can further include a default label "O=X_YZ" and a backup (fast reroute) label "O=X_ZY_FRR" for the forwarding equivalence class "Ω=X". Since the routing arcs 12 are bidirectional, the node "Y" also can receive another topology control message 12 from the "other end" of its arc, and in response send to the node "Z" a topology control message 102 specifying the default label "O=X_ZY", the backup label "O=X_YZ_FRR", and the set of serialized representations.

Hence, the omega node (Ω="R") 14 outputs in operation 118 (118a of FIG. 12) the topology control message 102 with the set of serialized arcs (116 of FIG. 12): the omega node (Ω="R") 14 also adds a locally significant label "O=R_AR" to the topology control message 102 output onto the link "R-A" to the network node "A", and a locally significant label "O=R_BR" to the topology control message 102 output onto the link "R-B" to the network node "B".

In response to the network node "A" 16 receiving the topology control message 102 with the locally significant label "O=R_AR" on an identified network interface (e.g., "A1"), the network node "A" can create in operation 120 an entry in its internal label forwarding table for the forwarding equivalence class Ω="R" that any data packet destined for the destination node "Ω=R" 14 via the link "R-A" should be output onto the network interface "A1" with the locally significant label "O=R_AR" (as described previously, a locally significant label can be an arbitrary numeric value chosen by the source of the label).

The processor circuit 22 in the network node "A" 16 also can determine the routing topology 10 from the set of serialized arcs 116 in the topology control message 102. Hence, the processor circuit 22 in the network node "A" 16 can create additional label forwarding table entries for the network nodes "C" and "D" that are configured to send network traffic to the destination node "Ω=R" 14 via the network node "A": the label forwarding table entry for the network node "C" can specify a new locally significant label "O=R_CA" (used as an index into the label forwarding table), the destination label "O=R_AR", and the outbound network interface A1. Hence, if the network node "A" receives a data packet from the network node "C" that specifies the locally significant label "O=R_CA", the network node "A" can use the specified locally significant label as an index into the label forwarding table to recover from the forwarding table entry the destination label "O=R_AR" (to be swapped with the existing label in the received data packet) and output the data packet onto the network interface "A1" for transfer to the destination node 14 via the link "A-R".

Hence, in operation 118 the network node "A" sends the topology control message 102 to the network node "C" with the locally significant label "O=R_CA", and to the network node "D" with the locally significant label "O=R_DA". The network node "C" can identify the network topology 10 from the set of serialized arcs 116, and in response can update its label forwarding table in operation 120 with a forwarding table entry specifying the network interface (e.g., "C1") having received the topology control message 102 from the network node "A", the locally significant label "O=R_CA", and new locally significant labels (e.g., "O=R_FC", "O=R_EC") used as indices into the label forwarding table for data packets received from other network nodes (e.g., "F" via C-F; "E" via C-E). The network node "C" can output the topology control message 102 to the network nodes "E" and "F" using the locally significant labels "O=R_EC" and "O=R_FC", respectively.

Hence, the propagation in operation 118 of the topology control message enables the network nodes 16 2 establish the arc topology for reaching the omega node 14; further, insertion and swapping of locally significant labels at each network node enables each of the network nodes 16 to independently establish loop-free label switched paths for reaching the destination network node 14 via the loop-free routing topology 10.

Figures 9, 10:
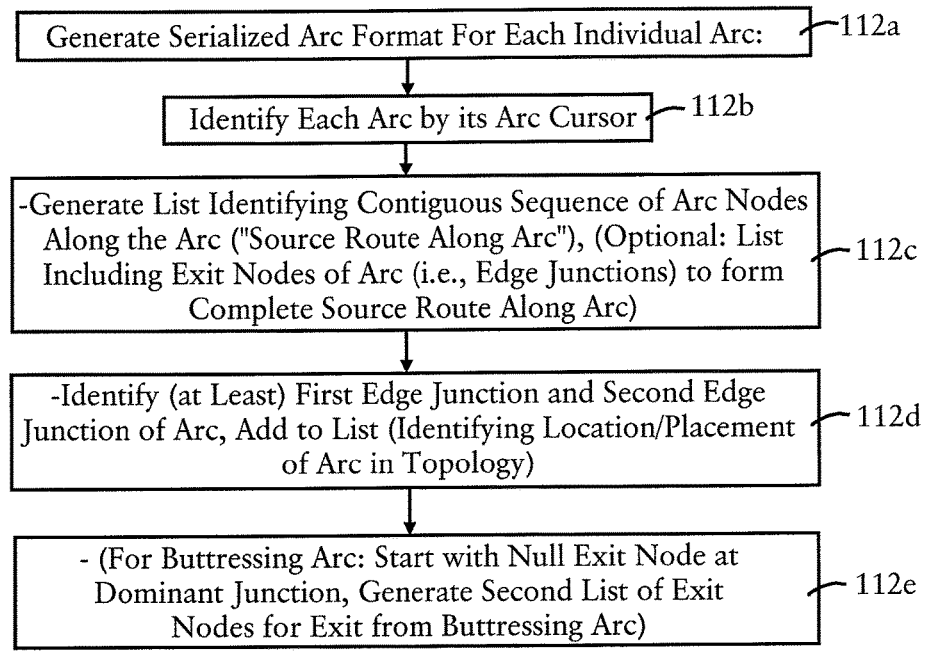
FIG. 9 illustrates an example method of generating a serialized representation of a path in the loop-free routing topology, according to an example embodiment.
FIG. 10 illustrates the set of serialized representations describing the loop-free routing topology, according to an example embodiment.

FIG. 9 illustrates an example method by the processor circuit 22 of the apparatus 20 of executing operation 112 of FIG. 8, namely the serializing of the arc topology 10, according to an example embodiment. The method begins in operation 112a based on the processor circuit 22 of the apparatus 20 identifying in operation 112b each path (e.g., routing arc) 12 by its arc cursor 18, namely the identity of the network node 16 having position of the arc cursor 18 for a given routing arc 12. As illustrated in FIG. 10, each routing arc 12 as identified by its arc reference (ARC1 to ARC8) in FIG. 6I is given a serialized arc identifier 122 based on the corresponding network node 16 having possession of the arc cursor 18. For example, the network node "J" has possession of the cursor 18 for the routing arc "ARC2" 12; the network node "E" has possession of the arc cursor 18 for the routing arcs "ARC4" 12 and "ARC8", hence the serialized arc identifiers "E1" and "E2" are used to distinguish routing arcs 12 in instances where the same network node ("E") has possession of multiple arc cursors 18 for respective routing arcs 12 (see also the serialized arc identifiers "H1" and "H2" 122 to distinguish the routing arcs "ARC5" and "ARC6" having their respective arc cursors 18 controlled by the network node "H").

Hence, the serialized arc identifier 122 serves as metadata that identifies the network node 16 in the corresponding path (e.g., routing arc) 12 as possessing the corresponding our cursor 18 for control of traffic along the routing arc 12.

The processor circuit 20 of the apparatus 20 generates in operation 112c a list 124 (illustrated in FIGS. 10 and 14) identifying a contiguous sequence of arc nodes 16 along the corresponding arc 12. For example, the serialized arc 114a provides the source route "{B, K, J, F, C, A}" along the arc having the serialized arc identifier "J" 122 for the routing arc "ARC2" in FIG. 6I. the processor circuit 20 also identifies in operation 112d at least a first edge junction and a second edge junction of the routing arc 12 (i.e., exit nodes) that empties traffic from the routing arc to either the destination node 14 or another routing arc that is closer to the destination network node 14 than the corresponding routing arc 12. As used in this description, any node (or nodes) within brackets "[ ]" identify an end of a routing arc (i.e., an exit node), such that the nodes "C" and "D" are the exit nodes for the routing arc "ARC4" in the serialized arc format 114b; the contiguous sequence of arc nodes within brackets "{ }" refers to intermediate junction nodes that are not exit nodes.

Figure 14:
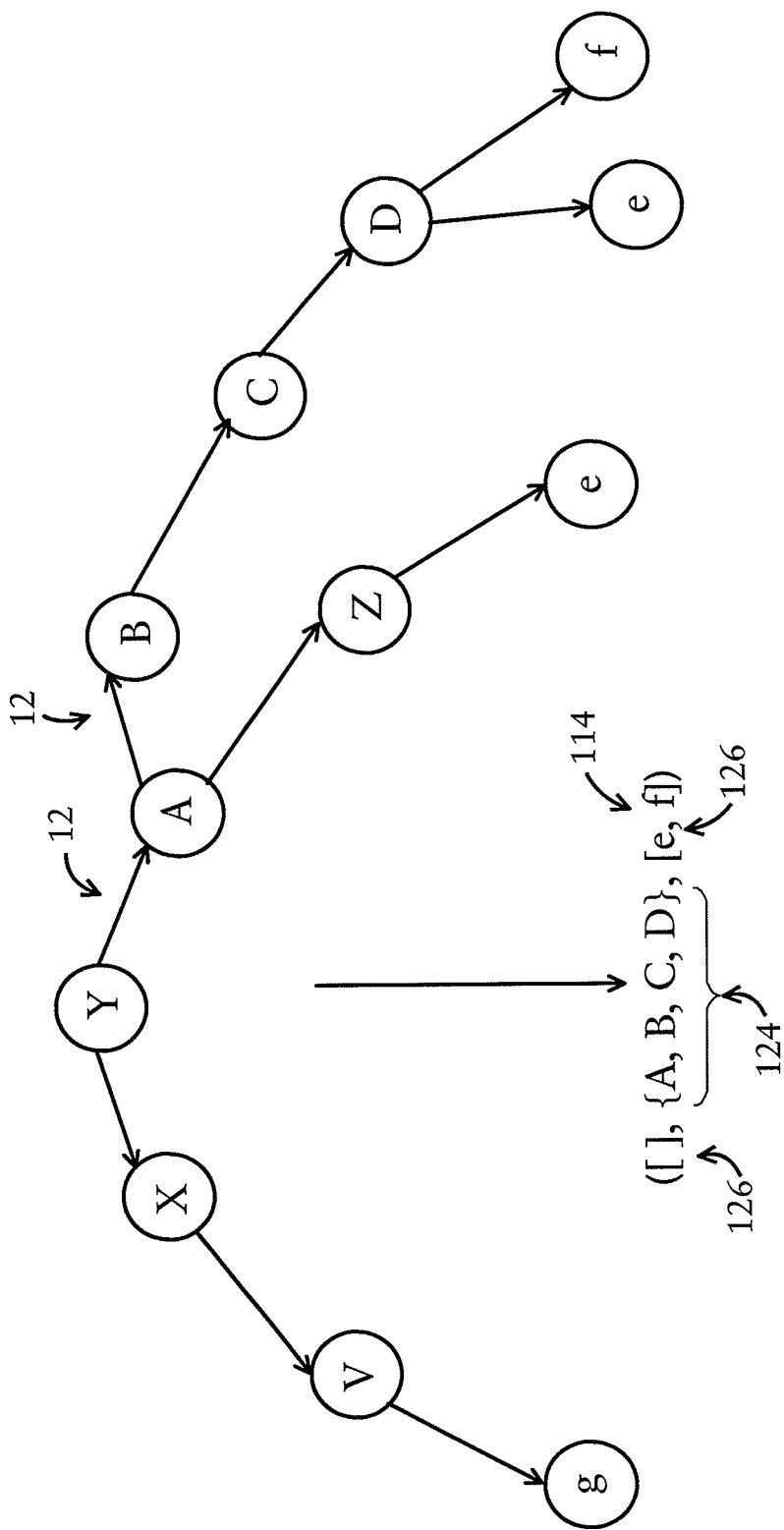
FIG. 14 illustrates an example serialized representation of a buttressing arc, according to an example embodiment.

As illustrated in FIG. 14, a serialized arc format 114 also can be generated in operation 112e for a buttressing arc having zero (i.e., null) exit nodes on one end of the routing arc 12 a contiguous sequence of arc nodes along the buttressing arc (A, B, C, and D), with a list of exit nodes (e, f) coupled to the last network node "D".

Hence, the serialized arc format 114 for each routing arc 12 includes a first list of exit nodes 126, followed by a source route 124 of nodes along the arc, ending with another list 126 of exit nodes of the arc, enabling the formation of a complete source route along the corresponding arc 12; in the case of a buttressing arc as in FIG. 14, one of the lists 126 can have null entries, however the other list 126 must specify at least one exit node for the arc. Hence, the serialized arc format 114 includes metadata for identifying the art cursor (via the serialized arc identifier 122), exit nodes (126), and the intermediate nodes 124 between the exit nodes and along the routing arc 12.

Hence, in operation 112 of FIGS. 8 and 9 the processor circuit 22 of the apparatus 20 assembles the serialized arc formats 114 for each of the individual arcs 12 into a single set 116 of serialized arcs. As described previously, the single set 116 of serialized arcs are output by the destination (omega) node 14 to the network nodes for propagation in operation 118 of the topology control messages 102 to enable building of the label switched paths by the network nodes 16.

Figure 11:
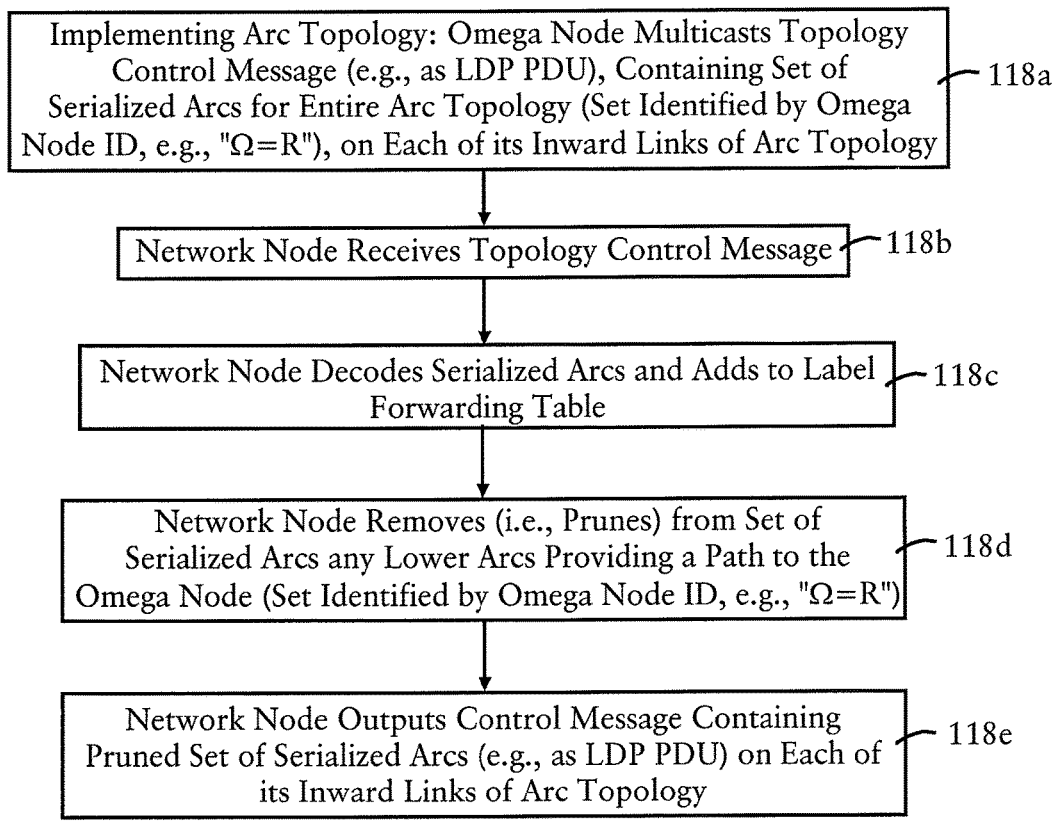
FIG. 11 illustrates implementing the loop-free routing topology based on propagating the set of serialized representations from the destination network node to network nodes in the computing network, according to an example embodiment.

FIG. 11 illustrates example propagation 118 of the topology control messages 102 throughout the network nodes 16, according to an example embodiment. The omega node 14 outputs in operation 118a the topology control message 102, for example as a label distribution protocol (LDP) protocol data unit (PDU). As described previously, the topology control message 102 includes a set 116 of all the serialized arcs (114a through 114h); further, each topology control message 102 output by each network node 16 specifies a corresponding unique locally significant label "O" for associating the LDP PDU to the forwarding equivalence class "Ω=R".

In response to a network node 16 receiving in operation 118b a topology control message 102, the corresponding processor circuit 22 of the network node 16 can parse from the topology control message 102 the locally significant label "O", and the set 116 of serialized representations containing the serialized arc identifiers 122 and the serialized arc formats 114 describing the respective paths 12. The corresponding processor circuit 22 of the network node 16 can decode in operation 118c the serialized arcs, as identified by their respective serialized arc identifiers 122 and their respective serialized arc formats 114, and create the necessary entries into label forwarding table of the network node 16. The network node 16 can optionally remove (i.e. proven) in operation 118d at least one of the serialized representations from the received topology control message 102 based on the corresponding path being positioned between the network node and the destination 14. The pruning of operation 118d is described in further detail below with respect to FIG. 12. The network node 16 outputs in operation 118e a modified (i.e., pruned) topology control message 102 on each of its inward arcs of the arcs topology 10, for propagation to the next network nodes in the topology 10.

FIG. 12 illustrates a selective pruning of selected paths 12 from the set 116 of serialized representations propagated in the topology control message 102 by network nodes within the loop-free routing topology 10, according to an example embodiment. The specific serialized arc formats 114 are omitted from FIG. 12 for simplicity, hence each arc is represented in FIG. 12 merely by its serialized arc identifier 122.

Operations 128a through 128m illustrate operation 118d of FIG. 11 executed by the different outputting network nodes. As illustrated with respect to operation 128a, there is no pruning performed in the output set of serialized arcs 116 when transmitting the topology control message 102 from the destination node (Ω=R) 14 to the nodes along the root arc "ARC2", namely from the destination node (Ω=R) 14 to either node "A" or "B", from node "A" to "C", from node "C" to node "F", from node "F" to node "J", etc. to node "B"; from node "B" to node "K", from node "K" to node "J", etc.

Hence, the topology control message 102 output from the destination node (Ω=R) 14 to node "A" is propagated around the arc "ARC2" 12, enabling each network node 16 node along the path ARC2" 12 in the first direction to update its label forwarding table with the source node's locally significant label O, and swap with a new locally significant label O' for use by the next hop node; similarly, the topology control message 102 output from the destination node (Ω=R) 14 to node "B" is propagated around the arc "ARC2" 12, enabling each network node 16 along the path "ARC2" 12 in the second direction to update its label forwarding table with the source node's locally significant label O", and swap with a new locally significant label O'" for use by the next hop node.

In contrast, the network nodes 16 in the routing arcs above the root arc "ARC2" 12 (identified by its serialized art identifier "J" 122) do not need the topology information for the root arc; hence, the network nodes "A", "C", and "F" can selectively prune the full set of serialized arcs 116a as illustrated in operations 128b, 128c, 128d, 128e. for example, in operation 128b the network nodes "A" and "C" can prune the serialized arcs "J" and "M" (as represented in FIG. 10) from the set of serialized arcs 116a, in order to send the pruned set 116b to the network node "D"; similarly, the network nodes "C" and "E" can prune in operation 128c the serialized arcs "J", "M", and "D" from the set of serialized arcs 116a, in order to send the pruned set 116c to the network node "E"; the network node "F" can prune in operation 128d the serialized arcs "J", "M", "D", "E1", and "E2" from the set of serialized arcs 116a, in order to send the pruned set 116d to the network node "H"; the network node "F" also can prune in operation 128e the serialized arcs "J", "M", "D", "E1", "E2", "H1", and "H2" from the set of serialized arcs 116a, in order to send the pruned set 116e to the network node "I".

Operations 128*f* through 128*l* illustrated further pruning that can be executed by other nodes in arcs that are above the root arc ARC2. Hence, each network node can selectively prune at least one of the serialized representations 114 from the received topology control message 102 based on the corresponding path 12 being positioned between the at least one network node and the destination network node 14, and output the modified (i.e., pruned) topology control message to another one of the network nodes away from the destination and the selectively pruned path.

Figure 13:
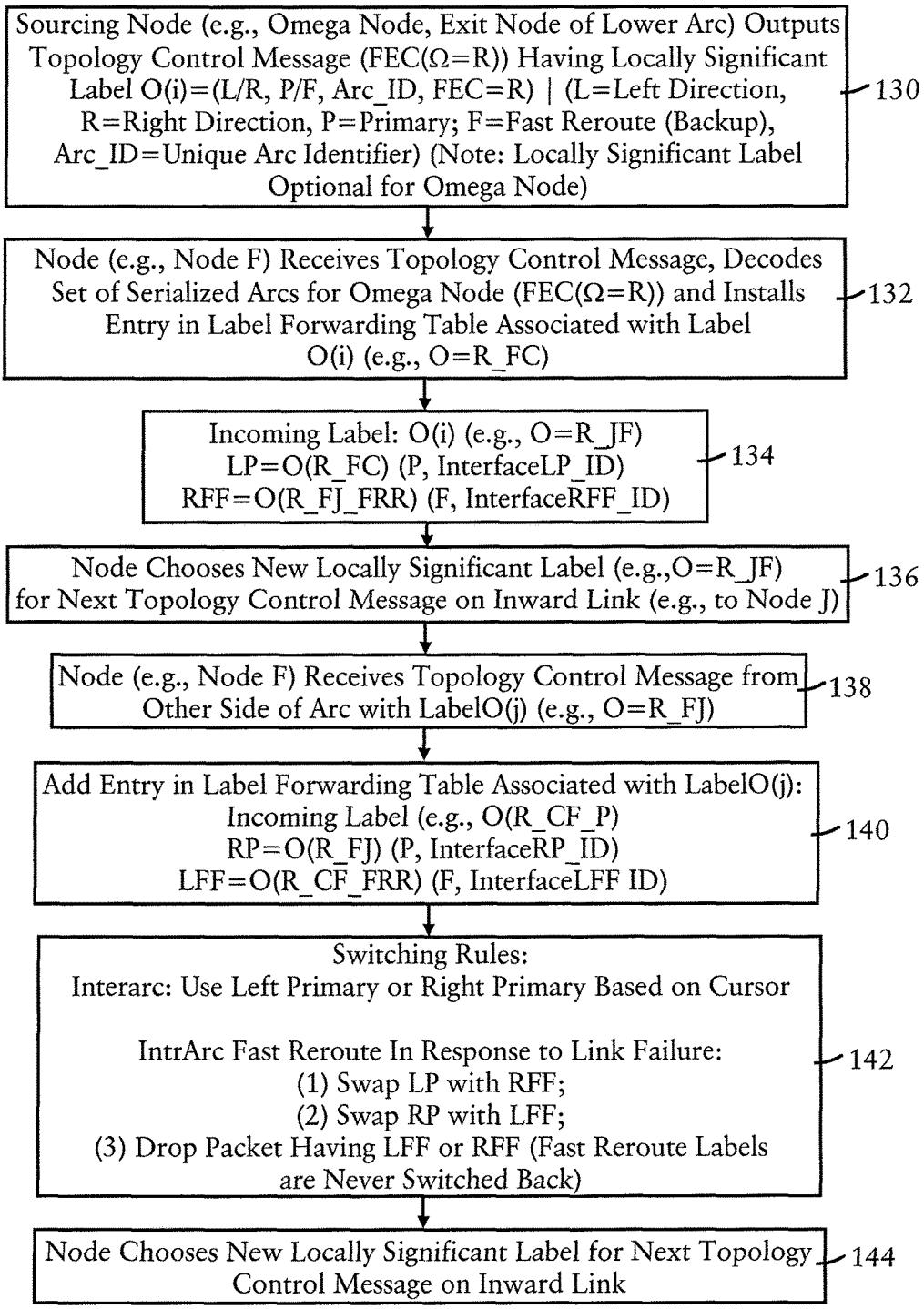
FIG. 13 illustrates an example method of the establishment of loop-free label switched paths by the network nodes receiving the set of serialized representations from the destination network node, according to an example embodiment.

FIG. 13 illustrates an example method of establishing the loop-free label switched paths by the network nodes receiving the set 116 of serialized representations from the destination network node 14, according to an example embodiment.

As described previously, the sourcing network node (e.g., the destination node ($\Omega$=R) 14 or an exit node of a lower routing arc 12) outputs a topology control message 102 specifying the forwarding equivalence class (FEC) for the destination node ($\Omega$=R) 14; the topology control message 102 also specifies a locally significant label O that is unique for the sourcing node based on path direction, whether the path is the primary (default) path or a fast reroute (backup) path, arc identifier, and the forwarding equivalency class.

Assume the receiving network node that receives in operation 130 the topology control message 102 is node "F" that receives the topology control message from the node C: the topology control message specifies the label "O=R_FC" generated by the node "C" (i.e., for the FEC=R, output on link C-F in the "LEFT" direction from node F to node C). In response, the node "F" decodes in operation 132 the set of serialized arcs for the forwarding equivalence class and installs an entry in the label forwarding table associated with the locally significant label "O=R_FC" specified in the topology control message 102.

FIG. 15 illustrates an example label forwarding table 148 stored in the memory circuit 26 of the network node "F" 16, according to an example embodiment. In particular, the processor circuit 22 of the node "F" creates an entry in operation 134 of FIGS. 13 and 15, using the new label "O=R_JF" created by node "F" as an index: hence, any data packet received by node "F" (e.g., from node J) containing the label "O=R_JF" is swapped with the left primary swap label (LP) "O=R_FC" and output on the network interface identified as "InterfaceLP_ID" to the link F-C for switching to the node "C"; if the node "F" detects a failure on the link C-F, then fast reroute can be instantly implemented by swapping the label "O=R_JF" with the right-direction fast reroute (RFF) label "O=R_FJ_FRR" and outputting the packet on the interface "InterfaceRFF_ID" for transmission of the data packet via the link F-J back to the node "J".

The network node (e.g., "F") can choose in operation 136 a new locally significant label for each of the other next hop nodes that did not send the topology control message 102, and forward the topology control message on the inward links (e.g., F-J, F-I, F-H, or F-E). The relevant table entries also are created in operation 150 of FIG. 15. For example, the network node "F" would send to the network node "J" the topology control message 102 specifying the set of serialized representations, and the labels "O=R_JF" for the default path and "O=R_FJ_FRR" for the fast reroute (FRR) path.

Assuming in operation 138 that another topology control message 102 is received from the other side of the arc (e.g., "F" receives the message 102 from node "J" with the label "O=R_FJ"), the node "F" can add the corresponding entry in the label forwarding table in operation 140, including a right primary swap label (RP) and a left fast reroute (LFF), enabling association of the locally significant label (e.g., "O=R_CF") as described previously, but in the opposite direction.

The processor circuit 22 in each network node 16 also implements switching rules in operation 142, illustrated in FIG. 15 based on the incoming label. In particular, for Inter-arc switching 152, either the left primary or right primary labels may be used depending on the position of the network node relative to the arc cursor. For intra-arc (i.e. within the arc) switching 154, loop-free fast reroute is utilized in response to a detected local link failure: (1) a left primary (LP) label is swapped with a Right Fast Reroute (RFF) label; (2) a right primary (RP) label is swapped with a Left Fast Reroute (LFF) label; and (3) any received packet having a RFF label or LFF label is dropped to prevent the formation of a loop (156 of FIG. 15).

Hence, fast reroute is implemented instantly in response to a detected link failure: four label switched paths are maintained by each network node, namely: left-primary (in the left direction), right-fast reroute (in the right direction in response to a detected link failure for left-primary), right-primary (in the right direction), and left-fast reroute (in the left direction in response to a detected link failure for right-primary). Further, a fast reroute label state is propagated in the rerouted direction; hence, a second link failure in the same arc will cause the data packet to be dropped, avoiding the formation of a loop.

The topology control message received in operation 144 also is forwarded after a new locally significant label is chosen.

Hence, labels can be established within a routing topology that enables full redundancy in two connected graphs: a new label distribution protocol format is introduced that contains a new non-linear source route information to describe the routing arc topology. Each routing arc allows one link failure, hence the arc topology can support multiple concurrent link failures that might occur in different routing arcs. Further, the label distribution protocol can be deployed automatically and independently by the network nodes in the computing network.

Creating Routing ARCS and Label Switched Paths in a Multi-Level Hierarchy

Figure 16:
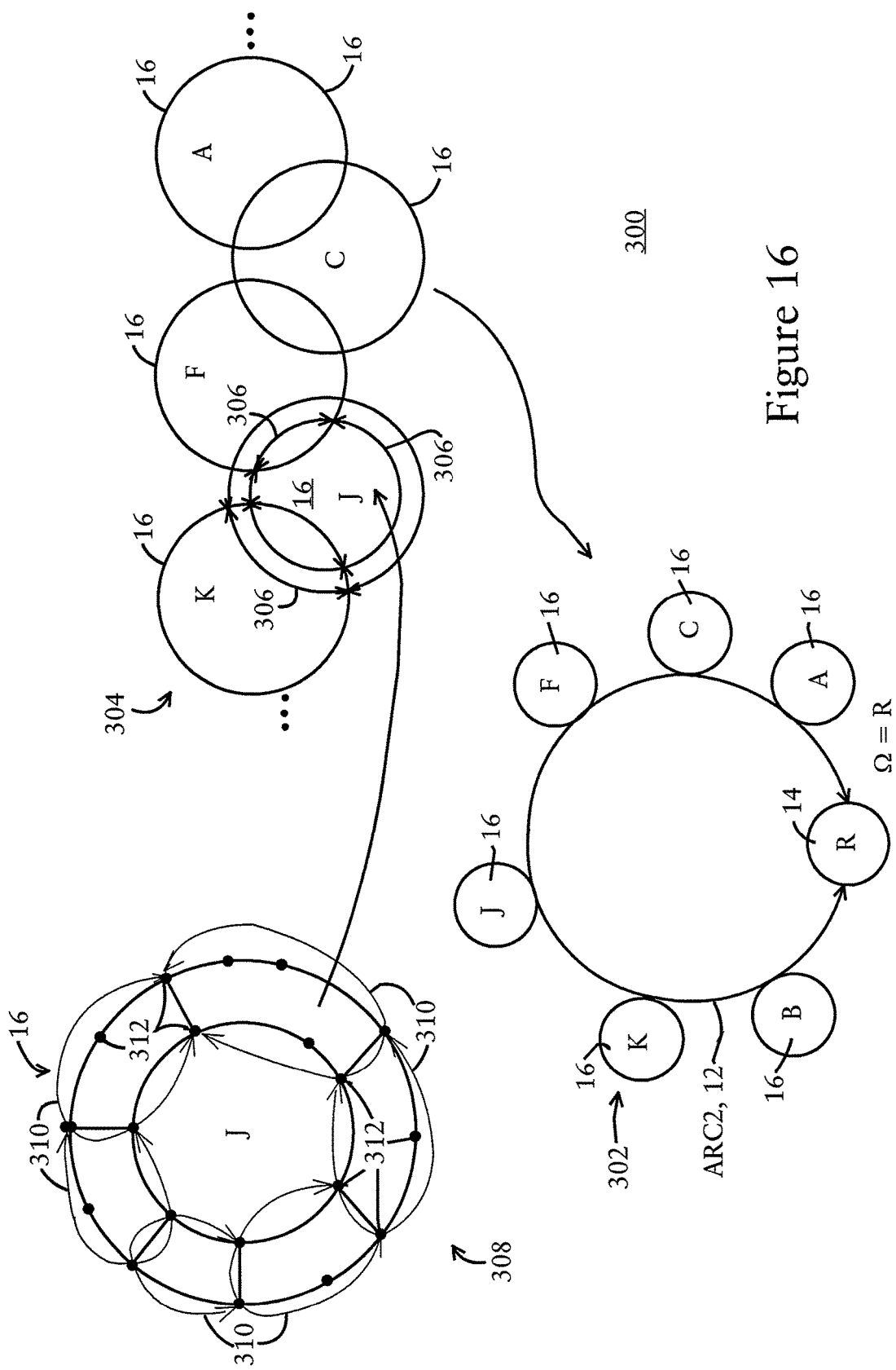
FIG. 16 illustrates an example hierarchy of routing arcs within the loop-free routing topology of FIG. 2, including a primary routing arc in a primary hierarchal level of the loop-free routing topology, secondary routing arcs in a secondary hierarchal level of one of the network nodes in FIG. 2 implemented as a ring-based network, and tertiary routing arcs in a tertiary hierarchal level of one of the secondary routing arcs, according to an example embodiment.

FIG. 16 illustrates creation of at least a portion of the loop-free routing topology 10 (e.g., the primary routing arc "ARC2" 12) according to a multi-level hierarchy 300, according to an example embodiment. The multi-level hierarchy 300 includes the primary hierarchal level 302 of the primary routing arcs 12 (also referred to as omega routing arcs), and a second hierarchal level 304 of secondary routing arcs 306 (also referred to lambda routing arcs) connecting adjacent network nodes 16. The multi-level hierarchy 300 also can further include a third hierarchal level 308 of tertiary routing arcs 310 providing reachability within at least one lambda routing arc 306 to an adjacent network node 16. As described below, the tertiary routing arcs 310 can be used in network nodes 16 having complex ring topologies, for example ring-based networks utilizing multiple concentric rings of routers that are connected by one or more data links between the concentric rings.

Figure 17A:
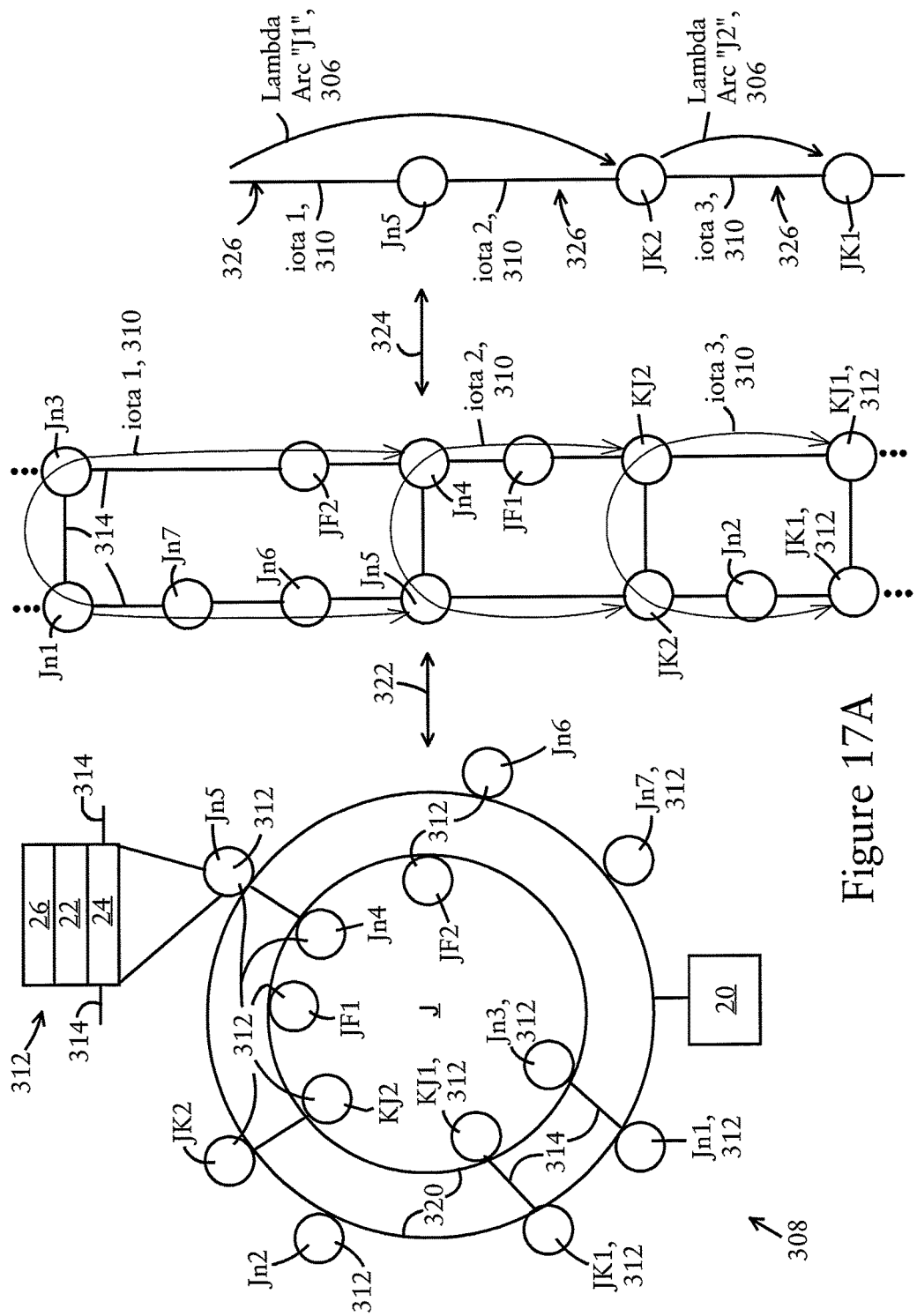
FIGS. 17A and 17B illustrate tertiary routing arcs implemented within a prescribed ring topology having a first and second concentric ring of routers and underlying the secondary routing arcs of the prescribed ring topology, according to an example embodiment.
Figure 17B:
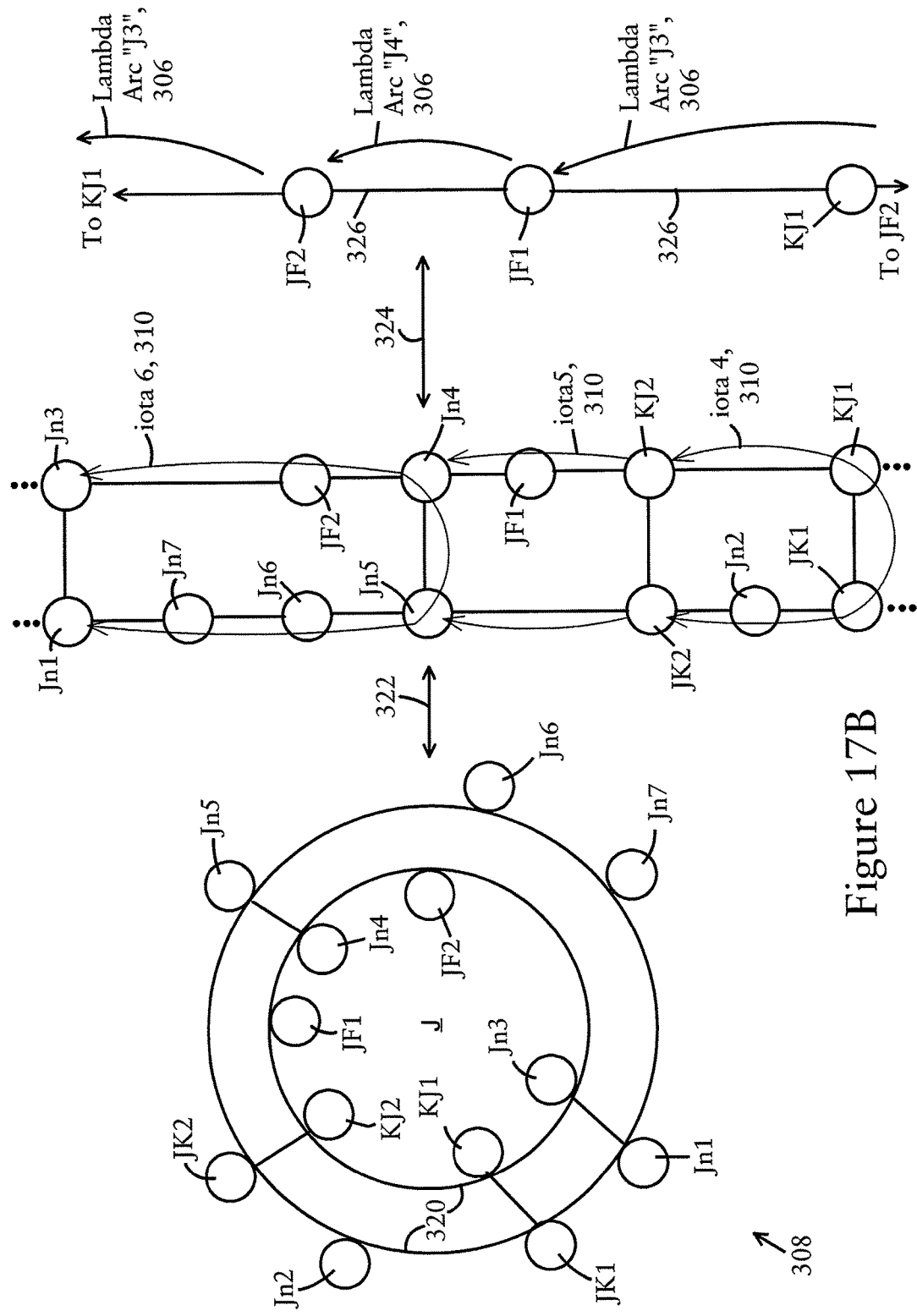

FIGS. 17A and 17B illustrate tertiary routing arcs 310 implemented within a prescribed ring topology having a first and second concentric ring 320 of routers and underlying the secondary routing arcs of the prescribed ring topology, according to an example embodiment. Each of the network nodes 16 (or at least one of the network nodes 16) can be implemented as a ring-based network having a prescribed ring topology.

As illustrated in FIG. 17A, each of the network nodes 16 (e.g., "J") can include a plurality of routers 312. Each router 312 can comprise a processor circuit 22, a network interface circuit 24 configured for connecting the routers 312 via data links 314 (e.g., optical fiber links, Gigabit Ethernet Links, etc.), and a memory circuit 26 configured for storing label forwarding tables (e.g., as illustrated in FIGS. 15, 20, 21, and 23) and other data structures described herein.

At least one of the network nodes 16 also can include the apparatus 20 configured for creating the loop-free routing topology according to a multi-level hierarchy, including creating the primary routing arcs 12, the secondary routing arcs 306, and the tertiary routing arcs 310. Alternately, each network node that is implemented as a ring-based network also can have its own corresponding apparatus 20 for creating the tertiary routing arcs (iota arcs) 310 during deployment of the associated routers 312 and data links 314, and creating the secondary routing arcs (lambda arcs) 306 during establishment of connections with adjacent network nodes 16. The lambda arcs 306 and iota arcs 310 (and their associated label switched paths) can be established using the techniques described previously with respect to establishing the omega arcs 12 and their associated label switched paths. Since lambda arcs 306 are independent and distinct from the iota arcs 310 and the omega arcs 12, each hierarchy can be established independent of any other hierarchy level.

Figure 27:
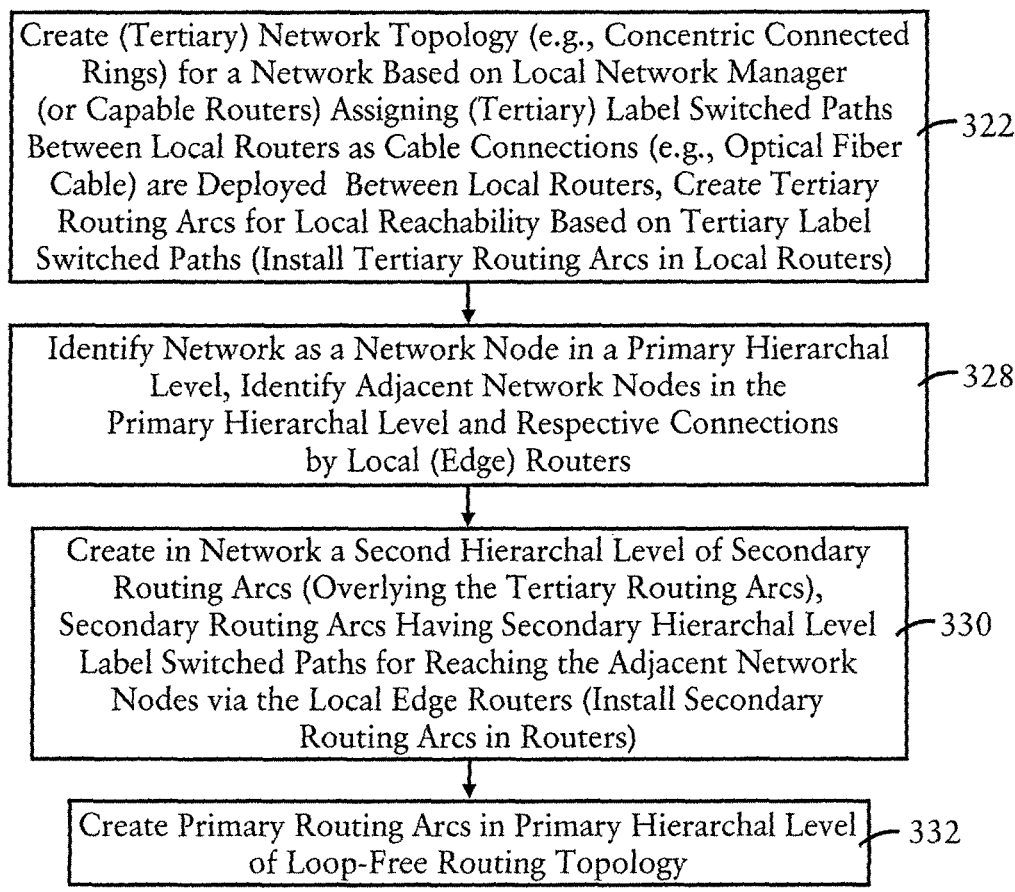
FIG. 27 illustrates creating the primary routing arcs in the primary hierarchal level of the loop-free routing topology, the secondary routing arcs in the secondary hierarchal level underlying the primary hierarchal level, and the tertiary routing arcs in the tertiary hierarchal level underlying the secondary hierarchal level, according to an example embodiment.

FIG. 27 illustrates an example method of creating the routing arcs in the loop-free routing topology 10 according to a multi-level hierarchy 300, including creating tertiary routing arcs 310, secondary routing arcs 306, and primary routing arcs 12, according to an example embodiment. Each of the disclosed operations with respect to FIG. 27 can be executed by the processor circuit 22 of the apparatus 20, or any logic encoded on a tangible computer readable storage medium, as described previously.

The processor circuit 22 can create in operation 322 the third hierarchal level of tertiary routing arcs 310 having tertiary hierarchal level label switched paths that are independent and distinct from any secondary hierarchal level label switched paths. For example, the network node "J" 16 is illustrated in FIGS. 17A and 17B as having first (outer) and second (inner) concentric rings 320 of routers 312, and one or more data links 314 that interconnect the inner and outer rings 320.

As described previously, routing arcs are created for reaching a prescribed destination, illustrated in FIG. 1 and FIG. 2 as a destination node 14; further, label switched paths can be established for the routing arcs, based on the forwarding equivalence class (FEC) being established for the same destination as the routing arcs. Hence, the relatively complex multiple-ring network topology of the network node "J" 16 as illustrated in FIG. 16 can be easily modeled as a series of tertiary (iota) routing arcs 310 for reaching a prescribed destination, using the above-described techniques for creating a loop-free routing topology.

For example, FIG. 17A illustrates creating in operation 322 a series of tertiary routing arcs 310 for reaching the destination routers "JK1" and "KJ1" 312. Further, tertiary label switched paths can be assigned between the local routers 312 as cable connections such as optical fiber cable connections are deployed between the local routers 312 during installation of the network "J" 16. Hence, a series of the tertiary routing arcs (e.g., "iota1", "iota2", "iota3") 310 can be created for reaching each router (e.g., "KJ1") 312, where a corresponding set of tertiary hierarchal level label switched paths are established for reaching the corresponding router (e.g., FEC="KJ1") 312. FIG. 17B illustrates creating in operation 322 another series of tertiary routing arcs (e.g., "iota4", "iota5", "iota6") 310 for reaching another router (e.g., "Jn1" or "Jn3") 310, where respective tertiary hierarchal level label switched paths can be assigned between each network node, for switching data packets along the iota arcs 310.

Hence, initial deployment of a network (e.g., "J") can include establishing the iota arcs 310 and associated tertiary hierarchal level label switched paths for each destination router 312 within the network (e.g., "J"), providing robust and fault tolerant paths to each destination. As described previously, each label switched path can provide for paths along a routing arc, including a first direction (e.g., "left" away from the cursor 18), a second direction (e.g., "right" toward the cursor 18), a third direction (e.g., "left-fast reroute"), and a fourth direction (e.g., "right-fast reroute"). Hence, the tertiary hierarchal level label switched paths can provide for paths along each tertiary routing arc 310 for reaching a prescribed destination within a ring-based network according to the relevant forwarding equivalence class. Consequently, the third hierarchal level 308 of tertiary routing arcs define the tertiary hierarchal level label switched paths for reaching a destination router 312 within a given network node 16 according to a prescribed network topology of the network node.

As illustrated in FIGS. 17A and 17B, any one of the routers 310 can be modeled in operation 324 as "super nodes" (e.g., "Jn5", "JK2", and "JK1" in FIG. 17A; "KJ1", "JF1", and "JF2" in FIG. 17B) that are connected by the underlying iota arcs 310 (illustrated in FIGS. 17A and 17B as "virtual links" 326).

Hence, the third hierarchal level 308 of tertiary routing arcs 310 is established based on the apparatus 20 assigning tertiary label switched paths between the local routers 312, for example as cable connections are deployed between the local routers: the tertiary routing arcs 310 for local reachability to the local routers 312 are established based on tertiary label switched paths which are installed in each of the local routers 312.

Figure 18:
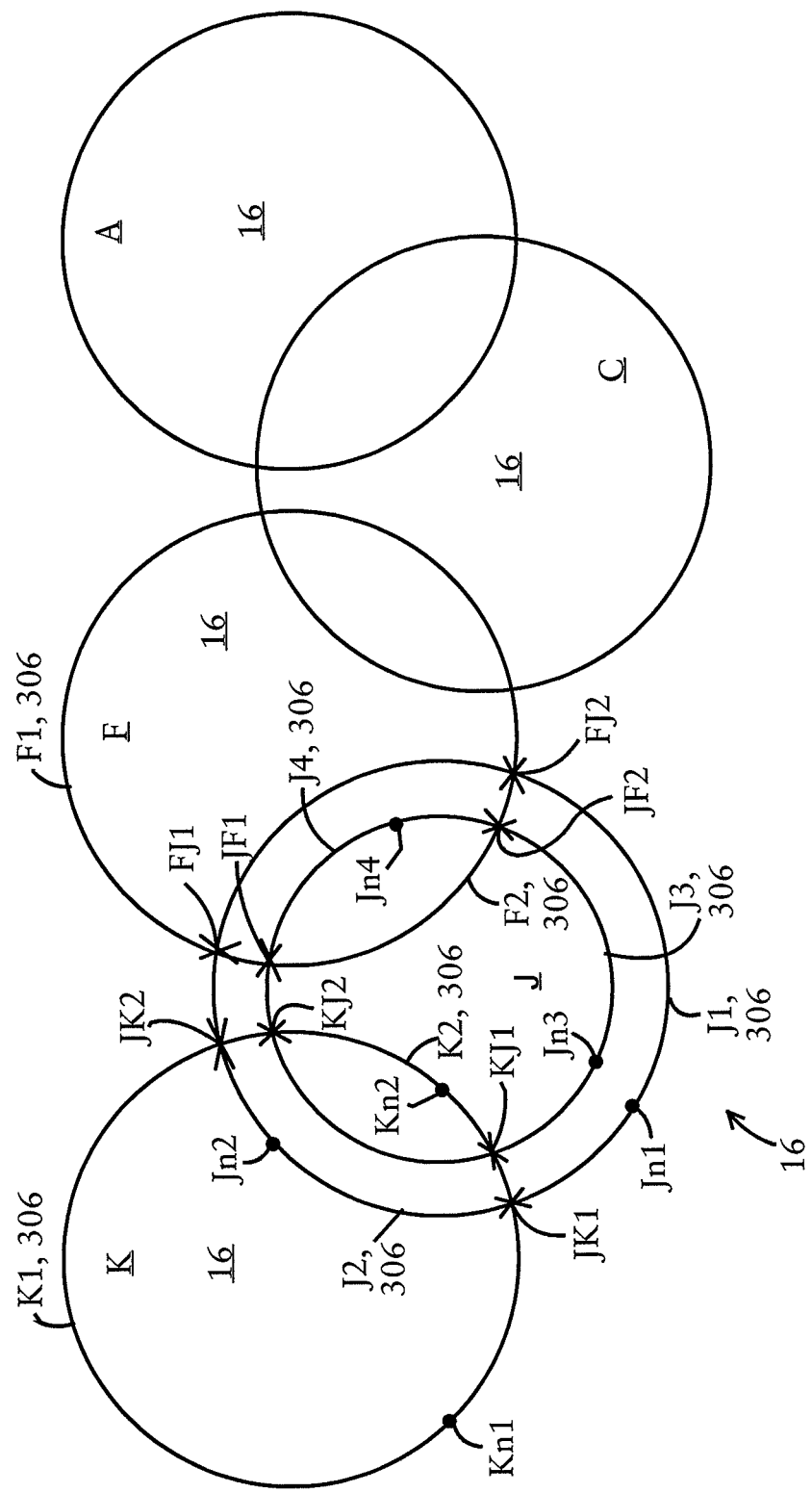
FIG. 18 illustrates in further detail the secondary routing arcs in one of the network nodes according to an example embodiment.

The apparatus 20 identifies in operation 328 identifies the network (e.g., "J") as a network node in the primary hierarchal level 302 of network nodes representing interconnected networks, and identifies adjacent network nodes 16 in the primary hierarchal level 302. As illustrated in FIG. 18, the apparatus 20 can identify in operation 328 the network nodes "K" and "F" 16 are adjacent to the network node "J" based on determining the network node "J" 16 has at least one connection between each of the adjacent network nodes "K" and "F".

The apparatus 20 also identifies in operation 328 at least one local router 312 in the network node "J" 16 that provides a connection to the adjacent network nodes "F" and "K" 16. As illustrated with respect to FIG. 18, the apparatus 20 (implemented, for example, within the network node "J" 16) can determine that: the routers "JF1" and "JF2" 312 each provide a connection from the network node "J" 16 to the network node "F"; and the routers "JK1" and "JK2" 312 each provide a connection from the network node "J" 16 to the network node "K" 16. Assuming no corresponding apparatus 20 is implemented within the network nodes "F" and "K", the apparatus 20 within the network node "J" 16 also can be configured for determining that the routers "KJ1" and "KJ2" 312 each provide a connection from the network node "K" 16 to the network node "J" 16; and the routers "FJ1" and "FJ2" 312 each provide a connection from the network node "F" 16 to the network node "J" 16.

Hence, the apparatus 20 in operation 330 can create a second hierarchal level 304 of secondary routing arcs 306, also referred to as lambda arcs. FIG. 19 illustrates the lambda arcs 306 created by the apparatus 20 using the above-described serialized arc representation. For example, the apparatus 20 can create in operation 330 the lambda arcs "J1" and "J2" 306 each having the edge junction routers "JK1" and "JK2" 312 for reaching the adjacent network node "F" in the primary hierarchal level 300, using the previously-described arc formation techniques. The apparatus 20 also can create in operation 330 the lambda arcs "J3" and "J4" 306 having the edge junction routers "JF1" and "JF2" 312 for reaching the adjacent network node "F" in the primary hierarchal level 300. The apparatus 20 also can provide secondary hierarchal level label switched paths for reaching the adjacent network nodes "F" and "K" via the local edge routers (e.g., "JF1", "JF2", "JK1", "JK2"); as described previously, each routing arc can include four label switched paths with respect to direction and primary versus fast reroute (frr). Hence, each secondary routing arc 306 includes four secondary hierarchal level label switched paths. As illustrated in FIG. 18, the network nodes "F" and "K" utilize a single ring topology, hence use of the lambda labels K1, K2 306 (by the network node "K" 16) and the lambda labels "F1", "F2" 306 (by the network node "F") are sufficient to provide reachability to the adjacent network node "J".

In contrast, the relatively complex concentric ring topology of the network node "J" can rely on the iota arcs 310 of FIGS. 17A and 17B underlying the lambda arcs "J1", "J2", "J3", and "J4" to provide reachability from the network node "J" to the adjacent network nodes "K" and "F".

Hence, use of the lambda arcs 306 enable the adjacent network nodes "K", "J", and "F" to forward a data packet from one network node 16 to another adjacent network node 16 using a secondary routing arc (lambda arc) 306 having four secondary hierarchal level label switched paths, where the network node "K" 16 can forward data packets to the network node "J" 16 via the lambda arc "K1" or "K2" 306, and the network node "J" 16 can forward data packets to the network node "F" 16 via the lambda arcs "J3" or "J4" 306. Similarly, the network node "F" 16 can forward data packets to the network node "J" 16 via the lambda arcs "F1" or "F2" 306, and the network node "J" 16 can forward data packets to the network node "K" 16 via the lambda arcs "J1" or "J2" 306. Further, the routers 312 in the network node "J" 16 can utilize the iota arcs 310 underlying the lambda arcs "J1", "J2", "J3" and "J4" 306 to provide reachability between logical "hops" in each lambda arc 306.

Figure 28:
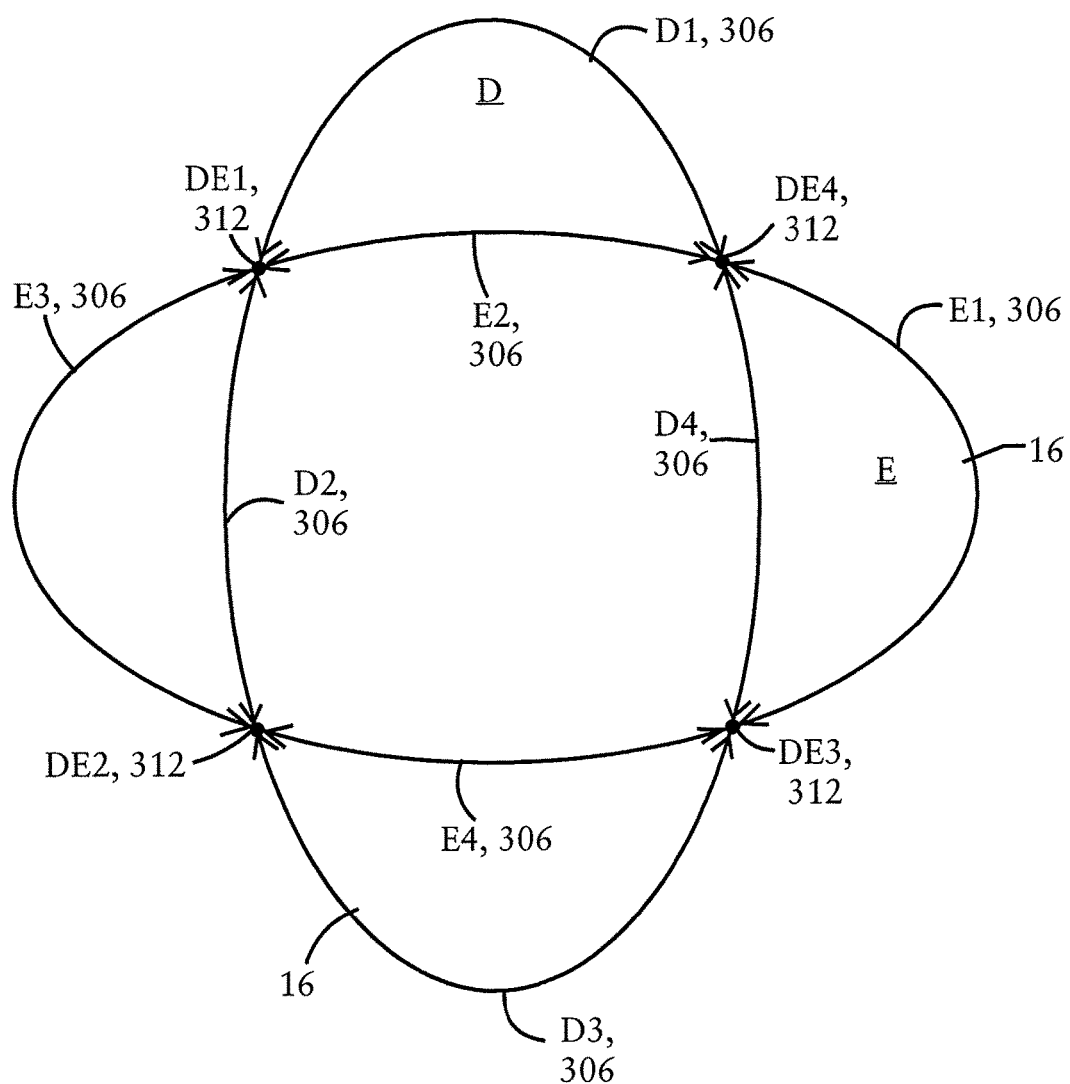
FIG. 28 illustrates creating secondary routing arcs, in the secondary hierarchal level, between contiguous intersections of network nodes having ring topologies, according to an example embodiment.

FIG. 28 illustrates the apparatus 20 in operation 330 creating secondary routing arcs, in the secondary hierarchal level, between contiguous intersections of network nodes having ring topologies, according to an example embodiment. FIG. 28 illustrates an alternate implementation of operation 330, where network nodes "D" and "E" 16 each have ring topologies. The network nodes "D" and "E" 16 intersect at the intersecting routers "DE1", "DE2", "DE3", and "DE4" 312. Although not shown in FIG. 28, other routers 312 can be deployed along the rings of network nodes "D" and "E" 16 between the intersecting routers "DE1", "DE2", "DE3", and "DE4" 312. The lambda arcs (e.g., D1, D2, D3, D4, E1, E2, E3, and/or E4) 306 can be created by the apparatus 20 in response to the apparatus 20 detecting that the routers "DE1", "DE2", "DE3", and/or "DE4" 312 create an intersection (or connection) with an adjacent network node 16. For example, any one of the lambda arcs 306 of FIG. 28 can be created before, during, or after initial deployment of the network nodes 16 (when the optical fiber connections between the routers 312 are installed). As illustrated in FIG. 28, each arc 306 can be formed between contiguous intersections, such that the lambda arc "D1" is formed by the apparatus 20 between the contiguous intersecting routers "DE1" and "DE4" 312, the lambda arc "D2" is formed between the contiguous intersecting routers "DE1" and "DE2" 312, the lambda arc "D3" is formed between the contiguous intersecting routers "DE2" and "DE3" 312, and the lambda arc "D4" is formed between the contiguous intersecting routers "DE3" and "DE4" 312.

Similarly, the apparatus 20 in operation 330 can form the lambda arc "E1" between the contiguous intersecting routers "DE3" and "DE4" 312, the lambda arc "E2" between the contiguous intersecting routers "DE1" and "DE4" 312, the lambda arc "E3" between the contiguous intersecting routers "DE1" and "DE2" 312, and the lambda arc "E4" between the contiguous intersecting routers "DE2" and "DE3" 312.

Hence, the creating of the second hierarchal level of secondary routing arcs (e.g., D1, D2, D3, D4, E1, E2, E3, and/or E4) 306 can include creating the secondary routing arcs between contiguous intersections (e.g., intersecting routers "DE1", "DE2", "DE3", and "DE4" 312) between the at least one network node (e.g., "D") 16 and the adjacent network node (e.g., "E") 16.

FIG. 27 also illustrates the apparatus 20 creating in operation 332 the primary hierarchal level 302 of primary routing arcs 12, also referred to as omega arcs 12, for reaching a prescribed destination node 14, along with the associated primary hierarchal level label switched paths (described previously with respect to FIGS. 1-15).

Upon creating the tertiary routing arcs 310 and associated tertiary hierarchal level label switched paths, the secondary routing arcs 306 and the associated secondary hierarchal level label switched paths, and the primary routing arcs 12 and the associated primary hierarchal level label switched paths, the routers 312 are loaded with the appropriate multi-level hierarchy label switched forwarding tables to enable routing using the multi-level hierarchy of tertiary routing arcs 310 within a network node 16, secondary routing arcs 306 between adjacent network nodes 16, and primary routing arcs 12 across network node 16 for a prescribed destination node 14.

FIG. 20 illustrates example multi-level hierarchy label switched forwarding tables 334 implemented in ingress routers of the network node "J" 12, according to an example embodiment. FIG. 21 illustrates an example multi-level hierarchy label switched forwarding table 336 implemented in egress routers of the network node "J" 12, according to an example embodiment. The forwarding tables 334 and 336 utilize primary hierarchal level label switched paths 338a, 338b, 338c, and 338d as illustrated in FIG. 22.

Figure 22:
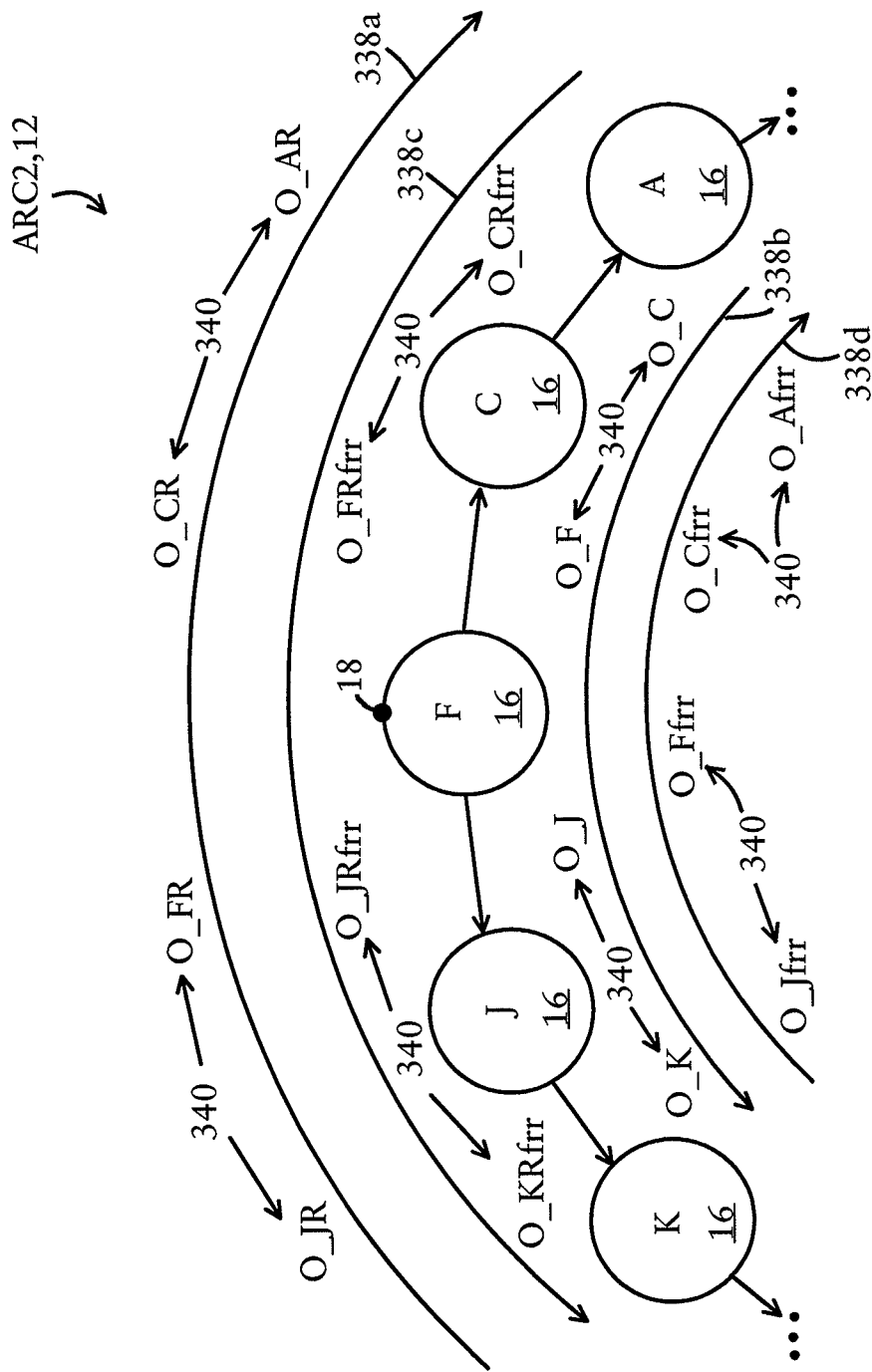
FIG. 22 illustrates primary hierarchal level label switched paths for the primary routing arc of FIG. 16, according to an example embodiment.

FIG. 22 illustrates a simplified view of the primary hierarchal level label switched paths (e.g., 338a, 338b, 338c, 338d), where the multiple connections between the network nodes 16 (as in FIG. 18) can be represented as a single line representing a primary hierarchal level label switched path. As illustrated in FIG. 22, the omega arc "ARC2" 12 includes four label switched paths, namely a first-direction (right-direction) path 338a (based on the primary hierarchal level switching labels O_JR, O_FR, O_CR, and O_AR 340), 338, a second-direction (left-direction) path 338b (based on the primary hierarchal level switching labels O_C, O_F, O_J, O_K 340), a first-direction fast reroute (frr) path 338c (based on the primary hierarchal level switching labels O_CRfrr, O_FRfrr, O_JRfrr, O_KRfrr 340), and a second-direction fast reroute (frr) path 338*d* (based on the primary hierarchal level switching labels O_Jfrr, O_Ffrr, O_Cfrr, and O_Afrr 340). As illustrated in FIG. 22, the network node "F" 16 has possession of the arc cursor 18 for the omega arc "ARC2" 12.

As illustrated in FIG. 20, the respective memory circuits 26 of ingress routers "FJ1" and "FJ2" 312 in the network node "J" are loaded by the apparatus 20 with the first two columns (Incoming Label="O_J" or "O_JRfrr") of the multi-level hierarchy label switched forwarding table 334. The respective memory circuits 26 of ingress routers "KJ1" and "KJ2" 312 in the network node "J" are loaded by the apparatus 20 with the last two columns (Incoming Label="O_JR" or "O_Jfrr") of the multi-level hierarchy label switched forwarding table 334.

Hence, in response to either the ingress routers "FJ1" and "FJ2" 312 receiving a data packet from the network node "F" 16 and specifying the primary label "O_J" 340, the ingress routers can encapsulate the received data packet with the lambda label for the encapsulating lambda arc "J1" 306: as described previously, each lambda arc 306 has four secondary hierarchal level label switched paths for forwarding the data packet; if, however, none of the four label switched paths for the lambda arc "J1" are able to forward the data packet to either of the edge routers "JK1" or "JK2" (illustrated in FIG. 18), the ingress routers "FJ1" or "FJ2" can swap the omega label "O_J" with the alternate fast reroute label "O_Jfrr" 340, for transmission back to the network node "F" 16 for attempted delivery via an alternate label switched path 338*d*. Similarly, in response to the ingress routers "KJ1" or "KJ2" 312 receiving a data packet specifying the omega label "O_JR" 340 from the network node "K" 16, the ingress routers "KJ1" or "KJ2" 312 can encapsulate the received data packet with a lambda label for the encapsulating lambda arc "J3" 306, using the four available secondary hierarchal level label switched paths: a failure in the encapsulating lambda arc "J3" can cause the ingress routers "KJ1" or "KJ2" 312 to swap the omega label "O_JR" 340 with the fast reroute label "O_JRfrr" 340 for routing via the alternate primary label switched path 338*c*.

Hence, the ingress routers have multiple paths for forwarding a received data packet within a network node 16. As described previously, the ingress routers 312 (or any other routers 312 within the network 16) also can utilize the iota arcs 310 underlying the lambda arcs 306 for propagation of the data packet along the lambda arcs.

FIG. 21 illustrates an example multi-level hierarchy label switched forwarding table 336 implemented in egress routers of the network node "J" 12. The first two columns (Incoming Label="O_J" or "O_JRfrr") are installed in the egress routers "JK1" and "JK2" 312, and the last two columns (Incoming Label="O_JR", O_Jfrr" are installed in the egress routers "JF1" and "JF2" 312. As illustrated in FIG. 21, each table entry includes a preferred omega switch label 346, an encapsulating lambda arc 348, and an alternate omega label 350. Hence, each egress router, in response to receiving a data packet at the end of its lambda arc 306, pops the lambda arc 306 and switches the omega label 340 with the preferred switch label (e.g., "O_J" to "O_K") 346 to propagate the data packet to the adjacent network node 16: the egress router 312 also can encapsulate the data packet with the lambda arc (e.g., "K1") 348 in the adjacent network node, using any four of the available secondary label switched paths; if the first lambda arc is not available, then an alternate lambda arc can be used for sending the data packet along another lambda arc 306. If neither of the lambda arcs 306 in the adjacent network node 16 are available, the egress routers can utilize the alternate fast reroute label 350 to send the data packet back through the existing network "J" 16 for delivery via an alternate path.

Figure 23:
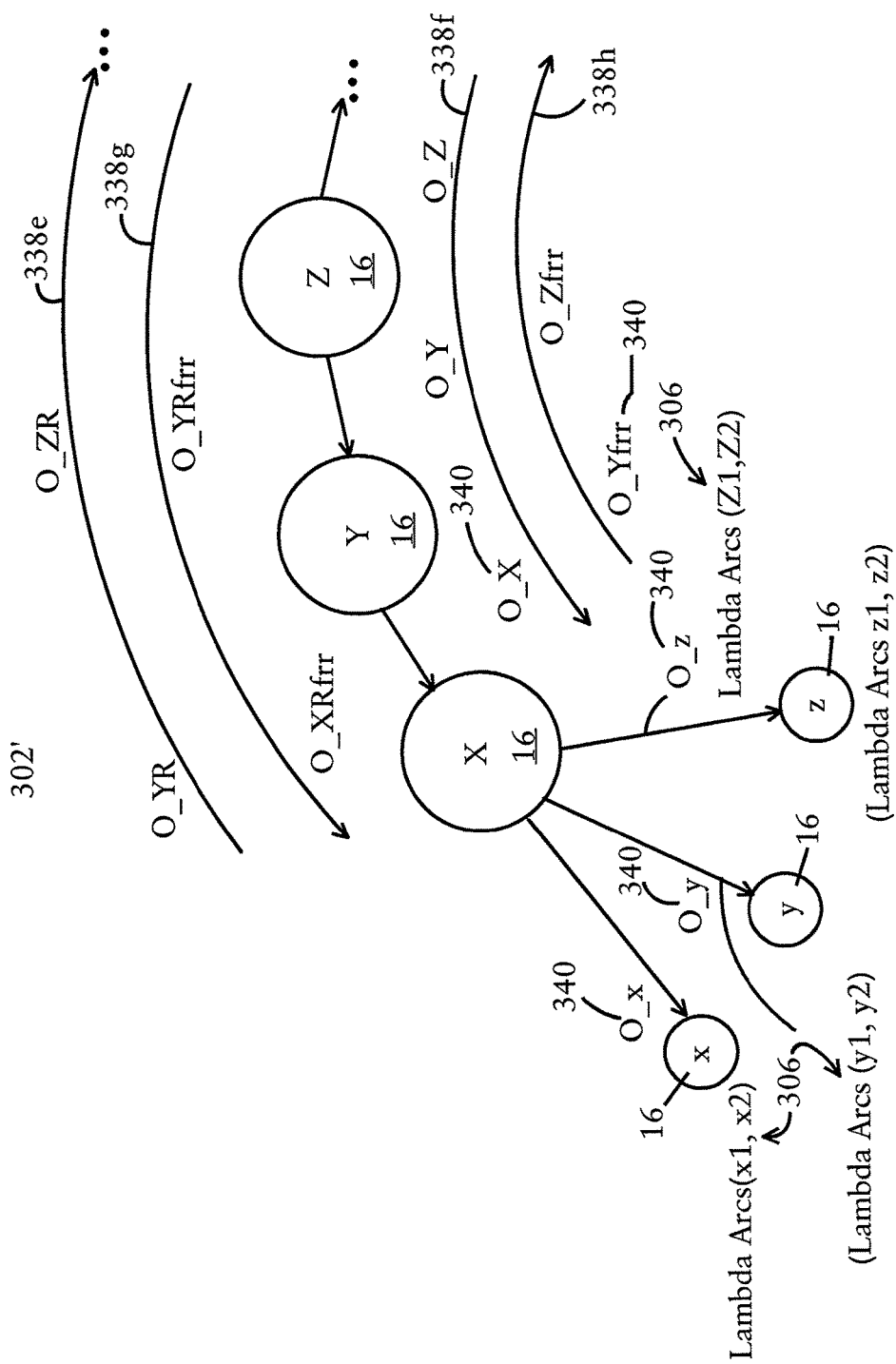
FIG. 23 illustrates an example network node implemented as an edge junction having multiple downstream network nodes and respective primary hierarchal level label switched paths, with respective secondary hierarchal level label switched paths, according to an example embodiment.

FIG. 23 illustrates another example primary hierarchal level routing topology 302' having an edge junction node "X" 16 of one routing arc 12 having connectivity to three other network nodes 16 belonging to at least one other routing arc 16, according to an example embodiment. As illustrated with respect to the example multi-level hierarchy label switched forwarding table 360, the egress router in the edge junction node "X" can respond to a failure in forwarding a data packet via a preferred switching label ("O_x") 340 by successively swapping the primary hierarchal level switching label 340 with another primary hierarchal level switching label for another downstream network node (e.g., "y" or "z"), attempting to retransmit the data packet to another downstream network node 16 (note that the alternate label 362 is used as a "flag" to jump to the next column for an alternate switch label. If none of the downstream network nodes (x, y, or z) coupled to the egress router in the network node "X" are available, the primary hierarchal level switching label is swapped with a primary hierarchal level fast reroute switching label "O_Yfrr" 340 for transmission of the data packet toward the destination via the corresponding routing arc in an alternate direction 338*h*.

Figure 26:
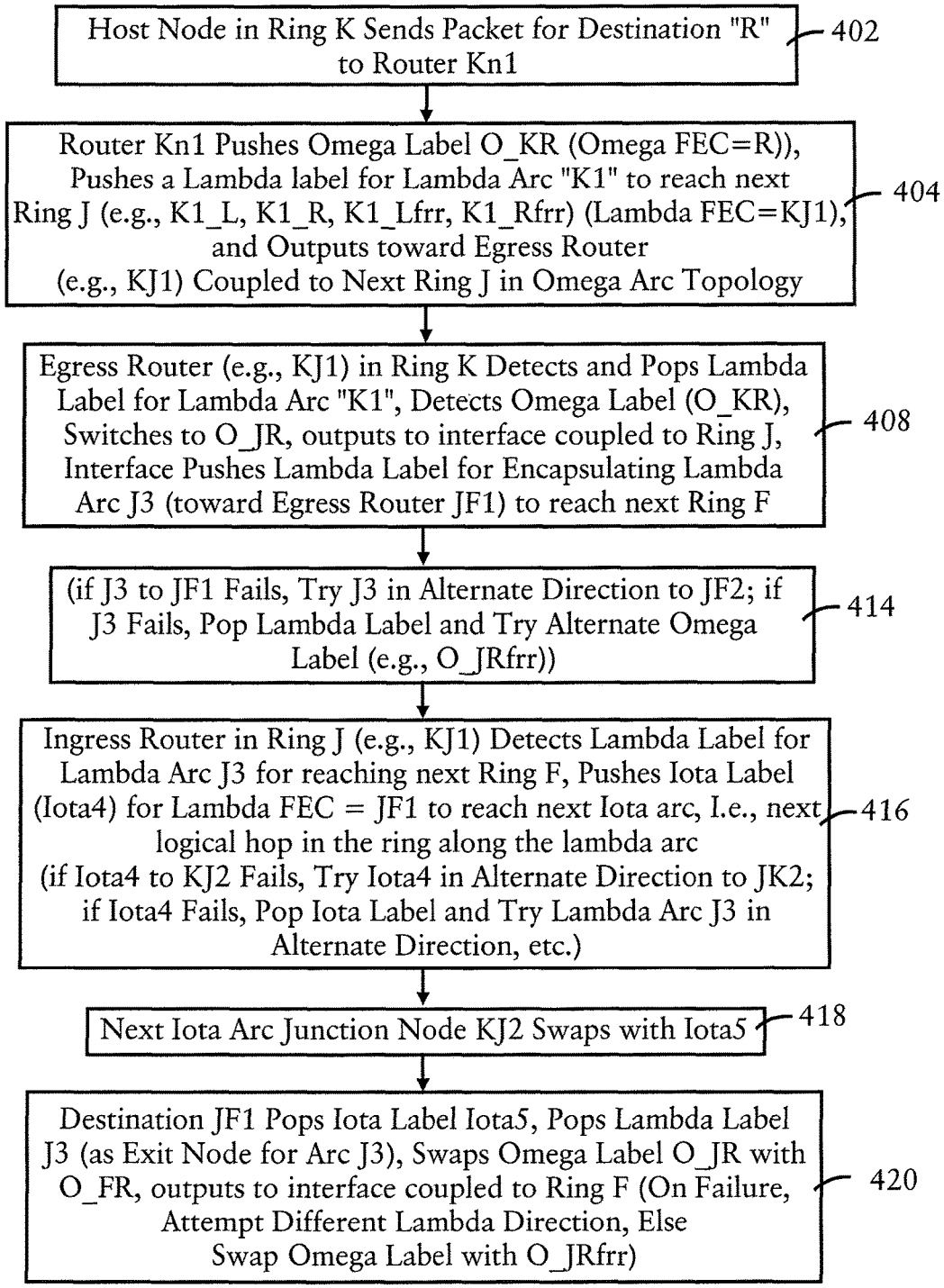
FIG. 26 illustrates routing a packet according to the multilevel hierarchy, including encapsulating the packet with the primary, secondary, and tertiary hierarchal level switching labels of FIG. 24, according to an example embodiment.

FIG. 26 illustrates an example method of transmitting a data packet (400 of FIG. 25) to a destination node 14, according to an example embodiment. A host node (not shown) in the network node "K" 16 (having a ring topology) sends the data packet 400 in operation 402 to the router "Kn1" 312 for transmission to the destination node "R" 14. The router "Kn1" can add to the data packet 400 in operation 404 a primary hierarchal level switching label (340 of FIG. 25) for the loop-free label switched path 338*a*. The router "Kn1" also can push a lambda label 406 for a lambda arc "K1" 306 providing reachability to the adjacent network node "J" having the concentric ring topology. As illustrated in FIG. 26, the router "Kn1" 312 can push any of the available secondary hierarchal level switching labels (e.g., K1_L, K1_R, K1_Lfrr, K1_Rfrr) 406 for the lambda arc "K1" 306 (Lambda FEC=KJ1). The router "Kn1" outputs the data packet 400 encapsulated with the omega label 340 and the lambda label 406 to the egress router "KJ1" 312.

The egress router "KJ1" 312, serving as the edge junction for the lambda arc "K1", in operation 408 detects and pops the lambda label 406 for the lambda arc "K1" 306, and detects and switches the omega label 340 from "O_KR" to "O_JR". The data packet with the switched omega label "O_JR" is passed to an interface coupled to the network node "J" 16 for propagation along the primary hierarchal level label switched path 338*a*. As illustrated in FIG. 20, the ingress router (e.g., "KJ1") responds to the omega label "O_JR" 340 pushing a new lambda label 406 for the encapsulating lambda arc "J3" 306. As illustrated in operation 414, the ingress router "KJ1" can swap the secondary hierarchal label switched label 406 with an alternate secondary hierarchal label for transmission in the alternate direction of the lambda arc 306; if the alternate direction fails, the ingress router "KJ1" can swap the secondary hierarchal label switch label 406 with a fast reroute label 406 in the lambda arc 306 (or an alternate lambda arc 306, if available).

Operation 416 illustrates an ingress router (e.g., "KJ1") pushing an iota label 410 for reaching the next logical hop along the lambda arc. As illustrated with respect to FIG.

17B, the path for reaching the router "JF1" can utilize iota arcs 310, hence the ingress router "KJ1" also can push an iota label 410 enabling the data packet 412 to be forwarded via the lambda arc "J3" using the underlying iota arcs 310. If there is a failure in the iota arc 310, the same iota arc in the alternate direction can be attempted by swapping the iota label 410; if both directions of the iota arc 310 filter for the packet, the iota label can be popped by the router and transmission along the lambda arc "J3" 306 can be attempted in the alternate direction, as described above. Assuming successful transmission along the iota arcs, the next iota arcs junction node swaps in operation 418 the iota arc 410 with the next iota arc. In operation 420 the destination router "JF1" can pop the iota label 410, and pop the lambda label 406, and swap the omega label 340 "O_JR" with the omega label "O_FR" for transmission along the label switched path 338 to the adjacent network node "F" 16. As described previously, any failure in transmission can be re-attempted first at the iota level hierarchy 308, then the lambda level hierarchy 304, and as a last resort at the omega level hierarchy 302.

According to example embodiments, complex network topologies can be efficiently managed and implemented using a multilevel hierarchy with robust rerouting capabilities and with minimal complexity. The use of a multi-level hierarchy enables fractal computation, where the computation at any given hierarchal level is independent and distinct from any other hierarchal level.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
    creating, in a computing network, a loop-free routing topology comprising a plurality of routing arcs for reaching a destination network node, each routing arc comprising a first network node as a first end of the routing arc, a second network node as a second end of the routing arc, and at least a third network node configured for routing any network traffic along the routing arc toward the destination network node via any one of the first or second ends of the routing arc, at least one of the first, second, or third network nodes are implemented as a ring-based network having a prescribed ring topology; and
    establishing loop-free label switched paths for reaching the destination network node via the routing arcs of the loop-free routing topology, the label switched paths independent and distinct from any attribute of the prescribed ring topology;
    wherein the prescribed ring topology includes a first ring of routers and a second ring of routers having two or more interconnections with at least the first ring, the prescribed ring topology providing a sequential path of routing arcs for reaching the destination network node.

2. The method of claim 1, wherein the routing arcs for reaching the destination network node are identified as primary routing arcs in a primary hierarchal level of the loop-free routing topology and the respective label switched paths are identified as primary hierarchal level label switched paths, the method further comprising:
    creating a second hierarchal level of secondary routing arcs having secondary hierarchal level label switched paths within the ring-based network of the at least one network node, each secondary routing arc within the ring-based network of the at least one network node providing reachability from the ring-based network to an adjacent network node in the primary hierarchal level.

3. The method of claim 2, further comprising creating a third hierarchal level of tertiary routing arcs, having tertiary hierarchal level label switched paths, within at least one of the secondary routing arcs, the tertiary hierarchal level label switched paths independent and distinct from any of the secondary hierarchal level label switched paths, the tertiary routing arcs providing reachability within the at least one secondary routing arc to the adjacent network node.

4. The method of claim 3, further comprising:
    adding, by a first router in the at least one network node, a primary hierarchal level switching label in response to detecting a data packet destined for the destination network node, for reaching the destination network node via the primary hierarchal level;
    adding, by the first router, a secondary hierarchal label switched label to the data packet for reaching the adjacent network node in the primary hierarchal level via a corresponding one of the secondary routing arcs in a first direction;
    adding, by the first router, a tertiary hierarchal level switching label to the data packet for reaching a second router along the one secondary routing arc via a corresponding first of the tertiary routing arcs.

5. The method of claim 2, wherein the creating of the second hierarchal level of secondary routing arcs includes creating the secondary routing arcs between contiguous intersections between the at least one network node and the adjacent network node.

6. The method of claim 2, further comprising a router along one of the secondary routing arcs swapping a secondary hierarchal label switched label, in a received data packet traversing along the one secondary routing arc in a first direction, with an alternate secondary hierarchal label for one of an alternate direction of the one secondary routing arc, or another secondary routing arc in the ring-based network, based on a determined unreachability of the adjacent network node along the one secondary routing arc in the first direction.

7. The method of claim 1, further comprising:
    receiving, by a first router in the first network node, a data packet from the corresponding routing arc, the data packet specifying a primary hierarchal level switching label for the first router in the loop-free routing topology for reaching the destination network node;
    swapping, by the first router, the primary hierarchal level switching label in the data packet with a second primary hierarchal level switching label for a downstream network node coupled to the first router and having a distinct ring topology;
    in response to the first router determining the second network node is unreachable, successively swapping the second primary hierarchal level switching label with another primary hierarchal level switching label for another downstream network node coupled to the first router and having a distinct ring topology;
    if none of the downstream network nodes coupled to the first router are reachable, swapping the primary hierarchal level switching label with a primary hierarchal level fast reroute switching label for transmitting the data packet toward the destination via the corresponding routing arc in an alternate direction.

8. The method of claim 1, wherein the prescribed ring topology includes a sequence of rings of routers for reaching the destination network node.

9. One or more non-transitory tangible media encoded with logic for execution and when executed operable for:
creating, in a computing network, a loop-free routing topology comprising a plurality of routing arcs for reaching a destination network node, each routing arc comprising a first network node as a first end of the routing arc, a second network node as a second end of the routing arc, and at least a third network node configured for routing any network traffic along the routing arc toward the destination network node via any one of the first or second ends of the routing arc, at least one of the first, second, or third network nodes are implemented as a ring-based network having a prescribed ring topology; and
establishing loop-free label switched paths for reaching the destination network node via the routing arcs of the loop-free routing topology, the label switched paths independent and distinct from any attribute of the prescribed ring topology;
wherein the prescribed ring topology includes a first ring of routers and a second ring of routers having two or more interconnections with at least the first ring, the prescribed ring topology providing a sequential path of routing arcs for reaching the destination network node.

10. The one or more non-transitory tangible media of claim 9, wherein the routing arcs for reaching the destination network node are identified as primary routing arcs in a primary hierarchal level of the loop-free routing topology and the respective label switched paths are identified as primary hierarchal level label switched paths, the logic further including instructions for:
creating a second hierarchal level of secondary routing arcs having secondary hierarchal level label switched paths within the ring-based network of the at least one network node, each secondary routing arc within the ring-based network of the at least one network node providing reachability from the ring-based network to an adjacent network node in the primary hierarchal level.

11. The one or more non-transitory tangible media of claim 10, further including instructions for:
creating a third hierarchal level of tertiary routing arcs, having tertiary hierarchal level label switched paths, within at least one of the secondary routing arcs, the tertiary hierarchal level label switched paths independent and distinct from any of the secondary hierarchal level label switched paths, the tertiary routing arcs providing reachability within the at least one secondary routing arc to the adjacent network node.

12. The one or more non-transitory tangible media of claim 11, further operable for:
causing adding, by a first router in the at least one network node, of a primary hierarchal level switching label in response to detecting a data packet destined for the destination network node, for reaching the destination network node via the primary hierarchal level;
causing adding, by the first router, of a secondary hierarchal label switched label to the data packet for reaching the adjacent network node in the primary hierarchal level via a corresponding one of the secondary routing arcs in a first direction;
causing adding, by the first router, of a tertiary hierarchal level switching label to the data packet for reaching a second router along the one secondary routing arc via a corresponding first of the tertiary routing arcs.

13. The one or more non-transitory tangible media of claim 10, wherein the creating of the second hierarchal level of secondary routing arcs includes creating the secondary routing arcs between contiguous intersections between the at least one network node and the adjacent network node.

14. The one or more non-transitory tangible media of claim 10, further operable for causing a router along one of the secondary routing arcs to swap a secondary hierarchal label switched label, in a received data packet traversing along the one secondary routing arc in a first direction, with an alternate secondary hierarchal label for one of an alternate direction of the one secondary routing arc, or another secondary routing arc in the ring-based network, based on a determined unreachability of the adjacent network node along the one secondary routing arc in the first direction.

15. The one or more non-transitory tangible media of claim 9, further operable for:
causing receiving, by a first router in the first network node, of a data packet from the corresponding routing arc, the data packet specifying a primary hierarchal level switching label for the first router in the loop-free routing topology for reaching the destination network node;
causing swapping, by the first router, of the primary hierarchal level switching label in the data packet with a second primary hierarchal level switching label for a downstream network node coupled to the first router and having a distinct ring topology;
in response to the first router determining the second network node is unreachable, causing successively swapping of the second primary hierarchal level switching label with another primary hierarchal level switching label for another downstream network node coupled to the first router and having a distinct ring topology;
if none of the downstream network nodes coupled to the first router are reachable, causing swapping of the primary hierarchal level switching label with a primary hierarchal level fast reroute switching label for transmitting the data packet toward the destination via the corresponding routing arc in an alternate direction.

16. The one or more non-transitory tangible media of claim 9, wherein the prescribed ring topology includes a sequence of rings of routers for reaching the destination network node.

17. An apparatus comprising:
a processor circuit configured for creating, in a computing network, a loop-free routing topology comprising a plurality of routing arcs for reaching a destination network node, each routing arc comprising a first network node as a first end of the routing arc, a second network node as a second end of the routing arc, and at least a third network node configured for routing any network traffic along the routing arc toward the destination network node via any one of the first or second ends of the routing arc, at least one of the first, second, or third network nodes are implemented as a ring-based network having a prescribed ring topology; and
a device interface circuit configured for outputting parameters associated with deployment of the loop-free routing topology;
the processor circuit further configured for establishing loop-free label switched paths for reaching the destination network node via the routing arcs of the loop-free routing topology, the label switched paths independent and distinct from any attribute of the prescribed ring topology;

wherein the prescribed ring topology includes a first ring of routers and a second ring of routers having two or more interconnections with at least the first ring, the prescribed ring topology providing a sequential path of routing arcs for reaching the destination network node.

18. The apparatus of claim 17, wherein:

the routing arcs for reaching the destination network node are identified as primary routing arcs in a primary hierarchal level of the loop-free routing topology and the respective label switched paths are identified as primary hierarchal level label switched paths;

the processor circuit further configured for creating a second hierarchal level of secondary routing arcs having secondary hierarchal level label switched paths within the ring-based network of the at least one network node, each secondary routing arc within the ring-based network of the at least one network node providing reachability from the ring-based network to an adjacent network node in the primary hierarchal level.

19. The apparatus of claim 18, wherein the processor circuit is configured for creating a third hierarchal level of tertiary routing arcs, having tertiary hierarchal level label switched paths, within at least one of the secondary routing arcs, the tertiary hierarchal level label switched paths independent and distinct from any of the secondary hierarchal level label switched paths, the tertiary routing arcs providing reachability within the at least one secondary routing arc to the adjacent network node.

20. The apparatus of claim 17, wherein the prescribed ring topology includes a sequence of rings of routers for reaching the destination network node.

* * * * *